US012510351B2

(12) United States Patent
Krenn

(10) Patent No.: US 12,510,351 B2
(45) Date of Patent: Dec. 30, 2025

(54) CARD-HANDLING DEVICES WITH DEFECT DETECTION AND RELATED METHODS

(71) Applicant: Shuffle Master GmbH & Co KG, Vienna (AT)

(72) Inventor: Peter Krenn, Neufeld (AT)

(73) Assignee: Shuffle Master GmbH & Co KG, Vienna (AT)

( * ) Notice: Subject to any disclaimer, the term of this patent is extended or adjusted under 35 U.S.C. 154(b) by 107 days.

(21) Appl. No.: 18/528,453

(22) Filed: Dec. 4, 2023

(65) Prior Publication Data

US 2024/0102794 A1    Mar. 28, 2024

Related U.S. Application Data

(63) Continuation of application No. 17/016,796, filed on Sep. 10, 2020, now Pat. No. 11,898,837.

(Continued)

(51) Int. Cl.
*G01B 11/24* (2006.01)
*A63F 1/02* (2006.01)
(Continued)

(52) U.S. Cl.
CPC ............... *G01B 11/24* (2013.01); *A63F 1/02* (2013.01); *A63F 1/12* (2013.01); *G01N 21/55* (2013.01);
(Continued)

(58) Field of Classification Search
CPC ... G01B 11/24; A63F 1/02; A63F 1/12; A63F 2001/022; A63F 2001/001;
(Continued)

(56) References Cited

U.S. PATENT DOCUMENTS

| 130,281 A | 8/1872 | Coughlin |
| 205,030 A | 6/1878 | Ash |

(Continued)

FOREIGN PATENT DOCUMENTS

| AU | 2383667 A | 1/1969 |
| AU | 5025479 A | 3/1980 |

(Continued)

OTHER PUBLICATIONS

Australian First Examination Report for Australian Application No. 2017331934, dated Aug. 12, 2021, 5 pages.

(Continued)

*Primary Examiner* — Jeffrey S Vanderveen
(74) *Attorney, Agent, or Firm* — TraskBritt

(57) ABSTRACT

Card-handling devices may include an input area sized and shaped to receive cards and an output area for outputting at least some of the cards. A defect detection system may be located along a card path downstream from the input area. The defect detection system may include an emitter positioned and oriented to direct radiation toward a major surface of a card as the card moves along the card path. A detector may be positioned and configured to detect the radiation emitted by the emitter and reflected from the major surface of the card as the card moves along the card path. A controller may be operatively connected to the detector and configured to correlate a signal from the detector with an identification of a degree to which the major surface of the card has deviated from a reference plane.

20 Claims, 15 Drawing Sheets

Related U.S. Application Data

(60) Provisional application No. 62/898,080, filed on Sep. 10, 2019.

(51) Int. Cl.
  *A63F 1/12* (2006.01)
  *G01N 21/55* (2014.01)
  *G01N 21/89* (2006.01)

(52) U.S. Cl.
  CPC .... *G01N 21/8914* (2013.01); *A63F 2001/022* (2013.01); *G01N 2201/06113* (2013.01)

(58) Field of Classification Search
  CPC ... A63F 2009/2445; A63F 1/14; G01N 21/55; G01N 21/8914; G01N 2201/06113; G01N 2021/8917
  See application file for complete search history.

(56) References Cited

U.S. PATENT DOCUMENTS

| | | |
|---|---|---|
| 609,730 A | 8/1898 | Booth |
| 673,154 A | 4/1901 | Bellows |
| 793,489 A | 6/1905 | Williams |
| 892,389 A | 7/1908 | Bellows |
| 1,014,219 A | 1/1912 | Hall |
| 1,043,109 A | 11/1912 | Hurm |
| 1,157,898 A | 10/1915 | Perret |
| 1,256,509 A | 2/1918 | Belknap |
| 1,380,898 A | 6/1921 | Hall |
| 1,556,856 A | 10/1925 | Lipps |
| 1,757,553 A | 5/1930 | Tauschek |
| 1,850,114 A | 3/1932 | McCaddin |
| 1,885,276 A | 11/1932 | McKay |
| 1,889,729 A | 11/1932 | Hammond |
| 1,955,926 A | 4/1934 | Matthaey |
| 1,992,085 A | 2/1935 | McKay |
| 1,998,690 A | 4/1935 | Shepherd et al. |
| 2,001,220 A | 5/1935 | Smith |
| 2,001,918 A | 5/1935 | Nevius |
| 2,016,030 A | 10/1935 | Woodruff et al. |
| 2,043,343 A | 6/1936 | Warner |
| 2,060,096 A | 11/1936 | McCoy |
| 2,065,824 A | 12/1936 | Plass |
| 2,159,958 A | 5/1939 | Sachs |
| 2,185,474 A | 1/1940 | Nott |
| 2,254,484 A | 9/1941 | Hutchins |
| D132,360 S | 5/1942 | Gardner |
| 2,282,040 A | 5/1942 | Doran |
| 2,328,153 A | 8/1943 | Laing |
| 2,328,879 A | 9/1943 | Issacson |
| D139,530 S | 11/1944 | Schindler |
| 2,364,413 A | 12/1944 | Wittel |
| 2,525,305 A | 10/1950 | Lombard |
| 2,543,522 A | 2/1951 | Cohen |
| 2,588,582 A | 3/1952 | Sivertson |
| 2,615,719 A | 10/1952 | Fonken |
| 2,659,607 A | 11/1953 | Skillman et al. |
| 2,661,215 A | 12/1953 | Stevens |
| 2,676,020 A | 4/1954 | Ogden |
| 2,692,777 A | 10/1954 | Miller |
| 2,701,720 A | 2/1955 | Ogden |
| 2,705,638 A | 4/1955 | Newcomb |
| 2,711,319 A | 6/1955 | Morgan et al. |
| 2,714,510 A | 8/1955 | Oppenlander et al. |
| 2,717,782 A | 9/1955 | Droll |
| 2,727,747 A | 12/1955 | Semisch, Jr. |
| 2,731,271 A | 1/1956 | Brown |
| 2,747,877 A | 5/1956 | Howard |
| 2,755,090 A | 7/1956 | Aldrich |
| 2,757,005 A | 7/1956 | Nothaft |
| 2,760,779 A | 8/1956 | Ogden et al. |
| 2,770,459 A | 11/1956 | Wilson et al. |
| 2,778,643 A | 1/1957 | Williams |
| 2,778,644 A | 1/1957 | Stephenson |
| 2,782,040 A | 2/1957 | Matter |
| 2,790,641 A | 4/1957 | Adams |
| 2,793,863 A | 5/1957 | Liebelt |
| 2,815,214 A | 12/1957 | Hall |
| 2,821,399 A | 1/1958 | Heinoo |
| 2,914,215 A | 11/1959 | Neidig |
| 2,937,739 A | 5/1960 | Levy |
| 2,950,005 A | 8/1960 | MacDonald |
| RE24,986 E | 5/1961 | Stephenson |
| 3,067,885 A | 12/1962 | Kohler |
| 3,107,096 A | 10/1963 | Osborn |
| 3,124,674 A | 3/1964 | Edwards et al. |
| 3,131,935 A | 5/1964 | Gronneberg |
| 3,147,978 A | 9/1964 | Hjalmar |
| D200,652 S | 3/1965 | Fisk |
| 3,185,482 A | 5/1965 | Russell |
| 3,222,071 A | 12/1965 | Lang |
| 3,235,741 A | 2/1966 | Plaisance |
| 3,288,308 A | 11/1966 | Gingher |
| 3,305,237 A | 2/1967 | Granius |
| 3,312,473 A | 4/1967 | Friedman et al. |
| 3,452,509 A | 7/1969 | Hauer |
| 3,530,968 A | 9/1970 | Palmer |
| 3,588,116 A | 6/1971 | Kosaburo |
| 3,589,730 A | 6/1971 | Slay |
| 3,595,388 A | 7/1971 | Castaldi |
| 3,597,076 A | 8/1971 | Hubbard et al. |
| 3,598,396 A | 8/1971 | Andrews et al. |
| 3,618,933 A | 11/1971 | Roggenstein et al. |
| 3,627,331 A | 12/1971 | Erickson |
| 3,666,270 A | 5/1972 | Mazur |
| 3,680,853 A | 8/1972 | Houghton et al. |
| 3,690,670 A | 9/1972 | Cassady et al. |
| 3,704,938 A | 12/1972 | Fanselow |
| 3,716,238 A | 2/1973 | Porter |
| 3,751,041 A | 8/1973 | Seifert |
| 3,761,079 A | 9/1973 | Azure |
| 3,810,627 A | 5/1974 | Levy |
| D232,953 S | 9/1974 | Oguchi |
| 3,861,261 A | 1/1975 | Maxey |
| 3,897,954 A | 8/1975 | Erickson et al. |
| 3,899,178 A | 8/1975 | Watanabe |
| 3,909,002 A | 9/1975 | Levy |
| 3,929,339 A | 12/1975 | Mattioli |
| 3,944,077 A | 3/1976 | Green |
| 3,944,230 A | 3/1976 | Fineman |
| 3,947,666 A | 3/1976 | Carlson |
| 3,949,219 A | 4/1976 | Crouse |
| 3,968,364 A | 7/1976 | Miller |
| 3,981,163 A | 9/1976 | Tillotson |
| 4,023,705 A | 5/1977 | Reiner et al. |
| 4,033,590 A | 7/1977 | Pic |
| 4,072,930 A | 2/1978 | Lucero et al. |
| 4,088,265 A | 5/1978 | Garczynski |
| 4,151,410 A | 4/1979 | McMillan et al. |
| 4,159,581 A | 7/1979 | Lichtenberg |
| 4,162,649 A | 7/1979 | Thornton |
| 4,166,615 A | 9/1979 | Noguchi et al. |
| 4,232,861 A | 11/1980 | Maul |
| 4,280,690 A | 7/1981 | Hill |
| 4,283,709 A | 8/1981 | Lucero et al. |
| 4,310,160 A | 1/1982 | Willette et al. |
| 4,339,134 A | 7/1982 | Macheel |
| 4,339,798 A | 7/1982 | Hedges et al. |
| 4,361,393 A | 11/1982 | Noto |
| 4,368,972 A | 1/1983 | Naramore |
| 4,369,972 A | 1/1983 | Parker |
| 4,374,309 A | 2/1983 | Walton |
| 4,377,285 A | 3/1983 | Kadlic |
| 4,385,827 A | 5/1983 | Naramore |
| 4,388,994 A | 6/1983 | Suda et al. |
| 4,397,469 A | 8/1983 | Carter, III |
| 4,421,312 A | 12/1983 | Delgado et al. |
| 4,421,501 A | 12/1983 | Scheffer |
| D273,962 S | 5/1984 | Fromm |
| D274,069 S | 5/1984 | Fromm |
| 4,457,512 A | 7/1984 | Stevenson |
| 4,467,424 A | 8/1984 | Hedges et al. |
| 4,494,197 A | 1/1985 | Troy et al. |

(56) References Cited

U.S. PATENT DOCUMENTS

| | | |
|---|---|---|
| 4,497,488 A | 2/1985 | Plevyak et al. |
| 4,512,580 A | 4/1985 | Matviak |
| 4,513,969 A | 4/1985 | Samsel, Jr. |
| 4,515,367 A | 5/1985 | Howard |
| 4,531,187 A | 7/1985 | Uhland |
| 4,534,562 A | 8/1985 | Cuff et al. |
| 4,549,738 A | 10/1985 | Greitzer |
| 4,566,782 A | 1/1986 | Britt et al. |
| 4,575,367 A | 3/1986 | Karmel |
| 4,586,712 A | 5/1986 | Lorber et al. |
| 4,659,082 A | 4/1987 | Greenberg |
| 4,662,637 A | 5/1987 | Pfeiffer |
| 4,662,816 A | 5/1987 | Fabrig |
| 4,667,959 A | 5/1987 | Pfeiffer et al. |
| 4,741,524 A | 5/1988 | Bromage |
| 4,750,743 A | 6/1988 | Nicoletti |
| 4,755,941 A | 7/1988 | Bacchi |
| 4,759,448 A | 7/1988 | Kawabata |
| 4,770,412 A | 9/1988 | Wolfe |
| 4,770,421 A | 9/1988 | Hoffman |
| 4,807,884 A | 2/1989 | Breeding |
| 4,822,050 A | 4/1989 | Normand et al. |
| 4,832,342 A | 5/1989 | Plevyak et al. |
| 4,858,000 A | 8/1989 | Lu |
| 4,861,041 A | 8/1989 | Jones et al. |
| 4,876,000 A | 10/1989 | Mikhail |
| 4,900,009 A | 2/1990 | Kitahara et al. |
| 4,904,830 A | 2/1990 | Rizzuto |
| 4,921,109 A | 5/1990 | Hasuo et al. |
| 4,926,327 A | 5/1990 | Sidley |
| 4,948,134 A | 8/1990 | Suttle et al. |
| 4,951,950 A | 8/1990 | Normand et al. |
| 4,969,648 A | 11/1990 | Hollinger et al. |
| 4,993,587 A | 2/1991 | Abe |
| 4,995,615 A | 2/1991 | Cheng |
| 5,000,453 A | 3/1991 | Stevens et al. |
| 5,004,218 A | 4/1991 | Sardano et al. |
| 5,039,102 A | 8/1991 | Miller |
| 5,067,713 A | 11/1991 | Soules et al. |
| 5,078,405 A | 1/1992 | Jones et al. |
| 5,081,487 A | 1/1992 | Hoyer et al. |
| 5,096,197 A | 3/1992 | Embury |
| 5,102,293 A | 4/1992 | Schneider |
| 5,118,114 A | 6/1992 | Tucci |
| 5,121,192 A | 6/1992 | Kazui |
| 5,121,921 A | 6/1992 | Friedman et al. |
| 5,146,346 A | 9/1992 | Knoll |
| 5,154,429 A | 10/1992 | Levasseur |
| 5,179,517 A | 1/1993 | Sarbin et al. |
| 5,197,094 A | 3/1993 | Tillery et al. |
| 5,199,710 A | 4/1993 | Lamle |
| 5,209,476 A | 5/1993 | Eiba |
| 5,224,712 A | 7/1993 | Laughlin et al. |
| 5,240,140 A | 8/1993 | Huen |
| 5,248,142 A | 9/1993 | Breeding |
| 5,257,179 A | 10/1993 | DeMar |
| 5,259,907 A | 11/1993 | Soules et al. |
| 5,261,667 A | 11/1993 | Breeding |
| 5,267,248 A | 11/1993 | Reyner |
| 5,275,411 A | 1/1994 | Breeding |
| 5,276,312 A | 1/1994 | McCarthy |
| 5,283,422 A | 2/1994 | Storch et al. |
| 5,288,081 A | 2/1994 | Breeding |
| 5,299,089 A | 3/1994 | Lwee |
| 5,303,921 A | 4/1994 | Breeding |
| 5,344,146 A | 9/1994 | Lee |
| 5,356,145 A | 10/1994 | Verschoor |
| 5,362,053 A | 11/1994 | Miller |
| 5,374,061 A | 12/1994 | Albrecht |
| 5,377,973 A | 1/1995 | Jones et al. |
| 5,382,024 A | 1/1995 | Blaha |
| 5,382,025 A | 1/1995 | Sklansky et al. |
| 5,390,910 A | 2/1995 | Mandel et al. |
| 5,397,128 A | 3/1995 | Hesse et al. |
| 5,397,133 A | 3/1995 | Penzias |
| 5,416,308 A | 5/1995 | Hood et al. |
| 5,431,399 A | 7/1995 | Kelley |
| 5,431,407 A | 7/1995 | Hofberg et al. |
| 5,437,462 A | 8/1995 | Breeding |
| 5,445,377 A | 8/1995 | Steinbach |
| 5,470,079 A | 11/1995 | Lestrange et al. |
| D365,853 S | 1/1996 | Zadro |
| 5,489,101 A | 2/1996 | Moody |
| 5,515,477 A | 5/1996 | Sutherland |
| 5,524,888 A | 6/1996 | Heidel |
| 5,531,448 A | 7/1996 | Moody |
| 5,544,892 A | 8/1996 | Breeding |
| 5,575,475 A | 11/1996 | Steinbach |
| 5,584,483 A | 12/1996 | Sines et al. |
| 5,586,766 A | 12/1996 | Forte et al. |
| 5,586,936 A | 12/1996 | Bennett et al. |
| 5,605,334 A | 2/1997 | McCrea, Jr. |
| 5,613,912 A | 3/1997 | Slater |
| 5,632,483 A | 5/1997 | Garczynski et al. |
| 5,636,843 A | 6/1997 | Roberts |
| 5,651,548 A | 7/1997 | French et al. |
| 5,655,961 A | 8/1997 | Acres et al. |
| 5,655,966 A | 8/1997 | Werdin et al. |
| 5,669,816 A | 9/1997 | Garczynski et al. |
| 5,676,231 A | 10/1997 | Legras et al. |
| 5,676,372 A | 10/1997 | Sines et al. |
| 5,681,039 A | 10/1997 | Miller |
| 5,683,085 A | 11/1997 | Johnson et al. |
| 5,685,543 A | 11/1997 | Garner |
| 5,690,324 A | 11/1997 | Otomo et al. |
| 5,692,748 A | 12/1997 | Frisco et al. |
| 5,695,189 A | 12/1997 | Breeding et al. |
| 5,695,489 A | 12/1997 | Japuntich |
| 5,701,565 A | 12/1997 | Morgan |
| 5,707,286 A | 1/1998 | Carlson |
| 5,707,287 A | 1/1998 | McCrea, Jr. |
| 5,711,525 A | 1/1998 | Breeding |
| 5,718,427 A | 2/1998 | Cranford et al. |
| 5,719,288 A | 2/1998 | Sens et al. |
| 5,720,484 A | 2/1998 | Hsu |
| 5,722,893 A | 3/1998 | Hill et al. |
| 5,735,525 A | 4/1998 | McCrea, Jr. |
| 5,735,724 A | 4/1998 | Udagawa |
| 5,735,742 A | 4/1998 | French |
| 5,743,798 A | 4/1998 | Adams et al. |
| 5,768,382 A | 6/1998 | Schneier et al. |
| 5,770,533 A | 6/1998 | Franchi |
| 5,770,553 A | 6/1998 | Kroner et al. |
| 5,772,505 A | 6/1998 | Garczynski et al. |
| 5,779,546 A | 7/1998 | Meissner et al. |
| 5,781,647 A | 7/1998 | Fishbine et al. |
| 5,785,321 A | 7/1998 | Van Putten et al. |
| 5,788,574 A | 8/1998 | Ornstein et al. |
| 5,791,988 A | 8/1998 | Nomi |
| 5,802,560 A | 9/1998 | Joseph et al. |
| 5,803,808 A | 9/1998 | Strisower |
| 5,810,355 A | 9/1998 | Trilli |
| 5,813,326 A | 9/1998 | Salomon |
| 5,813,912 A | 9/1998 | Shultz |
| 5,814,796 A | 9/1998 | Benson et al. |
| 5,836,775 A | 11/1998 | Hiyama et al. |
| 5,839,730 A | 11/1998 | Pike |
| 5,845,906 A | 12/1998 | Wirth |
| 5,851,011 A | 12/1998 | Lott |
| 5,867,586 A | 2/1999 | Liang |
| 5,879,233 A | 3/1999 | Stupero |
| 5,883,804 A | 3/1999 | Christensen |
| 5,890,717 A | 4/1999 | Rosewarne et al. |
| 5,892,210 A | 4/1999 | Levasseur |
| 5,909,876 A | 6/1999 | Brown |
| 5,911,626 A | 6/1999 | McCrea, Jr. |
| 5,919,090 A | 7/1999 | Mothwurf |
| D412,723 S | 8/1999 | Hachuel et al. |
| 5,936,222 A | 8/1999 | Korsunsky et al. |
| 5,941,769 A | 8/1999 | Order |
| 5,944,310 A | 8/1999 | Johnson et al. |
| D414,527 S | 9/1999 | Tedham |
| 5,957,776 A | 9/1999 | Hoehne |
| 5,974,150 A | 10/1999 | Kaish et al. |

(56) References Cited

U.S. PATENT DOCUMENTS

| | | |
|---|---|---|
| 5,989,122 A | 11/1999 | Roblejo |
| 5,991,308 A | 11/1999 | Fuhrmann et al. |
| 6,015,311 A | 1/2000 | Benjamin et al. |
| 6,019,368 A | 2/2000 | Sines et al. |
| 6,019,374 A | 2/2000 | Breeding |
| 6,039,650 A | 3/2000 | Hill |
| 6,050,569 A | 4/2000 | Taylor |
| 6,053,695 A | 4/2000 | Longoria et al. |
| 6,061,449 A | 5/2000 | Candelore et al. |
| 6,068,258 A | 5/2000 | Breeding et al. |
| 6,069,564 A | 5/2000 | Hatano et al. |
| 6,071,190 A | 6/2000 | Weiss et al. |
| 6,093,103 A | 7/2000 | McCrea, Jr. |
| 6,113,101 A | 9/2000 | Wirth |
| 6,117,012 A | 9/2000 | McCrea, Jr. |
| 6,123,010 A | 9/2000 | Blackstone |
| D432,588 S | 10/2000 | Tedham |
| 6,126,166 A | 10/2000 | Lorson et al. |
| 6,131,817 A | 10/2000 | Miller |
| 6,139,014 A | 10/2000 | Breeding et al. |
| 6,139,048 A | 10/2000 | Braunschaedel |
| 6,149,154 A | 11/2000 | Grauzer et al. |
| 6,154,131 A | 11/2000 | Jones et al. |
| 6,165,069 A | 12/2000 | Sines et al. |
| 6,165,072 A | 12/2000 | Davis et al. |
| 6,183,362 B1 | 2/2001 | Boushy |
| 6,186,895 B1 | 2/2001 | Oliver |
| 6,196,416 B1 | 3/2001 | Seagle |
| 6,200,218 B1 | 3/2001 | Lindsay |
| 6,210,274 B1 | 4/2001 | Carlson |
| 6,213,310 B1 | 4/2001 | Wennersten et al. |
| 6,217,447 B1 | 4/2001 | Lofink et al. |
| 6,234,900 B1 | 5/2001 | Cumbers |
| 6,236,223 B1 | 5/2001 | Brady et al. |
| 6,250,632 B1 | 6/2001 | Albrecht |
| 6,254,002 B1 | 7/2001 | Litman |
| 6,254,096 B1 | 7/2001 | Grauzer et al. |
| 6,254,484 B1 | 7/2001 | McCrea, Jr. |
| 6,257,981 B1 | 7/2001 | Acres et al. |
| 6,267,248 B1 | 7/2001 | Johnson et al. |
| 6,267,648 B1 | 7/2001 | Katayama et al. |
| 6,267,671 B1 | 7/2001 | Hogan |
| 6,270,404 B2 | 8/2001 | Sines et al. |
| 6,272,223 B1 | 8/2001 | Carlson |
| 6,293,546 B1 | 9/2001 | Hessing et al. |
| 6,293,864 B1 | 9/2001 | Romero |
| 6,299,167 B1 | 10/2001 | Sines et al. |
| 6,299,534 B1 | 10/2001 | Breeding et al. |
| 6,299,536 B1 | 10/2001 | Hill |
| 6,308,886 B1 | 10/2001 | Benson et al. |
| 6,313,871 B1 | 11/2001 | Schubert |
| 6,325,373 B1 | 12/2001 | Breeding et al. |
| 6,334,614 B1 | 1/2002 | Breeding |
| 6,341,778 B1 | 1/2002 | Lee |
| 6,342,830 B1 | 1/2002 | Want et al. |
| 6,346,044 B1 | 2/2002 | McCrea, Jr. |
| 6,361,044 B1 | 3/2002 | Block et al. |
| 6,386,973 B1 | 5/2002 | Yoseloff |
| 6,402,142 B1 | 6/2002 | Warren et al. |
| 6,403,908 B2 | 6/2002 | Stardust et al. |
| 6,446,864 B1 | 9/2002 | Kim et al. |
| 6,454,266 B1 | 9/2002 | Breeding et al. |
| 6,460,848 B1 | 10/2002 | Soltys et al. |
| 6,464,584 B2 | 10/2002 | Oliver |
| 6,490,277 B1 | 12/2002 | Tzotzkov |
| 6,508,709 B1 | 1/2003 | Karmarkar |
| 6,514,140 B1 | 2/2003 | Storch |
| 6,517,435 B2 | 2/2003 | Soltys et al. |
| 6,517,436 B2 | 2/2003 | Soltys et al. |
| 6,527,271 B2 | 3/2003 | Soltys et al. |
| 6,530,836 B2 | 3/2003 | Soltys et al. |
| 6,530,837 B2 | 3/2003 | Soltys et al. |
| 6,532,297 B1 | 3/2003 | Lindquist |
| 6,533,276 B2 | 3/2003 | Soltys et al. |
| 6,533,662 B2 | 3/2003 | Soltys et al. |
| 6,543,770 B1 | 4/2003 | Kaji et al. |
| 6,561,897 B1 | 5/2003 | Bourbour et al. |
| 6,579,180 B2 | 6/2003 | Soltys et al. |
| 6,579,181 B2 | 6/2003 | Soltys et al. |
| 6,581,747 B1 | 6/2003 | Charlier et al. |
| 6,582,301 B2 | 6/2003 | Hill |
| 6,582,302 B2 | 6/2003 | Romero |
| 6,585,586 B1 | 7/2003 | Romero |
| 6,585,588 B2 | 7/2003 | Hartl |
| 6,585,856 B2 | 7/2003 | Zwick et al. |
| 6,588,750 B1 | 7/2003 | Grauzer et al. |
| 6,588,751 B1 | 7/2003 | Grauzer et al. |
| 6,595,857 B2 | 7/2003 | Soltys et al. |
| 6,609,710 B1 | 8/2003 | Order |
| 6,612,928 B1 | 9/2003 | Bradford et al. |
| 6,616,535 B1 | 9/2003 | Nishizaki et al. |
| 6,619,662 B2 | 9/2003 | Miller |
| 6,622,185 B1 | 9/2003 | Johnson et al. |
| 6,626,757 B2 | 9/2003 | Oliveras |
| 6,629,019 B2 | 9/2003 | Legge et al. |
| 6,629,591 B1 | 10/2003 | Griswold et al. |
| 6,629,889 B2 | 10/2003 | Mothwurf |
| 6,629,894 B1 | 10/2003 | Purton |
| 6,637,622 B1 | 10/2003 | Robinson |
| 6,645,068 B1 | 11/2003 | Kelly et al. |
| 6,645,077 B2 | 11/2003 | Rowe |
| 6,651,985 B2 | 11/2003 | Sines et al. |
| 6,652,379 B2 | 11/2003 | Soltys et al. |
| 6,655,690 B1 | 12/2003 | Oskwarek |
| 6,658,135 B1 | 12/2003 | Morito et al. |
| 6,659,460 B2 | 12/2003 | Blaha et al. |
| 6,659,461 B2 | 12/2003 | Yoseloff et al. |
| 6,659,875 B2 | 12/2003 | Purton |
| 6,663,490 B2 | 12/2003 | Soltys et al. |
| 6,666,768 B1 | 12/2003 | Akers |
| 6,671,358 B1 | 12/2003 | Seidman et al. |
| 6,676,517 B2 | 1/2004 | Beavers |
| 6,680,843 B2 | 1/2004 | Farrow et al. |
| 6,685,564 B2 | 2/2004 | Oliver |
| 6,685,567 B2 | 2/2004 | Cockerille et al. |
| 6,685,568 B2 | 2/2004 | Soltys et al. |
| 6,688,597 B2 | 2/2004 | Jones |
| 6,688,979 B2 | 2/2004 | Soltys et al. |
| 6,690,673 B1 | 2/2004 | Jarvis |
| 6,698,756 B1 | 3/2004 | Baker et al. |
| 6,698,759 B2 | 3/2004 | Webb et al. |
| 6,702,289 B1 | 3/2004 | Feola |
| 6,702,290 B2 | 3/2004 | Buono-Correa et al. |
| 6,709,333 B1 | 3/2004 | Bradford et al. |
| 6,719,634 B2 | 4/2004 | Mishina et al. |
| 6,722,974 B2 | 4/2004 | Sines et al. |
| 6,726,205 B1 | 4/2004 | Purton |
| 6,732,067 B1 | 5/2004 | Powderly |
| 6,733,012 B2 | 5/2004 | Bui et al. |
| 6,733,388 B2 | 5/2004 | Mothwurf |
| 6,746,333 B1 | 6/2004 | Onda et al. |
| 6,747,560 B2 | 6/2004 | Stevens, III |
| 6,758,751 B2 | 7/2004 | Soltys et al. |
| 6,758,757 B2 | 7/2004 | Luciano et al. |
| 6,769,693 B2 | 8/2004 | Huard et al. |
| 6,774,782 B2 | 8/2004 | Runyon et al. |
| 6,789,801 B2 | 9/2004 | Snow |
| 6,802,510 B1 | 10/2004 | Haber |
| 6,804,763 B1 | 10/2004 | Stockdale et al. |
| 6,808,173 B2 | 10/2004 | Snow |
| 6,827,282 B2 | 12/2004 | Silverbrook |
| 6,834,251 B1 | 12/2004 | Fletcher |
| 6,840,517 B2 | 1/2005 | Snow et al. |
| 6,842,263 B1 | 1/2005 | Saeki |
| 6,843,725 B2 | 1/2005 | Nelson |
| 6,848,616 B2 | 2/2005 | Tsirline et al. |
| 6,848,844 B2 | 2/2005 | McCue et al. |
| 6,848,994 B1 | 2/2005 | Knust et al. |
| 6,857,961 B2 | 2/2005 | Soltys et al. |
| 6,874,784 B1 | 4/2005 | Promutico et al. |
| 6,874,786 B2 | 4/2005 | Bruno et al. |
| 6,877,657 B2 | 4/2005 | Ranard et al. |
| 6,877,748 B1 | 4/2005 | Patroni et al. |
| 6,889,979 B2 | 5/2005 | Blaha et al. |

(56) References Cited

U.S. PATENT DOCUMENTS

| | | |
|---|---|---|
| 6,893,347 B1 | 5/2005 | Zilliacus et al. |
| 6,899,628 B2 | 5/2005 | Leen et al. |
| 6,902,167 B2 | 6/2005 | Webb |
| 6,905,121 B1 | 6/2005 | Timpano |
| 6,923,446 B2 | 8/2005 | Snow |
| 6,938,900 B2 | 9/2005 | Snow |
| 6,941,180 B1 | 9/2005 | Fischer et al. |
| 6,950,948 B2 | 9/2005 | Neff |
| 6,955,599 B2 | 10/2005 | Bourbour et al. |
| 6,957,746 B2 | 10/2005 | Martin et al. |
| 6,959,925 B1 | 11/2005 | Baker et al. |
| 6,960,134 B2 | 11/2005 | Hartl et al. |
| 6,964,612 B2 | 11/2005 | Soltys et al. |
| 6,986,514 B2 | 1/2006 | Snow |
| 6,988,516 B2 | 1/2006 | Debaes et al. |
| 7,011,309 B2 | 3/2006 | Soltys et al. |
| 7,020,307 B2 | 3/2006 | Hinton et al. |
| 7,028,598 B2 | 4/2006 | Teshima |
| 7,029,009 B2 | 4/2006 | Grauzer et al. |
| 7,046,458 B2 | 5/2006 | Nakayama |
| 7,046,764 B1 | 5/2006 | Kump |
| 7,048,629 B2 | 5/2006 | Sines et al. |
| 7,066,464 B2 | 6/2006 | Blad et al. |
| 7,068,822 B2 | 6/2006 | Scott |
| 7,079,010 B2 | 7/2006 | Champlin |
| 7,084,769 B2 | 8/2006 | Bauer et al. |
| 7,089,420 B1 | 8/2006 | Durst et al. |
| D527,900 S | 9/2006 | Dewa et al. |
| 7,106,201 B2 | 9/2006 | Tuttle |
| 7,113,094 B2 | 9/2006 | Garber et al. |
| 7,114,718 B2 | 10/2006 | Grauzer et al. |
| 7,128,652 B1 | 10/2006 | Lavoie et al. |
| 7,139,108 B2 | 11/2006 | Andersen et al. |
| 7,140,614 B2 | 11/2006 | Snow |
| 7,162,035 B1 | 1/2007 | Durst et al. |
| 7,165,769 B2 | 1/2007 | Crenshaw et al. |
| 7,165,770 B2 | 1/2007 | Snow |
| 7,175,522 B2 | 2/2007 | Hartl |
| 7,186,181 B2 | 3/2007 | Rowe |
| 7,201,656 B2 | 4/2007 | Darder |
| 7,202,888 B2 | 4/2007 | Tecu et al. |
| 7,203,841 B2 | 4/2007 | Jackson et al. |
| 7,222,852 B2 | 5/2007 | Soltys et al. |
| 7,222,855 B2 | 5/2007 | Sorge |
| 7,231,812 B1 | 6/2007 | Lagare |
| 7,234,698 B2 | 6/2007 | Grauzer et al. |
| 7,237,969 B2 | 7/2007 | Bartman |
| 7,243,148 B2 | 7/2007 | Keir et al. |
| 7,243,698 B2 | 7/2007 | Siegel |
| 7,246,799 B2 | 7/2007 | Snow |
| 7,255,642 B2 | 8/2007 | Sines et al. |
| 7,257,630 B2 | 8/2007 | Cole et al. |
| 7,264,241 B2 | 9/2007 | Schubert et al. |
| 7,264,243 B2 | 9/2007 | Yoseloff et al. |
| 7,277,570 B2 | 10/2007 | Armstrong |
| 7,278,923 B2 | 10/2007 | Grauzer et al. |
| 7,294,056 B2 | 11/2007 | Lowell et al. |
| 7,297,062 B2 | 11/2007 | Gatto et al. |
| 7,300,056 B2 | 11/2007 | Gioia et al. |
| 7,303,473 B2 | 12/2007 | Rowe |
| 7,303,475 B2 | 12/2007 | Britt et al. |
| 7,309,065 B2 | 12/2007 | Yoseloff et al. |
| 7,316,609 B2 | 1/2008 | Dunn et al. |
| 7,331,579 B2 | 2/2008 | Snow |
| 7,334,794 B2 | 2/2008 | Snow |
| 7,338,044 B2 | 3/2008 | Grauzer et al. |
| 7,338,362 B1 | 3/2008 | Gallagher |
| 7,341,510 B2 | 3/2008 | Bourbour et al. |
| D566,784 S | 4/2008 | Palmer |
| 7,357,321 B2 | 4/2008 | Yoshida et al. |
| 7,360,094 B2 | 4/2008 | Neff |
| 7,367,561 B2 | 5/2008 | Blaha et al. |
| 7,367,563 B2 | 5/2008 | Yoseloff et al. |
| 7,367,565 B2 | 5/2008 | Chiu |
| 7,367,884 B2 | 5/2008 | Breeding et al. |
| 7,384,044 B2 | 6/2008 | Grauzer et al. |
| 7,387,300 B2 | 6/2008 | Snow |
| 7,389,990 B2 | 6/2008 | Mourad |
| 7,399,226 B2 | 7/2008 | Mishra |
| 7,407,438 B2 | 8/2008 | Schubert et al. |
| 7,436,957 B1 | 10/2008 | Fischer et al. |
| 7,448,626 B2 | 11/2008 | Fleckenstein |
| 7,458,582 B2 | 12/2008 | Snow et al. |
| 7,461,843 B1 | 12/2008 | Baker et al. |
| 7,464,932 B2 | 12/2008 | Darling |
| 7,464,934 B2 | 12/2008 | Schwartz |
| 7,472,906 B2 | 1/2009 | Shai |
| 7,478,813 B1 | 1/2009 | Hofferber et al. |
| 7,500,672 B2 | 3/2009 | Ho |
| 7,506,874 B2 | 3/2009 | Hall |
| 7,510,186 B2 | 3/2009 | Fleckenstein |
| 7,510,190 B2 | 3/2009 | Snow et al. |
| 7,510,194 B2 | 3/2009 | Soltys et al. |
| 7,510,478 B2 | 3/2009 | Benbrahim et al. |
| 7,513,437 B2 | 4/2009 | Douglas |
| 7,515,718 B2 | 4/2009 | Nguyen et al. |
| 7,523,935 B2 | 4/2009 | Grauzer et al. |
| 7,523,936 B2 | 4/2009 | Grauzer et al. |
| 7,523,937 B2 | 4/2009 | Fleckenstein |
| 7,525,510 B2 | 4/2009 | Beland et al. |
| 7,540,498 B2 | 6/2009 | Crenshaw et al. |
| 7,549,643 B2 | 6/2009 | Quach |
| 7,554,753 B2 | 6/2009 | Wakamiya |
| 7,556,197 B2 | 7/2009 | Yoshida et al. |
| 7,575,237 B2 | 8/2009 | Snow |
| 7,578,506 B2 | 8/2009 | Lambert |
| 7,584,963 B2 | 9/2009 | Krenn et al. |
| 7,584,966 B2 | 9/2009 | Snow |
| 7,591,728 B2 | 9/2009 | Gioia et al. |
| 7,597,623 B2 | 10/2009 | Grauzer et al. |
| 7,644,923 B1 | 1/2010 | Dickinson et al. |
| 7,661,676 B2 | 2/2010 | Smith et al. |
| 7,666,090 B2 | 2/2010 | Hettinger |
| 7,669,853 B2 | 3/2010 | Jones |
| 7,686,681 B2 | 3/2010 | Soltys et al. |
| 7,740,244 B2 | 6/2010 | Ho |
| 7,744,452 B2 | 6/2010 | Cimring et al. |
| 7,753,374 B2 | 7/2010 | Ho |
| 7,758,425 B2 | 7/2010 | Poh et al. |
| 7,762,554 B2 | 7/2010 | Ho |
| 7,766,332 B2 | 8/2010 | Grauzer et al. |
| 7,766,333 B1 | 8/2010 | Stardust et al. |
| 7,769,853 B2 | 8/2010 | Nezamzadeh |
| 7,773,749 B1 | 8/2010 | Durst et al. |
| 7,780,529 B2 | 8/2010 | Rowe et al. |
| 7,784,790 B2 | 8/2010 | Grauzer et al. |
| 7,804,982 B2 | 9/2010 | Howard et al. |
| 7,824,255 B2 | 11/2010 | Lutnick et al. |
| 7,846,020 B2 | 12/2010 | Walker et al. |
| 7,874,559 B1 | 1/2011 | Tseng |
| 7,890,365 B2 | 2/2011 | Hettinger |
| 7,900,923 B2 | 3/2011 | Toyama et al. |
| 7,908,169 B2 | 3/2011 | Hettinger |
| 7,931,533 B2 | 4/2011 | Lemay et al. |
| 7,946,586 B2 | 5/2011 | Krenn et al. |
| 7,959,153 B2 | 6/2011 | Franks, Jr. |
| 7,976,023 B1 | 7/2011 | Hessing et al. |
| 7,988,554 B2 | 8/2011 | Lemay et al. |
| 7,995,196 B1 | 8/2011 | Fraser |
| 8,002,638 B2 | 8/2011 | Grauzer et al. |
| 8,011,661 B2 | 9/2011 | Stasson |
| 8,016,663 B2 | 9/2011 | Soltys et al. |
| 8,021,231 B2 | 9/2011 | Walker et al. |
| 8,025,294 B2 | 9/2011 | Grauzer et al. |
| 8,038,521 B2 | 10/2011 | Grauzer et al. |
| RE42,944 E | 11/2011 | Blaha et al. |
| 8,057,302 B2 | 11/2011 | Wells et al. |
| 8,062,134 B2 | 11/2011 | Kelly et al. |
| 8,070,574 B2 | 12/2011 | Grauzer et al. |
| 8,092,307 B2 | 1/2012 | Kelly |
| 8,109,514 B2 | 2/2012 | Toyama |
| 8,150,158 B2 | 4/2012 | Downs, III |
| 8,171,567 B1 | 5/2012 | Fraser et al. |
| 8,210,536 B2 | 7/2012 | Blaha et al. |

(56) References Cited

U.S. PATENT DOCUMENTS

| | | |
|---|---|---|
| 8,251,293 B2 | 8/2012 | Nagata et al. |
| 8,251,802 B2 | 8/2012 | Snow |
| 8,270,603 B1 | 9/2012 | Durst et al. |
| 8,287,347 B2 | 10/2012 | Snow et al. |
| 8,287,386 B2 | 10/2012 | Miller et al. |
| 8,319,666 B2 | 11/2012 | Weinmann et al. |
| 8,342,525 B2 | 1/2013 | Scheper et al. |
| 8,342,526 B1 | 1/2013 | Sampson et al. |
| 8,342,529 B2 | 1/2013 | Snow |
| 8,353,513 B2 | 1/2013 | Swanson |
| 8,408,551 B2 | 4/2013 | Soltys |
| 8,419,016 B2 | 4/2013 | Yoseloff et al. |
| 8,419,521 B2 | 4/2013 | Grauzer et al. |
| 8,429,229 B2 | 4/2013 | Sepich et al. |
| 8,444,489 B2 | 5/2013 | Lian et al. |
| 8,475,252 B2 | 7/2013 | Savage et al. |
| 8,498,444 B2 | 7/2013 | Sharma |
| 8,505,916 B2 | 8/2013 | Grauzer et al. |
| 8,511,684 B2 | 8/2013 | Grauzer et al. |
| 8,512,146 B2 | 8/2013 | Gururajan et al. |
| 8,548,327 B2 | 10/2013 | Hirth et al. |
| 8,550,464 B2 | 10/2013 | Soltys et al. |
| 8,556,263 B2 | 10/2013 | Grauzer et al. |
| 8,579,289 B2 | 11/2013 | Rynda et al. |
| 8,590,895 B2 | 11/2013 | Kwon |
| RE44,616 E | 12/2013 | Blaha et al. |
| 8,602,416 B2 | 12/2013 | Toyama |
| 8,616,552 B2 | 12/2013 | Czyzewski et al. |
| 8,662,500 B2 | 3/2014 | Swanson |
| 8,695,978 B1 | 4/2014 | Ho |
| 8,702,100 B2 | 4/2014 | Snow et al. |
| 8,702,101 B2 | 4/2014 | Scheper et al. |
| 8,720,891 B2 | 5/2014 | Hessing et al. |
| 8,758,111 B2 | 6/2014 | Lutnick |
| 8,777,727 B2 | 7/2014 | Jones |
| 8,820,745 B2 | 9/2014 | Grauzer et al. |
| 8,844,931 B2 | 9/2014 | Blaha et al. |
| 8,919,775 B2 | 12/2014 | Wadds et al. |
| 8,998,211 B2 | 4/2015 | Grauzer et al. |
| 9,101,821 B2 | 8/2015 | Snow |
| 9,220,972 B2 | 12/2015 | Grauzer et al. |
| 9,251,661 B2 | 2/2016 | Tammesoo |
| 9,254,435 B2 | 2/2016 | Miller et al. |
| 9,266,012 B2 | 2/2016 | Grauzer et al. |
| 9,280,866 B2 | 3/2016 | Nayak et al. |
| 9,316,597 B2 | 4/2016 | Blazevic |
| 9,378,766 B2 | 6/2016 | Kelly et al. |
| 9,387,390 B2 | 7/2016 | Downs et al. |
| 9,474,957 B2 | 10/2016 | Haushalter et al. |
| 9,504,905 B2 | 11/2016 | Kelly et al. |
| 9,511,274 B2 | 12/2016 | Kelly et al. |
| 9,566,501 B2 | 2/2017 | Stasson et al. |
| 9,573,047 B1 | 2/2017 | Riordan et al. |
| 9,679,603 B2 | 6/2017 | Kelly et al. |
| 9,713,761 B2 | 7/2017 | Sampson et al. |
| 9,764,221 B2 | 9/2017 | Swanson |
| 9,849,368 B2 | 12/2017 | Stasson et al. |
| 9,901,810 B2 | 2/2018 | Rynda et al. |
| 9,908,034 B2 | 3/2018 | Downs et al. |
| 10,092,820 B2 | 10/2018 | Riordan et al. |
| 10,124,241 B2 | 11/2018 | Stasson et al. |
| 10,238,954 B2 | 3/2019 | Stasson et al. |
| 10,486,055 B2 | 11/2019 | Kelly et al. |
| 10,668,361 B2 | 6/2020 | Stasson et al. |
| 10,857,448 B2 | 12/2020 | Kelly et al. |
| 10,926,164 B2 | 2/2021 | Rynda et al. |
| 11,173,383 B2 | 11/2021 | Krenn et al. |
| 11,358,051 B2 | 6/2022 | Kelly et al. |
| 2001/0035604 A1 | 11/2001 | Jones |
| 2001/0036231 A1 | 11/2001 | Easwar et al. |
| 2001/0036866 A1 | 11/2001 | Stockdale et al. |
| 2001/0054576 A1 | 12/2001 | Stardust et al. |
| 2002/0017481 A1 | 2/2002 | Johnson et al. |
| 2002/0045478 A1 | 4/2002 | Soltys et al. |
| 2002/0045481 A1 | 4/2002 | Soltys et al. |
| 2002/0063389 A1 | 5/2002 | Breeding et al. |
| 2002/0070499 A1 | 6/2002 | Breeding et al. |
| 2002/0094869 A1 | 7/2002 | Harkham |
| 2002/0107067 A1 | 8/2002 | McGlone et al. |
| 2002/0107072 A1 | 8/2002 | Giobbi |
| 2002/0113368 A1 | 8/2002 | Hessing et al. |
| 2002/0135692 A1 | 9/2002 | Fujinawa |
| 2002/0142820 A1 | 10/2002 | Bartlett |
| 2002/0155869 A1 | 10/2002 | Soltys et al. |
| 2002/0163122 A1 | 11/2002 | Vancura |
| 2002/0163125 A1 | 11/2002 | Grauzer et al. |
| 2002/0187821 A1 | 12/2002 | Soltys et al. |
| 2002/0187830 A1 | 12/2002 | Stockdale et al. |
| 2003/0003997 A1 | 1/2003 | Vuong et al. |
| 2003/0007143 A1 | 1/2003 | McArthur et al. |
| 2003/0042673 A1 | 3/2003 | Grauzer et al. |
| 2003/0048476 A1 | 3/2003 | Yamakawa |
| 2003/0052449 A1 | 3/2003 | Grauzer et al. |
| 2003/0052450 A1 | 3/2003 | Grauzer et al. |
| 2003/0064798 A1 | 4/2003 | Grauzer et al. |
| 2003/0067112 A1 | 4/2003 | Grauzer et al. |
| 2003/0073498 A1 | 4/2003 | Grauzer et al. |
| 2003/0075865 A1 | 4/2003 | Grauzer et al. |
| 2003/0087694 A1 | 5/2003 | Storch |
| 2003/0090059 A1 | 5/2003 | Grauzer et al. |
| 2003/0094756 A1 | 5/2003 | Grauzer et al. |
| 2003/0151194 A1 | 8/2003 | Hessing et al. |
| 2003/0195025 A1 | 10/2003 | Hill |
| 2004/0015423 A1 | 1/2004 | Walker et al. |
| 2004/0067789 A1 | 4/2004 | Grauzer et al. |
| 2004/0100026 A1 | 5/2004 | Haggard |
| 2004/0108255 A1 | 6/2004 | Johnson |
| 2004/0108654 A1 | 6/2004 | Grauzer et al. |
| 2004/0116179 A1 | 6/2004 | Nicely et al. |
| 2004/0180722 A1 | 9/2004 | Giobbi |
| 2004/0224777 A1 | 11/2004 | Smith et al. |
| 2004/0245720 A1 | 12/2004 | Grauzer et al. |
| 2004/0259618 A1 | 12/2004 | Soltys et al. |
| 2005/0012671 A1 | 1/2005 | Bisig |
| 2005/0012818 A1 | 1/2005 | Kiely et al. |
| 2005/0026680 A1 | 2/2005 | Gururajan |
| 2005/0035548 A1 | 2/2005 | Yoseloff et al. |
| 2005/0037843 A1 | 2/2005 | Wells et al. |
| 2005/0040594 A1 | 2/2005 | Krenn et al. |
| 2005/0051955 A1 | 3/2005 | Schubert et al. |
| 2005/0051956 A1 | 3/2005 | Grauzer et al. |
| 2005/0062227 A1 | 3/2005 | Grauzer et al. |
| 2005/0062228 A1 | 3/2005 | Grauzer et al. |
| 2005/0062229 A1 | 3/2005 | Grauzer et al. |
| 2005/0082750 A1 | 4/2005 | Grauzer et al. |
| 2005/0093231 A1 | 5/2005 | Grauzer et al. |
| 2005/0104289 A1 | 5/2005 | Grauzer et al. |
| 2005/0104290 A1 | 5/2005 | Grauzer et al. |
| 2005/0110210 A1 | 5/2005 | Soltys et al. |
| 2005/0113166 A1 | 5/2005 | Grauzer et al. |
| 2005/0113171 A1 | 5/2005 | Hodgson |
| 2005/0119048 A1 | 6/2005 | Soltys et al. |
| 2005/0121852 A1 | 6/2005 | Soltys et al. |
| 2005/0137005 A1 | 6/2005 | Soltys et al. |
| 2005/0140090 A1 | 6/2005 | Breeding et al. |
| 2005/0148391 A1 | 7/2005 | Tain |
| 2005/0164759 A1 | 7/2005 | Smith et al. |
| 2005/0164761 A1 | 7/2005 | Tain |
| 2005/0192092 A1 | 9/2005 | Breckner et al. |
| 2005/0206077 A1 | 9/2005 | Grauzer et al. |
| 2005/0242500 A1 | 11/2005 | Downs, III |
| 2005/0272501 A1 | 12/2005 | Tran et al. |
| 2005/0277463 A1 | 12/2005 | Knust et al. |
| 2005/0288083 A1 | 12/2005 | Downs, III |
| 2005/0288086 A1 | 12/2005 | Schubert et al. |
| 2006/0027970 A1 | 2/2006 | Kyrychenko |
| 2006/0033269 A1 | 2/2006 | Grauzer et al. |
| 2006/0033270 A1 | 2/2006 | Grauzer et al. |
| 2006/0046853 A1 | 3/2006 | Black |
| 2006/0055114 A1 | 3/2006 | White et al. |
| 2006/0063577 A1 | 3/2006 | Downs et al. |
| 2006/0066048 A1 | 3/2006 | Krenn et al. |
| 2006/0084502 A1 | 4/2006 | Downs et al. |
| 2006/0151946 A1 | 7/2006 | Ngai |

(56) References Cited

U.S. PATENT DOCUMENTS

| | | |
|---|---|---|
| 2006/0181022 A1 | 8/2006 | Grauzer et al. |
| 2006/0183540 A1 | 8/2006 | Grauzer et al. |
| 2006/0189381 A1 | 8/2006 | Daniel et al. |
| 2006/0199649 A1 | 9/2006 | Soltys et al. |
| 2006/0205508 A1 | 9/2006 | Green |
| 2006/0220312 A1 | 10/2006 | Baker et al. |
| 2006/0220313 A1 | 10/2006 | Baker et al. |
| 2006/0252521 A1 | 11/2006 | Gururajan et al. |
| 2006/0252554 A1 | 11/2006 | Gururajan et al. |
| 2006/0258427 A1 | 11/2006 | Rowe et al. |
| 2006/0279040 A1 | 12/2006 | Downs et al. |
| 2007/0001395 A1 | 1/2007 | Gioia et al. |
| 2007/0006708 A1 | 1/2007 | Laakso |
| 2007/0015583 A1 | 1/2007 | Tran |
| 2007/0018389 A1 | 1/2007 | Downs, III |
| 2007/0045959 A1 | 3/2007 | Soltys |
| 2007/0049368 A1 | 3/2007 | Kuhn et al. |
| 2007/0057454 A1 | 3/2007 | Fleckenstein |
| 2007/0057469 A1 | 3/2007 | Grauzer et al. |
| 2007/0066387 A1 | 3/2007 | Matsuno et al. |
| 2007/0069462 A1 | 3/2007 | Downs et al. |
| 2007/0072677 A1 | 3/2007 | Lavoie et al. |
| 2007/0111773 A1 | 5/2007 | Gururajan et al. |
| 2007/0148283 A1 | 6/2007 | Harvey et al. |
| 2007/0184905 A1 | 8/2007 | Gatto et al. |
| 2007/0197294 A1 | 8/2007 | Gong |
| 2007/0197298 A1 | 8/2007 | Rowe |
| 2007/0202941 A1 | 8/2007 | Miltenberger et al. |
| 2007/0222147 A1 | 9/2007 | Blaha et al. |
| 2007/0225055 A1 | 9/2007 | Weisman |
| 2007/0233567 A1 | 10/2007 | Daly |
| 2007/0238506 A1 | 10/2007 | Ruckle |
| 2007/0241498 A1 | 10/2007 | Soltys |
| 2007/0259709 A1 | 11/2007 | Kelly et al. |
| 2007/0267812 A1 | 11/2007 | Grauzer et al. |
| 2007/0272600 A1 | 11/2007 | Johnson |
| 2007/0287534 A1 | 12/2007 | Fleckenstein |
| 2007/0290438 A1 | 12/2007 | Grauzer et al. |
| 2007/0298865 A1 | 12/2007 | Soltys |
| 2008/0004107 A1 | 1/2008 | Nguyen et al. |
| 2008/0022415 A1 | 1/2008 | Kuo et al. |
| 2008/0032763 A1 | 2/2008 | Giobbi |
| 2008/0039192 A1 | 2/2008 | Laut |
| 2008/0039208 A1 | 2/2008 | Abrink et al. |
| 2008/0076506 A1 | 3/2008 | Nguyen et al. |
| 2008/0096656 A1 | 4/2008 | Lemay et al. |
| 2008/0111300 A1 | 5/2008 | Czyzewski et al. |
| 2008/0113783 A1 | 5/2008 | Czyzewski et al. |
| 2008/0136108 A1 | 6/2008 | Polay |
| 2008/0143048 A1 | 6/2008 | Shigeta |
| 2008/0176627 A1 | 7/2008 | Lardie |
| 2008/0217218 A1 | 9/2008 | Johnson |
| 2008/0234046 A1 | 9/2008 | Kinsley |
| 2008/0234047 A1 | 9/2008 | Nguyen |
| 2008/0248875 A1 | 10/2008 | Beatty |
| 2008/0284096 A1 | 11/2008 | Toyama et al. |
| 2008/0315517 A1 | 12/2008 | Toyama |
| 2009/0026700 A2 | 1/2009 | Shigeta |
| 2009/0048026 A1 | 2/2009 | French |
| 2009/0054161 A1 | 2/2009 | Schubert et al. |
| 2009/0072477 A1 | 3/2009 | Tseng |
| 2009/0091078 A1 | 4/2009 | Grauzer et al. |
| 2009/0100409 A1 | 4/2009 | Toneguzzo |
| 2009/0104963 A1 | 4/2009 | Burman et al. |
| 2009/0121429 A1 | 5/2009 | Walsh |
| 2009/0134575 A1 | 5/2009 | Dickinson et al. |
| 2009/0140492 A1 | 6/2009 | Yoseloff et al. |
| 2009/0166970 A1 | 7/2009 | Rosh |
| 2009/0176547 A1 | 7/2009 | Katz |
| 2009/0179378 A1 | 7/2009 | Amaitis et al. |
| 2009/0186676 A1 | 7/2009 | Amaitis et al. |
| 2009/0191933 A1 | 7/2009 | French |
| 2009/0194988 A1 | 8/2009 | Wright et al. |
| 2009/0197662 A1 | 8/2009 | Wright et al. |
| 2009/0227318 A1 | 9/2009 | Wright et al. |
| 2009/0227360 A1 | 9/2009 | Gioia et al. |
| 2009/0243213 A1 | 10/2009 | Pececnik et al. |
| 2009/0250873 A1 | 10/2009 | Jones |
| 2009/0253478 A1 | 10/2009 | Walker et al. |
| 2009/0253503 A1 | 10/2009 | Krise et al. |
| 2009/0267297 A1 | 10/2009 | Blaha et al. |
| 2009/0283969 A1 | 11/2009 | Tseng |
| 2009/0298577 A1 | 12/2009 | Gagner et al. |
| 2009/0302535 A1 | 12/2009 | Ho |
| 2009/0302537 A1 | 12/2009 | Ho |
| 2009/0312093 A1 | 12/2009 | Walker et al. |
| 2009/0314188 A1 | 12/2009 | Toyama et al. |
| 2010/0013152 A1 | 1/2010 | Grauzer et al. |
| 2010/0016050 A1 | 1/2010 | Snow et al. |
| 2010/0038849 A1 | 2/2010 | Scheper et al. |
| 2010/0048304 A1 | 2/2010 | Boesen |
| 2010/0069155 A1 | 3/2010 | Schwartz et al. |
| 2010/0178987 A1 | 7/2010 | Pacey |
| 2010/0197410 A1 | 8/2010 | Leen et al. |
| 2010/0234110 A1 | 9/2010 | Clarkson |
| 2010/0240440 A1 | 9/2010 | Szrek et al. |
| 2010/0244376 A1 | 9/2010 | Johnson |
| 2010/0244382 A1 | 9/2010 | Snow |
| 2010/0252992 A1 | 10/2010 | Sines |
| 2010/0255899 A1 | 10/2010 | Paulsen |
| 2010/0276880 A1 | 11/2010 | Grauzer et al. |
| 2010/0311493 A1 | 12/2010 | Miller et al. |
| 2010/0311494 A1 | 12/2010 | Miller et al. |
| 2010/0314830 A1 | 12/2010 | Grauzer et al. |
| 2010/0320685 A1 | 12/2010 | Grauzer et al. |
| 2011/0006480 A1 | 1/2011 | Grauzer et al. |
| 2011/0012303 A1 | 1/2011 | Kourgiantakis et al. |
| 2011/0024981 A1 | 2/2011 | Tseng |
| 2011/0052049 A1 | 3/2011 | Rajaraman et al. |
| 2011/0062662 A1 | 3/2011 | Ohta et al. |
| 2011/0078096 A1 | 3/2011 | Bounds |
| 2011/0079959 A1 | 4/2011 | Hartley |
| 2011/0105208 A1 | 5/2011 | Bickley |
| 2011/0130185 A1 | 6/2011 | Walker |
| 2011/0130190 A1 | 6/2011 | Hamman et al. |
| 2011/0159952 A1 | 6/2011 | Kerr |
| 2011/0159953 A1 | 6/2011 | Kerr |
| 2011/0165936 A1 | 7/2011 | Kerr |
| 2011/0172008 A1 | 7/2011 | Alderucci |
| 2011/0183748 A1 | 7/2011 | Wilson et al. |
| 2011/0230148 A1 | 9/2011 | Demuynck et al. |
| 2011/0230268 A1 | 9/2011 | Williams |
| 2011/0269529 A1 | 11/2011 | Baerlocher |
| 2011/0272881 A1 | 11/2011 | Sines |
| 2011/0285081 A1 | 11/2011 | Stasson |
| 2011/0285082 A1 | 11/2011 | Krenn et al. |
| 2011/0287829 A1 | 11/2011 | Clarkson et al. |
| 2012/0015724 A1 | 1/2012 | Ocko et al. |
| 2012/0015725 A1 | 1/2012 | Ocko et al. |
| 2012/0015743 A1 | 1/2012 | Lam et al. |
| 2012/0015747 A1 | 1/2012 | Ocko et al. |
| 2012/0021835 A1 | 1/2012 | Keller et al. |
| 2012/0034977 A1 | 2/2012 | Kammler |
| 2012/0062745 A1 | 3/2012 | Han et al. |
| 2012/0074646 A1 | 3/2012 | Grauzer et al. |
| 2012/0091656 A1 | 4/2012 | Blaha et al. |
| 2012/0095982 A1 | 4/2012 | Lennington et al. |
| 2012/0161393 A1 | 6/2012 | Krenn et al. |
| 2012/0175841 A1 | 7/2012 | Grauzer et al. |
| 2012/0181747 A1 | 7/2012 | Grauzer et al. |
| 2012/0187625 A1 | 7/2012 | Downs et al. |
| 2012/0242782 A1 | 9/2012 | Huang |
| 2012/0286471 A1 | 11/2012 | Grauzer et al. |
| 2012/0306152 A1 | 12/2012 | Krishnamurty et al. |
| 2013/0020761 A1 | 1/2013 | Sines et al. |
| 2013/0023318 A1 | 1/2013 | Abrahamson |
| 2013/0026709 A1 | 1/2013 | Sampson et al. |
| 2013/0085638 A1 | 4/2013 | Weinmann et al. |
| 2013/0109455 A1 | 5/2013 | Grauzer et al. |
| 2013/0132306 A1 | 5/2013 | Kami et al. |
| 2013/0147116 A1 | 6/2013 | Stasson |
| 2013/0161905 A1 | 6/2013 | Grauzer et al. |
| 2013/0228972 A1 | 9/2013 | Grauzer et al. |
| 2013/0241147 A1 | 9/2013 | Mcgrath |

(56) References Cited

U.S. PATENT DOCUMENTS

| | | |
|---|---|---|
| 2013/0300059 A1 | 11/2013 | Sampson et al. |
| 2013/0337922 A1 | 12/2013 | Kuhn et al. |
| 2014/0027979 A1 | 1/2014 | Stasson et al. |
| 2014/0094239 A1 | 4/2014 | Grauzer et al. |
| 2014/0103606 A1 | 4/2014 | Grauzer et al. |
| 2014/0138907 A1 | 5/2014 | Rynda et al. |
| 2014/0145399 A1 | 5/2014 | Krenn et al. |
| 2014/0171170 A1 | 6/2014 | Krishnamurty et al. |
| 2014/0175724 A1 | 6/2014 | Huhtala et al. |
| 2014/0183818 A1 | 7/2014 | Czyzewski et al. |
| 2014/0309006 A1 | 10/2014 | Shigeta |
| 2014/0346732 A1 | 11/2014 | Blaha et al. |
| 2015/0014926 A1 | 1/2015 | Scheper et al. |
| 2015/0021242 A1 | 1/2015 | Johnson |
| 2015/0069699 A1 | 3/2015 | Blazevic |
| 2015/0097335 A1 | 4/2015 | Shigeta |
| 2015/0196833 A1 | 7/2015 | Scheper et al. |
| 2015/0196834 A1 | 7/2015 | Scheper et al. |
| 2015/0238848 A1 | 8/2015 | Kuhn et al. |
| 2015/0251079 A1 | 9/2015 | Wright |
| 2015/0290528 A1 | 10/2015 | Sampson et al. |
| 2015/0290529 A1 | 10/2015 | Bourbour et al. |
| 2015/0375096 A1 | 12/2015 | Jackson et al. |
| 2016/0014351 A1 | 1/2016 | Blazevic |
| 2016/0220893 A1 | 8/2016 | Czyzewski et al. |
| 2017/0087445 A1 | 3/2017 | Stasson et al. |
| 2017/0157499 A1 | 6/2017 | Krenn et al. |
| 2017/0216713 A1 | 8/2017 | Scheper et al. |
| 2018/0043241 A1 | 2/2018 | Blaha et al. |
| 2018/0085658 A1 | 3/2018 | Helsen et al. |
| 2018/0089956 A1 | 3/2018 | Nagaragatta et al. |
| 2018/0200610 A1 | 7/2018 | Riordan et al. |
| 2018/0207514 A1 | 7/2018 | Blaha et al. |
| 2018/0290048 A1 | 10/2018 | Krenn et al. |
| 2020/0086203 A1 | 3/2020 | Scheper et al. |
| 2021/0101071 A1 | 4/2021 | Krenn et al. |

FOREIGN PATENT DOCUMENTS

| | | |
|---|---|---|
| AU | 06978/05 B2 | 10/1998 |
| AU | 0757636 B2 | 2/2003 |
| CA | 2266555 A1 | 4/1998 |
| CA | 2284017 C | 5/2006 |
| CA | 2612138 A1 | 12/2006 |
| CA | 2823738 A1 | 2/2015 |
| CA | 2669167 C | 5/2016 |
| CN | 2051521 U | 1/1990 |
| CN | 1341245 A | 3/2002 |
| CN | 1383099 A | 12/2002 |
| CN | 1531703 A | 9/2004 |
| CN | 1824356 A | 8/2006 |
| CN | 1882377 A | 12/2006 |
| CN | 2848303 Y | 12/2006 |
| CN | 2855481 Y | 1/2007 |
| CN | 1933881 A | 3/2007 |
| CN | 2877425 Y | 3/2007 |
| CN | 101025603 A | 8/2007 |
| CN | 101044520 A | 9/2007 |
| CN | 200954370 Y | 10/2007 |
| CN | 200987893 Y | 12/2007 |
| CN | 101099896 A | 1/2008 |
| CN | 101127131 A | 2/2008 |
| CN | 101134141 A | 3/2008 |
| CN | 101176126 A | 5/2008 |
| CN | 201085907 Y | 7/2008 |
| CN | 201132058 Y | 10/2008 |
| CN | 201139926 Y | 10/2008 |
| CN | 101437586 A | 5/2009 |
| CN | 101541388 A | 9/2009 |
| CN | 100571826 C | 12/2009 |
| CN | 101711177 A | 5/2010 |
| CN | 1771077 B | 6/2010 |
| CN | 201832397 U | 5/2011 |
| CN | 102089046 A | 6/2011 |
| CN | 102125756 A | 7/2011 |
| CN | 102170944 A | 8/2011 |
| CN | 101783011 B | 12/2011 |
| CN | 102847311 A | 1/2013 |
| CN | 202724641 U | 2/2013 |
| CN | 103118749 A | 5/2013 |
| CN | 103170132 A | 6/2013 |
| CN | 202983149 U | 6/2013 |
| CN | 104245064 A | 12/2014 |
| CN | 104415531 A | 3/2015 |
| CN | 103025393 B | 5/2015 |
| CZ | 0024952 U1 | 2/2013 |
| DE | 0291230 C | 4/1916 |
| DE | 2757341 A1 | 6/1978 |
| DE | 2816377 A1 | 10/1979 |
| DE | 3807127 A1 | 9/1989 |
| EP | 0777514 B1 | 2/2000 |
| EP | 1194888 A1 | 4/2002 |
| EP | 1502631 A1 | 2/2005 |
| EP | 1713026 A1 | 10/2006 |
| EP | 2228106 A1 | 9/2010 |
| EP | 1575261 B1 | 8/2012 |
| FR | 2375918 A1 | 7/1978 |
| GB | 0289552 A | 4/1928 |
| GB | 0337147 A | 10/1930 |
| GB | 0414014 A | 7/1934 |
| GB | 0672616 A | 5/1952 |
| GB | 2382567 A | 6/2003 |
| JP | 10-063933 A | 3/1998 |
| JP | 11-045321 A | 2/1999 |
| JP | 2000-251031 A | 9/2000 |
| JP | 2001-327647 A | 11/2001 |
| JP | 2002-165916 A | 6/2002 |
| JP | 2003-154320 A | 5/2003 |
| JP | 2003-250950 A | 9/2003 |
| JP | 2005-198668 A | 7/2005 |
| JP | 2006-092140 A | 4/2006 |
| JP | 2008-246061 A | 10/2008 |
| JP | 2010-076204 A | 4/2010 |
| JP | 4586474 B2 | 11/2010 |
| JP | 2013262157 A † | 12/2013 |
| KR | 2018-0090299 A | 8/2018 |
| TW | M335308 U | 7/2008 |
| TW | M357307 U | 5/2009 |
| TW | M359356 U | 6/2009 |
| TW | M402125 U | 4/2011 |
| TW | I345476 B | 7/2011 |
| TW | 201221189 A | 6/2012 |
| TW | 201330906 A | 8/2013 |
| TW | 201410303 A | 3/2014 |
| TW | I468209 B | 1/2015 |
| TW | 1481436 B | 4/2015 |
| WO | 87/00445 A1 | 1/1987 |
| WO | 87/00764 A1 | 2/1987 |
| WO | 92/21413 A1 | 12/1992 |
| WO | 95/28210 A1 | 10/1995 |
| WO | 96/07153 A1 | 3/1996 |
| WO | 97/10577 A1 | 3/1997 |
| WO | 98/14249 A1 | 4/1998 |
| WO | 98/40136 A1 | 9/1998 |
| WO | 99/43404 A1 | 9/1999 |
| WO | 99/52610 A1 | 10/1999 |
| WO | 99/52611 A1 | 10/1999 |
| WO | 00/51076 A1 | 8/2000 |
| WO | 01/56670 A1 | 8/2001 |
| WO | 02/05914 A1 | 1/2002 |
| WO | 01/78854 A3 | 2/2002 |
| WO | WO02064225 A1 † | 8/2002 |
| WO | 2003/004116 A1 | 1/2003 |
| WO | 03/26763 A1 | 4/2003 |
| WO | 2004/067889 A1 | 8/2004 |
| WO | 2004/112923 A1 | 12/2004 |
| WO | 2006/031472 A2 | 3/2006 |
| WO | 06/39308 A2 | 4/2006 |
| WO | 2007/117268 A1 | 10/2007 |
| WO | 2008/005285 A2 | 1/2008 |
| WO | 2008/005286 A2 | 1/2008 |
| WO | 2008/006023 A2 | 1/2008 |
| WO | 2008/091809 A2 | 7/2008 |
| WO | 2009/067758 A1 | 6/2009 |

(56) References Cited

FOREIGN PATENT DOCUMENTS

| | | |
|---|---|---|
| WO | 2009/137541 A2 | 11/2009 |
| WO | 2010/001032 A1 | 1/2010 |
| WO | 2010/041860 A2 | 4/2010 |
| WO | 2010/052573 A2 | 5/2010 |
| WO | 2010/055328 A1 | 5/2010 |
| WO | 2010/117446 A1 | 10/2010 |
| WO | 2012/053074 A1 | 4/2012 |
| WO | 2013/019677 A1 | 2/2013 |
| WO | 2016/049619 A1 | 3/2016 |
| WO | 2016/058085 A9 | 5/2016 |

OTHER PUBLICATIONS

Canadian Office Action for Canadian Application No. 3,033,280, dated Sep. 13, 2021, 5 pages.
Chinese Office Action and Search Report from Chinese Application No. 201780059176.6, dated Mar. 3, 2022, 33 pages.
Chinese Office action for Chinese Application No. 201811037865X, dated Aug. 12, 2021, 33 pages.
Chinese Second Office Action from Chinese Application No. 2019800602026, dated Nov. 2, 2023, 23 pages.
Chinese Second Office Action from Chinese Application No. 2019800650034, dated Nov. 2, 2023, 22 pages.
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of (color pages, for clarity, Part 21 of 23 color copies from Binder 6).
Documents submitted in the case of *Shuffle Master, Inc.* v. *Card Aurstia, et al.*, Case No. CV-N-0508-HDM-(VPC) (Consolidated with Case No. CV-N-02-0244-ERC-(RAM)), May 6, 2003, Part 6 of 23 (Binder 3, 2 of 2).
International Written Opinion from International Application No. PCT/US2019/048442, mailed Jan. 28, 2020, 9 pages.
Korean Notice of Reasons for Rejection for Korean Application No. 10-2018-7018121, dated Feb. 19, 2024, 21 pgs.
PCT International Preliminary Examination Report for International Patent Application No. PCT/US02/31105 dated Jul. 28, 2004, 9 pages.
PCT International Search Report and Written Opinion for International Application No. PCT/US2007/022858, dated Mar. 7, 2008, 7 pages.
PCT International Search Report and Written Opinion of the International Searching Authority for PCT/US05/31400, dated Sep. 25, 2007, 12 pages.
PCT International Search Report and Written Opinion of the International Searching Authority for PCT/US11/59797, dated Mar. 27, 2012, 14 pages.
PCT International Search Report and Written Opinion of the International Searching Authority for PCT/US13/59665, dated Apr. 25, 2014, 21 pages.
PCT International Search Report and Written Opinion, PCT Application No. PCT/US2015/040196, mailed Jan. 15, 2016, 20 pages.
Plaintiffs Declaration of Lawrence Luciano in Opposition to Shuffle Master's Motion for Preliminary Injunction, *Card, LLC* v. *Shuffle Master, Inc.*, D. Nev. (No. CV-N-03-0244-ECR(RAM)), Nov. 24, 2003.
Taiwanese Office Action and Search Report from Taiwanese Application No. 106131789, dated May 27, 2022, 6 pages.
Taiwanese Search Report and Office Action from Taiwanese Application No. 112131907, dated May 27, 2024, 19 pages with English translation.
U.S. Patent Application filed Nov. 30, 2016, titled "Card Handling Devices and Related Assemblies and Components", to Helsen et al., 62 pages., U.S. Appl. No. 15/365,610.
U.S. Patent Application filed Sep. 26, 2016, tilled "Devices, Systems, and Related Methods for Real-Time Monitoring and Display of Related Data for Casino Gaming Devices", to Nagaragatta et al., 36 pages., U.S. Appl. No. 15/276,476.
United Kingdom Patent Search and Examination Report for Application No. GB02210890.6, dated Aug. 22, 2022, 3 pages.
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 5 of 23 (Binder 3, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 8 of 23 (Binder 4, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 9 of 23 (Binder 5 having no contents; Binder 6, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 1 of 23 (Master Index and Binder 1, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 10 of 23 (Binder 6, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 14 of 23 (Binder 8, 2 of 5).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 3 of 23 (Binder 2, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 4 of 23 (Binder 2, 2 of 2).
DVD Labeled "Exhibit 1". This is a DVD taken by Shuffle Master personnel of the live operation of a Card One2Six.(Trademark). Shuffler (Oct. 7, 2003).
DVD Labeled "Luciano Deci. Ex. K". This DVD includes the video taped live Declaration of Mr. Luciano taken during preparation of litigation (Oct. 23, 2003).
DVD Labeled "Morrill Deci. Ex. A". This DVD includes the video taped live Declaration of Mr. Robert Morrill, a lead trial counsel for the defense, taken during preparation for litigation. He is describing the operation of the Rohiejo Prototype device, (Jan. 15, 2004). DVD sent to US Postal Service with this PTO/SB/08.
DVD labeled Luciano Deci. Ex. Kis (see Binder 2-1, p. 215/237, Luciano Deci., para. 14): A video demonstration (11 minutes) of a Luciano Packaging prototype shuffler. DVD sent to US Postal Service with this PTO/SB/08 form.
DVD labeled Morrill Decl Ex. A is (see Binder 4-1, p. 149/206, Morrill Deck, para. 2.): A video (16 minutes) that the attorney for Card, Robert Morrill, made to describe the Roblejo prototype card shuffler. DVD sent to US Postal Service with this PTO/SB/08 form.
DVD labeled Solberg Deci. Ex. C, which is not a video at all, is (see Binder 4-1, p. 34/206, Solberg Deck, para.8): Computer source code for operating a computer-controlled card shuffler (an early Roblejo prototype card shuffler) and Descriptive comments of how the code works. DVD sent to US Postal Service with this PTC/SB/08 form.
Error Back propagation, http://willamelle.edu-gorr/classes/cs449/backprop.html(4 pages), Nov. 13, 2008.
European Communication pursuant to Article 94(3) EPC for European Application No. 15744793.9, dated Mar. 21, 2019, 5 pages.
European Communication pursuant to Article 94(3) EPC for European Application No. 17787629.9, dated Aug. 1, 2023, 7 pages.
European Examination Report for European Application No. 02780410, dated Aug. 9, 2011, 4 pages.
European Examination Report for European Application No. 07 853 071.4, dated Aug. 10, 2018, 7 pages.
European Examination Report for European Application No. 02780410, dated Jan. 25, 2010, 5 pages.
European Examination Report for European Patent Application No. 16168060.8, dated Feb. 22, 2018, 6 pages.

(56) References Cited

OTHER PUBLICATIONS

European Examination Report from European Application No. 17163607.9, dated Oct. 4, 2018, 3 pages.
European Extended Search Report and Written Opinion from European Application No. 18195983.4, dated Jan. 29, 2019, 10 pages.
European Extended Search Report from European Application No. 19209594.1, dated Feb. 28, 2020, 8 pages.
European Patent Application Search Report—European Patent Application No. 06772987.1, Dec. 10, 2009, 5 pages.
European Search and Opinion for European Application No. 19166074.5, dated Jul. 19, 2019, 7 pages.
European Search Report and Written Opinion from European Application No. 18199796.6, dated Apr. 5, 2019, 6 pages.
European Search Report for European Application No. 17163607.9 dated Sep. 15, 2017, 6 pages.
European Search Report for European Application No. 12152303, dated Apr. 16, 2012, 3 pages.
Fine, Randall A., "Talking Tables", dated Apr. 25, 2012. Global Gaming Business Magazine, vol. 11, No. 5, May 2012. Retrieved on Oct. 3, 2016 from the Internet: <URL: https://ggbmagazine.com/issue/vol-11-no-5-may-2012/article/talking-ables> (4 pages).
Genevieve Orr, CS-449: Neural Networks Willamette University, http://www.willamette.edu/-gorr/classes/cs449/intro.html (4 pages), Fall 1999.
Gola, Steve; Deposition; *Shuffle Tech International v. Scientific Games Corp., et al.* 1:15-cv-3702 (N.D. HL); Oct. 13, 2016; pp. 1, 9-21, 30-69, 150-167, 186-188, 228-231, 290-315, 411; Henderson Legal Services, Inc.; Washington, DC.
Google search for card handling device with storage area, card removing system pivoting arm and processor., http://www.google.com/?tbm=pts&hl=en; Jul. 28, 2012.
Gros, Roger; New Card Management System to Be Tested at Bally's Park Place; Casino Journal; Apr. 1989; 5 pages.
http://www.google.com/search?tbm=pts&q=Card+handling+device+wilh+input+and-+outpu . . . , Jun. 8, 2012.
http://www.google.com/search?tbm=pts&q=shuffling+zone+onOopposite+site+of+input+ . . . Jul. 18, 2012.
http://www.ildado.com/casino_glossary.html, Feb. 1, 2001, p. 1-8.
https://web.archive.org/web/19991004000323/http://travelwizardtravel.com/majon.htm, Oct. 4, 1999, 2 pages.
I-Deal, Bally Technologies, Inc., (2014), 2 pages.
International Invitation to Pay Additional Fees and Partial Search Report for International Application PCT/US2019/048442, mailed Dec. 6, 2019, 10 pages.
International Preliminary Report on Patenlabilily, for International Application No. PCT/US2019/027460, dated, Mar. 9, 2021, 10 pages.
International Preliminary Report on Patenlability Chapter 1 for PCT/US19/50436, dated Mar. 16, 2021, 8 pages.
International Search Report from International Application No. PCT/EP2017/073865, mailed Mar. 2, 2018, 7 pages.
International Search Report from International Application No. PCT/IB2017/055810, mailed Jan. 8, 2018, 4 pages.
International Search Report from International Application No. PCT/US2019/027460, mailed Aug. 12, 2019, 4 pages.
International Search Report from International Application No. PCT/US2019/048442, mailed Jan. 28, 2020, 6 pages.
International Search Report from International Application No. PCT/US2019/050436, mailed Dec. 12, 2019, 4 pages.
International Written Opinion from International Application No. PCT/EP2017/073865, mailed Mar. 2, 2018, 12 pages.
International Written Opinion from International Application No. PCT/IB2017/055810, mailed Jan. 8, 2018, 8 pages.
International Written Opinion from International Application No. PCT/US2019/027460, mailed Aug. 12, 2019, 9 pages.
International Written Opinion from International Application No. PCT/US2019/050436, mailed Dec. 12, 2019, 7 pages.
Korean Request for Submission of an Opinion for Korean Application No. 10-2021-7010636, dated Aug. 3, 2023, 18 pages with English translation.
Lilwiller, Dave, CCD vs. CMOS: Facts and Fiction reprinted from Jan. 2001 Issue of Photonics Spectra, Laurin Publishing Co. Inc. (4 pages).
Macau Examination Report for Macau Application No. I/1380 dated Aug. 12, 2022, 14 pages with translation.
Macau Office Action and Search Report from Macau Application No. 1/1123, dated Feb. 14, 2019, 14 pages.
Macau Office Action and Search Report from Macau Application No. 1/1128, mailed Dec. 27, 2018, 18 pages.
Macau Office Action and Search Report from Macau Application No. 1/1240, dated Aug. 15, 2018, 14 pages with English translation.
Malaysian Patent Application Substantive Examination Adverse Report—Malaysian Patent Application Serial No. PI 20062710, May 9, 2009, 4 pages.
Neon Product Information Datasheets [online]. "Enterprise Casino Management, Table Management System, Mobile Baming". Intelligent Gaming, 2014. Retrieved on Oct. 12, 2016 from the Internet: <URL: http://www.intelligentgaming.co.jk/products/neon-enterprise/> (4 pages).
Olsen, Eddie; Automatic Shuffler 'ready' for Atlantic City experiment; Blackjack Confidential; Jul./Aug. 1989; pp. 6-7.
PCT International Search Report and Written Opinion for International Application No. PCT/US2007/023168, dated Sep. 12, 2008, 8 pages.
PCT International Search Report and Written Opinion for International Patent Application No. PCT/US2006/22911, dated Jun. 1, 2007, 6 pages.
PCT International Search Report and Written Opinion for PCT/US07/15035, dated Sep. 29, 2008, 6 pages.
PCT International Search Report and Written Opinion for PCT/US07/15036, dated Sep. 23, 2008, 6 pages.
PCT International Search Report and Written Opinion of the International Searching Authority for PCT/GB2011/051978, dated Jan. 17, 2012, 11 pages.
PCT International Search Report and Written Opinion of the International Searching Authority for PCT/US2008/007069, dated Sep. 8, 2008, 10 pages.
PCT International Search Report and Written Opinion of the International Searching Authority for PCT/US2010/001032, dated Jun. 16, 2010, 11 pages.
PCT International Search Report and Written Opinion of the International Searching Authority for PCT/IB2013/001756, dated Jan. 10, 2014, 7 pages.
PCT International Search Report and Written Opinion, PCT Application No. PCT/US2013/062391, dated Dec. 17, 2013, 13 pages.
PCT International Search Report and Written Opinion, PCT Application No. PCT/US2015/022158, mailed Jun. 17, 2015, 13 pages.
PCT International Search Report and Written Opinion, PCT Application No. PCT/US2015/025420, mailed Oct. 2, 2015, 15 pages.
PCT International Search Report and Written Opinion, PCT Application No. PCT/US2015/051038, mailed Jan. 22, 2016, 11 pages.
PCT International Search Report and Written Opinion, PCT/US2012/48706, Oct. 16, 2012, 12 pages.
PCT International Search Report for International Application No. PCT/US2007/022858, dated Apr. 18, 2008.
PCT International Search Report for International Application No. PCT/US2003/015393, mailed Oct. 6, 2003, 2 pages.
PCT International Search Report for PCT/US2005/034737 dated Apr. 7, 2006 (WO06/039308).
PCT International Search Report for PCT/US2007/022894, dated Jun. 11, 2008, 3 pages.
Philippines Substantive Examination Report for Philippines Patent Application No. 1/2021/550249, mailed Jan. 26, 2023, 4 pages.
Philippines Substantive Examination Report for Philippines Patent Application No. 1/2021/550249, mailed May 4, 2023, 4 pages.
Philippines Office Action, for Philippines Application No. 1/2018/501139, dated Apr. 8, 2021, 3 pages.
Philippines Patent Application Formality Examination Report—Philippines Patent Application No. 1-2006-000302, Jun. 13, 2006.
Playtech Retail begins roll out of Neon across Grosvenos 55 UK Casinos . Playtech, Apr. 21, 2016. Retrieved on Oct. 11, 2016 from

(56) References Cited

OTHER PUBLICATIONS the Internet:<URL:https://www.playtech.com/news/latest_news_and_prs/playtech_retail_begins_roll_out_of_neon_across_grosvenor_s_55_uk_casinos>(1 page).
Press Release for Alliance Gaming Corp., Jul. 26, 2004—Alliance Gaming Announces Control with Galaxy Macau for New MindPlay Baccarat Table Technology, 2 pages, http://biz.yahoo.com/prnews.
Prototype Glossary and Timelines; *Shuffle Tech International v. Scientific Games Corp., et al.* 1:15-cv-3702 (N.D. III.); (May 2017) pp. 1-4.
Scarne's Encyclopedia of Games by John Scarne, 1973, "Super Contract Bridge", p. 153.
Search and Examination Report of Taiwanese Patent Application No. 108132580, mailed Jan. 19, 2023, 36 pages with English translation.
Service Manual/User Manual for Single Deck Shufflers: BG1, BG2 and BG3 by Shuffle Master (copyright) 1997, 151 page.
SHFL entertainment, Gaming Concepts Group, (2012), 6 pages.
SHFL Entertainment, Inc. Docket No. 60, Opening Claim Construction Brief, filed in Nevada District Court Case No. 2:12-cv-01782 with exhibits, Aug. 8, 2013, p. 1-125.
Shuffle Master Gaming, Service Manual, ACE(trademark) Single Deck Card Shuffler, (1998), 63 pages.
Shuffle Master Gaming, Service Manual, Let It Ride Bonus (Register) With Universal Keypad, 112 pages, (Copyright) 2000 Shuffle Master, Inc.
Shuffle Master's Reply Memorandum in Support of Shuffle Master's Motion for Preliminary Injunction for *Shuffle Master, Inc.* vs. *VendingData Corporation*, in the U.S. District Court, District of Nevada, No. CV-S-04-1373-JCM-LRL, Nov. 29, 2004.
Shuffle Master, Inc. (1996) Let It Ride, the Tournament, User Guide, 72 pages.
*Shuffle Tech International LLC et al.* vs. *Scientific Games Corporation et al.*, Order Denying Motion for Summary Judgement: Memorandum Opinion and Order, in the U.S. District Court, for the Northern District of Illinois Eastern Division, No. 15 C 3702, Sep. 1, 2017, 35 pages.
Singapore Patent Application Examination Report—Singapore Patent Application No. SE 2008 01914 A, Jun. 18, 2008, 9 pages.
Singaporean Written Opinion for Application No. 11202102506P, dated Aug. 4, 2022, 11 pages.
Singaporean Written Opinion for Singapore Application No. 11202102480V, dated Aug. 4, 2022, 9 pages.
Solberg, Halvard; Deposition; *Shuffle Tech International v. Scientific Games Corp., et al.* 1:15-cv-3702 (N.D. HL); Oct. 18, 2016; pp. 187, 224-246, 326-330, 338-339, 396; Baytowne Reporting, Panama City, FL.
Specification of Australian Patent Application No. 31577/95 filed Jan. 17, 1995, Applicants: Rodney G. Johnson et al.; Card Handling Apparatus.
Specification of Australian Patent Application No. PM7441, filed Aug. 15, 1994, Applicants: Rodney G. Johnson et al., Title: Card Handling Apparatus, 13 pages.
Statement of Relevance of Cited References, Submitted as Part of a Third-Party Submission Under 37 CFR 1.290 on Dec. 7, 2012 (12 pages).
Substantive Examination Report for Philippine Application No. 1-2021-550555, dated Jun. 26, 2023, 10 pages.
TableScanner "Accounting & Cage". Product Information Datasheets [online]. Advansys, 2013, Retrived on Oct. 11, 2016 from the Internet: <URL: http:/advansys.si/products/tablescanner/accounting-cage/> (4 pages).
TableScanner "Casino Management System", Product Information Datasheets [online]. Advansys, 2013. Retrieved on Oct. 11, 2016 from the Internet: <URL: http://advansys.si/> (6 pages).
TableScanner "Multisite", Product Information Datasheets [online]. Advansys, 2013. Retrieved on Oct. 11, 2016 from the Internet: <URL: http://advansys.si/products/tablescanner/multisite/> (3 pages).
TableScanner "Player Tracking", Product Information Datasheets [online]. Advansys, 2013. Retrieved on Sep. 23, 2016 from the Internet: <URL: http://advansys.si/products/tablescanner/player-tracking/> (4 pages).
TableScanner "Table Management system", Product Information Datasheets [online]. Advansys, 2013. Retrieved on Oct. 11, 2016 from the Internet: <URL: http://advansys.si/products/tablescanner/> (4 pages).
TableScanner (TM) from Advansys, Casino Inside Magazine, No. 30, pp. 34-36 (Dec. 2012) (4 pages).
TAG Archives: Shuffle Machine, Gee Wiz Online, (Mar. 25, 2013), 4 pages.
Taiwanese Examination and Search Report from Taiwanese Application No. 108132757, dated Apr. 27, 2023, 20 pages with English translation.
Taiwanese Office Action and Search Report for TW 106131789, issued Mar. 30, 2021, 19 pages (including English translation).
Taiwanese Office Action and Search Report from Taiwanese Application No. 10410643, dated Oct. 4, 2018, 15 pages.
Taiwanese Office Action and Search Report from Taiwanese Application No. 104122818, dated Apr. 29, 2019, 17 pages.
Taiwanese Office Action and Search Report from Taiwanese Application No. 106133407, dated Sep. 4, 2018, 9 pages.
tbm=pts&hl=en Google Serach for card handling device with storage area, card removing system pivoting arm and processor: http://www.google.com/?tbm=pts&hl=en; Jul. 28, 2012, 2 pages.
Tracking the Tables, by Jack Bularsky, Casino Journal, May 2004, vol. 17, No. 5, pp. 44-47.
TYM @ a Glance—Table Games Yield Management, Tym Live Product Information Datasheets [online]. Tangam Systems, 2016. Retrieved on Oct. 3, 2016 from the Internet: <URL: http://tangamgaming.com/wp-content/uploads/2016/12/TG_TYMGlance_2016-V4-1 pdf> (2 pages).
United States Court of Appeals for the Federal Circuit Decision Decided Dec. 27, 2005 for Preliminary Injuction for *Shuffle Master, Inc.* vs. *VendingData Corporation*, in the U.S. District Court, District of Nevada, No. CV-S-04-1373-JCM-LRL.
VendingData Corporation's Answer and Counterclaim Jury Trial Demanded for *Shuffle Master, Inc.* vs. *VendingData Corporation*, in the U.S. District Court, District of Nevada, No. CV-S-04-1373-JCM-LRL, Oct. 25, 2004.
VendingData Corporation's Opposition to Shuffle Master Inc.'s Motion for Preliminary Injection for *Shuffle Master, Inc.* vs. *VendingData Corporation*, in the U.S. District Court, District of Nevada, No. CV-S-04-1373-JCM-LRL, Nov. 12, 2004.
VendingData Corporation's Responses to Shuffle Master, Inc.'s First set of interrogatories for *Shuffler Master, Inc.* vs. *VendingData Corporation*, in the U.S. District Court, District of Nevada, No. CV-S-04-1373-JCM-LRL, Mar. 14, 2005.
Weisenfeld, Bernie; Inventor betting on shuffler; Courier-Post; Sep. 11, 1990; 1 page.
DVD labeled Morrill Deck Ex. A is (see Binder 4-1, p. 149/206, Morrill Deck, para. 2.): A video (16 minutes) that the attorney for Card, Robert Morrill, made to describe the Roblejo prototype card shuffler. DVD sent to US Postal Service with this PTO/SB/08 form. hltps://web.archive.org/web/19991004000323/hltp://travelwizardtravel.com/majon.htm, Oct. 4, 1999, 2 pages.
Korean Notice of Final Rejection for Korean Application No. 10-2018-7018121, dated Oct. 23, 2024, 10 pages with English translation.
Philippine Patent Examination Report No. 1 for Philippine Application No. 1-2020-050309, dated Sep. 10, 2024, 4 pgs. pages.
⅓ B/W CCD Camera Module EB100 by EverFocus Electronics Corp., Jul. 31, 2001, 3 pgs.
Ace, Single Deck Shuffler, Shuffle Master, Inc., (2005), 2 pages.
Acute. Merriam-Webster Available at <http://www.merriam-webster.com/dictionary/acute>, accessed Mar. 23, 2018 2 pages.
Australian Examination Report for Australian Application No. 2016277702, dated Jul. 12, 2018, 3 pages.
Australian Examination Report for Australian Application No. 2008202752, dated Sep. 25, 2009, 2 pages.
Australian Examination Report for Australian Application No. 2010202856, dated Aug. 11, 2011, 2 pages.

(56) References Cited

OTHER PUBLICATIONS

Australian Examination Report from Australian Application No. 2017204115, dated Dec. 20, 2018, 4 pages.
Australian Examination Report, for Australian Application No. 2016363815, dated Feb. 3, 2021, 4 pages, with English Translation.
Australian Provisional Patent Application for Australian Patent Application No. PM7441, filed Aug. 15, 1994, Applicants: Rodney G. Johnson et al., Title: Card Handling Apparatus, 13 pages.
Automatic casino card shuffle, Alibaba.com, (last visited Jul. 22, 2014), 2 pages.
Bally Systems Catalogue, Ballytech.com/systems, 2012, 13 pages.
Canadian Office Action for CA 2,580,309 dated Mar. 20, 2012 (6 pages).
Canadian Office Action for Canadian Application No. 2,886,633, dated Nov. 1, 2018, 4 pages.
Canadian Office Action for Canadian Application No. 2,985,255 dated Jul. 25, 2019, 4 pages.
Canadian Office Action for Canadian Application No. 3,033,280, dated Apr. 14, 2021, 4 pages.
Canadian Office Action for Canadian Application No. 2,461,726, dated Dec. 11, 2013, 3 pages.
Canadian Office Action for Canadian Application No. 2,461,726, dated Jul. 19, 2010, 3 pages.
Canadian Office Action from Canadian Application No. 2,823,738, dated Sep. 8, 2017, 4 pages.
Canadian Office Action from Canadian Application No. 2995664, dated Jun. 4, 2019, 5 pages.
CasinoTrac TableTrac Services. Product Information Dalasheet [online]. CasinoTrac, 2015. Retrieved on Oct. 12, 2016 from the Internet: <URL: http://www.tabletrac.com/?pageid=15#prettyPhoto> (3 pages).
Chinese First Office Action and Search Report from Chinese Application No. 201580027851.8, dated Mar. 4, 2019, 9 pages.
Chinese First Office Action for Chinese Application No. 2019800650034, dated Jun. 5, 2023, 29 pages with translation.
Chinese First Office Action for Chinese Patent Application No. 201980060202.6, issued Jun. 2, 2023, 27 pages with translation.
Chinese Notification to Go through Formalities of Registration, Chinese Patent Application No. 2021105109960, issued Jun. 30, 2023, 7 pages with translation.
Chinese Office Action and Search Report from Chinese Application No. 201310361850.X, dated Oct. 10, 2018, 9 pages.
Chinese Search Report for Chinese Application No. 201580027851. 8, dated Feb. 22, 2019, 1 page.
Chinese Second Office Action for Chinese Application No. 201980065003.4, dated Nov. 2, 2023, 22 pages with translation.
Chinese Second Office Action for Chinese Application No. 2017800591766, dated Oct. 10, 2022, 14 pages with translation.
Chinese Second Office Action for Chinese Application No. 201980060202.6, dated Nov. 2, 2023, 23 pages with translation.
Christos Stergiou and Dimitrios Siganos, "Neural Networks," http://www.doc.ic.ac.uk/-nd/surprise_96/journal/vol4/cs11/report.html (13 pages), Dec. 15, 2011.
Complaint filed in the matter of *SHFL entertainment, In. v. DigiDeal Corporation*, U.S. District Court, District of Nevada, Civil Action No. CV 2:12-cv-01782-GMC-VCF, Oct. 10, 2012, 62 pages.
Connect2Table Administrator Manual, Jan. 7, 2013 (82 pages).
Connect2Table Connec12Table System Summary, generated Oct. 21, 2016 (2 pages).
Connect2Table Quick Installation Guide, Feb. 20, 2013 (36 pages).
Connect2Table User Manual, Feb. 7, 2013 (35 pages).
Decision of Rejection of Chinese Patent Application No. 2021105109960, mailed Jan. 28, 2023, 25 pages with translation.
Documents submitted in case of *Shuffle Master, Inc. v. Card Aurstia, et al.*, Case No. CV-N-0508-HDM-(VPC) Consolidated with Case No. CV-N-02-0244-ERC-(RAM), May 6, 2003, scan of (color pages, for ciarity, Part 18 of 23 color copies from Binder 1).
Documents submitted in case of *Shuffle Master, Inc. v. Card Aurstia, et al.*, Case No. CV-N-0508-HDM-(VPC) Consolidated with Case No. CV-N-02-0244-ERC-(RAM)), May 6, 2003, scan of (color pages, for clarity, Part 19 of 23 color copies from Binder 3).
Documents submitted in case of *Shuffle Master, Inc. v. Card Aurstia, et al.*, Case No. CV-N-0508-HDM-(VPC) Consolidated with Case No. CV-N-02-0244-ERC-(RAM)), May 6, 2003, scan of (color pages, for clarity, Part 20 of 23 color copies from Binder 4).
Documents submitted in case of *Shuffle Master, Inc. v. Card Aurstia, et al.*, Case No. CV-N-0508-HDM-(VPC) Consolidated with Case No. CV-N-02-0244-ERC-(RAM), May 6, 2003, scan of (color pages, for clarity, Part 22 of 23 color copies from Binder 8, part 1 of 2).
Documents submitted in case of *Shuffle Master, Inc. v. Card Aurstia, et al.*, Case No. CV-N-0508-HDM-(VPC) Consolidated with Case No. CV-N-02-0244-ERC-(RAM)), May 6, 2003, scan of color pages, for clarity, Part 23 of 23 (color copies from Binder 8, part 2 of 2).
Documents submitted in case of *Shuffle Master, Inc. v. Card Austria, et al.*, Case No. CV-N-0508-HDM-(VPC) (Consolidated with Case No. CV-N-02-0244-ERC-(RAM)), May 6, 2003, Part 15 of 23 (Binder 8, 3 of 5).
Documents submitted in case of *Shuffle Master, Inc. v. Card Austria, et al.*, Case No. CV-N-0508-HDM-(VPC) (Consolidated with Case No. CV-N-02-0244-ERC-(RAM)), May 6, 2003, Part 16 of 23 (Binder 8, 4 of 5).
Documents submitted in case of *Shuffle Master, Inc. v. Card Austria, et al.*, Case No. CV-N-0508-HDM-(VPC) (Consolidated with Case No. CV-N-02-0244-ERC-(RAM)), May 6, 2003, Part 17 of 23 (Binder 8, 5 of 5).
Documents submitted in case of *Shuffle Master, Inc. v. Card Austria, et al.*, Case No. CV-N-0508-HDM-(VPC) (Consolidated with Case No. CV-N-02-0244-ERC-(RAM)), May 6, 2003, scan of (color pages, for clarity, Part 21 of 23 color copies from Binder 6).
Documents submitted in the case of *Shuffle Master, Inc. v. Card Austria, et al.*, Case No. CV-N-0508-HDM-(VPC) (Consolidated with Case No. CV-N-02-0244-ERC-(RAM)), May 6, 2003, Part 7 of 23 (Binder 4, 1 of 2).
Documents submitted in the case of *Shuffle Master, Inc. v. Card Austria, et al.*, Case No. CV-N-0508-HDM-(VPC) (Consolidated with Case No. CV-N-02-0244-ERC-(RAM)), May 6, 2003, Part 11 of 23 (Binder 7, 1 of 2).
Documents submitted in the case of *Shuffle Master, Inc. v. Card Austria, et al.*, Case No. CV-N-0508-HDM-(VPC) (Consolidated with Case No. CV-N-02-0244-ERC-(RAM)), May 6, 2003, Part 12 of 23 (Binder 7, 2 of 2).
Documents submitted in the case of *Shuffle Master, Inc. v. Card Austria, et al.*, Case No. CV-N-0508-HDM-(VPC) (Consolidated with Case No. CV-N-02-0244-ERC-(RAM)), May 6, 2003, Part 13 of 23 (Binder 8, 1 of 5).
Documents submitted in the case of *Shuffle Master, Inc. v. Card Austria, et al.*, Case No. CV-N-0508-HDM-(VPC) (Consolidated with Case No. CV-N-02-0244-ERC-(RAM)), May 6, 2003, Part 2 of 23 (Master Index and Binder 1, 2 of 2).

† cited by third party

CARD-HANDLING DEVICES WITH DEFECT DETECTION AND RELATED METHODS

CROSS-REFERENCE TO RELATED APPLICATIONS

This application is a continuation of U.S. patent application Ser. No. 17/016,796, filed Sep. 10, 2020, now U.S. Pat. No. 11,898,837, issued Feb. 13, 2024, which claims the benefit under 35 U.S.C. § 119(e) of the priority date of U.S. Provisional Patent Application Ser. No. 62/898,080, filed Sep. 10, 2019, the disclosure of each of which is incorporated herein in its entirety by this reference.

TECHNICAL FIELD

This disclosure relates generally to card-handling devices and methods of making and using card-handling devices. More specifically, disclosed embodiments relate to card-handling devices, which may screen cards for defects, separate defective cards from approved cards, collect approved cards for future use, and/or be capable of performing such screening efficiently in bulk and automatically, as well as related methods.

BACKGROUND

Playing cards may deteriorate over time due to normal use. Subjecting cards to stresses outside normal use cases may accelerate deterioration of the cards. For example, wagering game administrators, such as casinos and card rooms, frequently employ cards (e.g., in one or more 52-card decks of standard playing cards) in the administration of wagering games, and those cards may be processed by automatic card-handling devices as well as handled by dealers and patrons. Throughout the course of these kinds of uses, the cards may be subjected to differing temperatures, exposed to differing humidity, and bent or otherwise manipulated by human hands, exposing the cards to oils and other substances from the handlers as well as bending stresses. Over time, this normal use can cause the cards to bend, fold, crease, kink, fray, and/or tear, rendering them no longer suitable for commercial use. Some dealers and/or patrons may also put excess stress on the cards, deliberately bending, folding, creasing, kinking, fraying, tearing, or otherwise marking the cards as an outlet for stress or as part of a scheme to identify cards to gain a competitive advantage. Cards exhibiting these kinds of properties can jam automatic card-handling devices or otherwise cause the automatic card-handling devices to perform differently from their intended functions. In addition, deformed cards can grant a competitive advantage to patrons, who may be able to identify certain cards in other patrons' or dealers' hands without seeing the face of the card.

BRIEF SUMMARY

In some embodiments, card-handling devices may include an input area sized and shaped to receive cards and an output area for outputting at least some of the cards. A defect detection system may be located along a card path downstream from the input area. The defect detection system may be configured to scan at least one card to determine whether at least one characteristic of the at least one card has been modified beyond a predetermined limit or whether the at least one characteristic of the at least one card is within the predetermined limit A diverter may be configured to divert the at least one card from the card path when the at least one characteristic of the at least one card has been modified beyond the predetermined limit and enable the at least one card to continue on the card path when the at least one characteristic of the at least one card is within the predetermined limit.

In additional embodiments, methods of assembling card-handling devices may involve positioning a defect detection system in a card path between an input area and an output area, the defect detection system configured to scan at least one card to determine whether at least one characteristic of the at least one card has been modified beyond a predetermined limit or whether the at least one characteristic of the at least one card is within the predetermined limit A diverter may be positioned in the card path downstream from the defect detection system, the diverter configured to: divert the at least one card from the card path when the at least one characteristic of the at least one card has been modified beyond the predetermined limit; and enable the at least one card to continue on the card path when the at least one characteristic of the at least one card is within the predetermined limit.

In additional embodiments, methods of using card-handling devices may involve placing cards in an input area of the card-handling device and moving cards from the input area along a card path toward an output area. A defective card may be detected utilizing a defect detection system interposed between the input area and the output area by scanning the card to determine whether at least one characteristic of the card has been modified beyond a predetermined limit or whether the at least one characteristic of the card is within the predetermined limit. The card may be diverted from the card path utilizing a diverter when the at least one characteristic of the card has been modified beyond the predetermined limit.

In additional embodiments, card-handling devices may include an input area sized and shaped to receive a stack of cards and a temporary storage including movable compartments. Each compartment may be sized, shaped, and configured to temporarily store at least two cards in the respective compartment. An input mechanism may be positioned and configured to transfer cards from the input area to the temporary storage. A defect detection system may be interposed between the input area and the temporary storage and may include an emitter positioned and configured to emit radiation toward a card as the card is transferred by the input mechanism. A detector may be positioned and configured to detect radiation emitted by the emitter and reflected from a surface of the card toward the detector as the card is transferred by the input mechanism. A controller may be operatively connected to at least the detector, the controller configured to receive a signal indicative of radiation detected by the detector and produce a signal indicative of whether the card is at least one of bent beyond a predefined limit or torn.

In additional embodiments, methods of assembling card-handling devices may involve positioning an input mechanism between an input area sized and shaped to receive a stack of cards and a temporary storage comprising compartments. Each compartment may be sized, shaped, and configured to temporarily store at least two cards in the respective compartment, and the input mechanism may be configured to transfer cards from the input area to the temporary storage. A defect detection system may be positioned between the input area and the temporary storage and may include an emitter positioned and configured to emit radiation toward a card as the card is transferred by the input mechanism. A detector may be positioned and configured to detect radiation emitted by the emitter and reflected from a surface of the card toward the detector as the card is transferred by the input mechanism. A controller may be operatively connected to at least the detector, the controller configured to receive a signal indicative of radiation detected by the detector and produce a signal indicative of whether the card is at least one of bent beyond a predefined limit or torn.

In additional embodiments, methods of using card-handling devices may involve placing a stack of cards in an input area of the card-handling device and transferring cards from the input area toward a temporary storage including compartments. Each compartment may be sized, shaped, and configured to temporarily store at least two cards in the respective compartment. A defective card may be detected utilizing a defect detection system interposed between the input area and the temporary storage by emitting radiation toward a card as the card is transferred by the input mechanism utilizing an emitter. Radiation emitted by the emitter and reflected from a surface of the card may be detected utilizing a detector as the card is transferred by the input mechanism. A signal indicative of radiation detected by the detector may be received at a controller and the controller may produce a signal indicative of whether the card is at least one of bent beyond a predefined limit or torn.

In additional embodiments, an output mechanism of a card-handling device may include a first push bar positioned and configured to push a stack of cards in a respective compartment partially out of the compartment, a set of rollers positioned and configured to completely remove only one card from the stack completely out of the compartment, and a second push bar positioned and configured to push a remainder of the stack of cards back into the respective compartment.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings. In the drawings:

DETAILED DESCRIPTION

Figure 1:
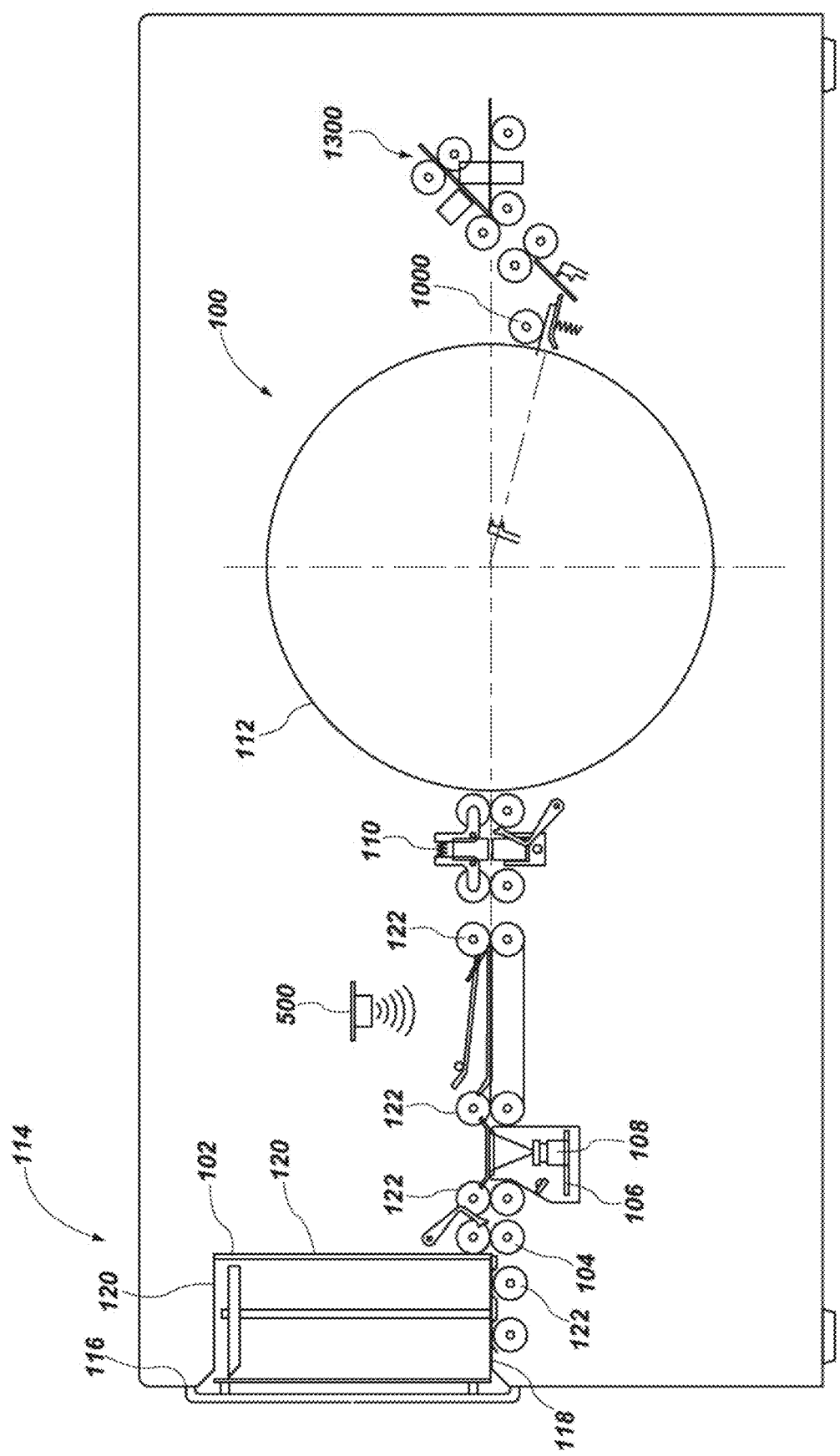
FIG. 1 is a schematic depicting a side view of a card-handling device in accordance with this disclosure.

The illustrations presented in this disclosure are not meant to be actual views of any particular card-handling device or component thereof, but are merely idealized representations employed to describe illustrative embodiments. Thus, the drawings are not necessarily to scale.

Disclosed embodiments relate generally to card-handling devices which may automatically screen cards for certain defects, separate defective cards from approved cards, collect approved cards for future use, and be capable of performing such screening efficiently in bulk. For example, embodiments of card-handling devices may include a defect detection system including an emitter positioned and configured to emit radiation (e.g., electromagnetic, acoustic, etc.) toward a respective card, a detector positioned and configured to detect radiation reflected off a surface of the respective card, and a controller operatively connected to at least the detector, the controller configured to receive a signal indicative of radiation detected by the detector and produce a signal indicative of whether the card is bent beyond a predefined limit or is torn. The card-handling devices may further include, for example, a diverter operatively connected to the controller, the diverter positioned and configured to divert a card in response to a control signal from the controller when the detector indicates that the card is modified beyond a threshold amount (e.g., bent beyond the predefined limit, torn, ripped, is unreadable, for example, a rank and/or suit of the card cannot be determined, is marked or otherwise adulterated).

As a result, disclosed embodiments may be of particular use in situations where cards are processed in bulk quantities (e.g., in a deck or multiple decks at a time) and/or where cards are subjected to frequent, excessive, or otherwise abnormal bending, folding, creasing, kinking, fraying, tearing, or otherwise marking the cards. For example, cards utilized in the game of squeeze baccarat are frequently bent, folded, creased, torn, and ripped because bending the cards is part of, and encouraged in, the game. In addition, baccarat, including squeeze baccarat, is typically administered utilizing shoes having pre-randomized sets of playing cards having between six and twelve 52- or 53-card decks of standard playing cards. Accordingly, card-handling devices in accordance with this disclosure may be particularly useful for verifying and reusing cards that remain within commercially acceptable specifications following use in baccarat (especially squeeze baccarat) and for disposing of cards no longer within commercially acceptable specifications because of such use.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even 100% the specified value.

As used herein, the terms "vertical" or "underlying" and "horizontal" or "lateral" may refer to a drawing figure as oriented on the drawing sheet, and are in no way limiting of orientation of an apparatus, or any portion thereof, unless it is apparent that a particular orientation of the apparatus is necessary or desirable for operation in view of gravitational forces. For example, when referring to elements illustrated in the figures, the terms "vertical," "underlying," "horizontal," or "lateral" may refer to an orientation of elements of the card-handling device relative to a table surface of a table to which the card-handling device may be placed, mounted, and/or operated.

FIG. 1 is a schematic depicting a side view of a card-handling device 100 in accordance with this disclosure. The card-handling device 100 may be configured to evaluate at least certain characteristics of cards, separate cards determined to have certain defects, and collect cards not having those defects for future use. The card-handling device 100 may be particularly adapted for evaluating used cards, discarding or recycling cards no longer appropriate for continued use, and identifying and collating cards still appropriate for continued use. The card-handling device 100 may alternatively be called, for example, a card recycler, card sorter, or card sorter and shuffler.

The card-handling device 100 may include an input area 102 sized and shaped to receive a stack of cards. For example, the input area 102 may be positioned proximate to an exterior 114 of the card-handling device 100, and may include an access panel 116 at a periphery of the card-handling device 100 to enable a user to open the access panel 116 and gain access to the input area 102 to place cards therein. The input area 102 may include a platform 118 at a lowermost portion of the input area 102 and on which a stack of cards may be supported. Sidewalls 120 defining a lateral periphery of the input area 102 may be sized, shaped, and positioned to ensure that cards can be received in the input area 102.

An input mechanism 104 may be located proximate to the input area 102 and may be configured to transfer a card at a time from the input area 102 away from the exterior 114 of the card-handling device 100. For example, the input mechanism 104 may include a set of rollers 122 positioned and configured to displace (e.g., along a card path, laterally along a card path through the device 100) a bottommost card in a stack of cards from within the input area 102.

In some embodiments, the card-handling device 100 may include a card identification system 106 (e.g., which may be part of defect detection system 500, discussed below, in some embodiments) located proximate to the input mechanism 104 and configured to identify at least a rank and suit of each card moved by the input mechanism 104. For example, the card identification system 106 may include a sensor 108 oriented toward a major surface of each card as the card is transported by the input mechanism 104, with adequate space between two adjacent rollers 122 for the sensor 108 to detect at least a rank and/or suit of the respective card.

A defect detection system 500 may be located downstream of the input area 102. The defect detection system 500 may be positioned, oriented, and configured to detect one or more defects of each card transferred by the input mechanism 104, which defects may include at least, for example, a respective card being bent beyond a predefined limit, folded, ripped, creased, kinked, frayed, marked, modified, unreadable (e.g., by the card identification system 106), or torn.

The card-handling device 100 may include a diverter 110 coincident with, or downstream of, the defect detection system 500. The diverter 110 may be positioned and configured to divert a card when the defect detection system 500 detects that the card is defective, enabling the diverter 110 to separate defective cards from approved cards. As discussed below in greater detail, the diverter 110 may separate cards by, for example, changing the path upon which such cards travel (e.g., by reversing direction, by moving the cards in a traverse direction, in a similar plane or in an intersecting plane, or combinations thereof).

A temporary storage 112 may be located downstream from the diverter 110. The temporary storage 112 may be positioned, sized, shaped, and configured to store the cards that have been approved (e.g., cards that within threshold limits of modification, damage, and/or defectiveness), or at least cards designated not defective, by the defect detection system 500. For example, the temporary storage 112 (e.g., a carousel) may be capable of temporarily storing cards in bulk quantities. More specifically, the temporary storage 112 may be configured to temporarily store between one complete 52-card deck of standard playing cards and fifteen complete 53-card decks of standard playing cards including one joker and one or more sets of fifteen special-purpose cards (e.g., cut cards, blanks, bonus cards). A 52-card deck of standard playing cards may have ranks from ace through ten, jack, queen, and king in each of four suits: spades, clubs, diamonds, and hearts.

In additional embodiments, the defective cards may be sorted into one section of the temporary storage 112 while approved card are sorted in another section of the temporary storage 112.

The card-handling device 100 may include an output mechanism 1000 positioned and configured to remove cards from the temporary storage 112. The output mechanism 1000 may enable approved cards, or at least cards designated not defective, to be output from the card-handling device 100 for reuse. For example, the output mechanism 1000 may collate batches of cards that have passed inspection by the defect detection system 500 for output as a batch. More specifically, the output mechanism 1000 may form batches of cards including one or more complete decks of 52 standard playing cards for output from the card-handling device 100. In some embodiments, the card-handling device 100 may store and output approved cards in a sorted order (e.g., a complete sorted order or sorted to an amount allowed given the particular composition of approved and defective cards input into the device 100).

Figure 2:
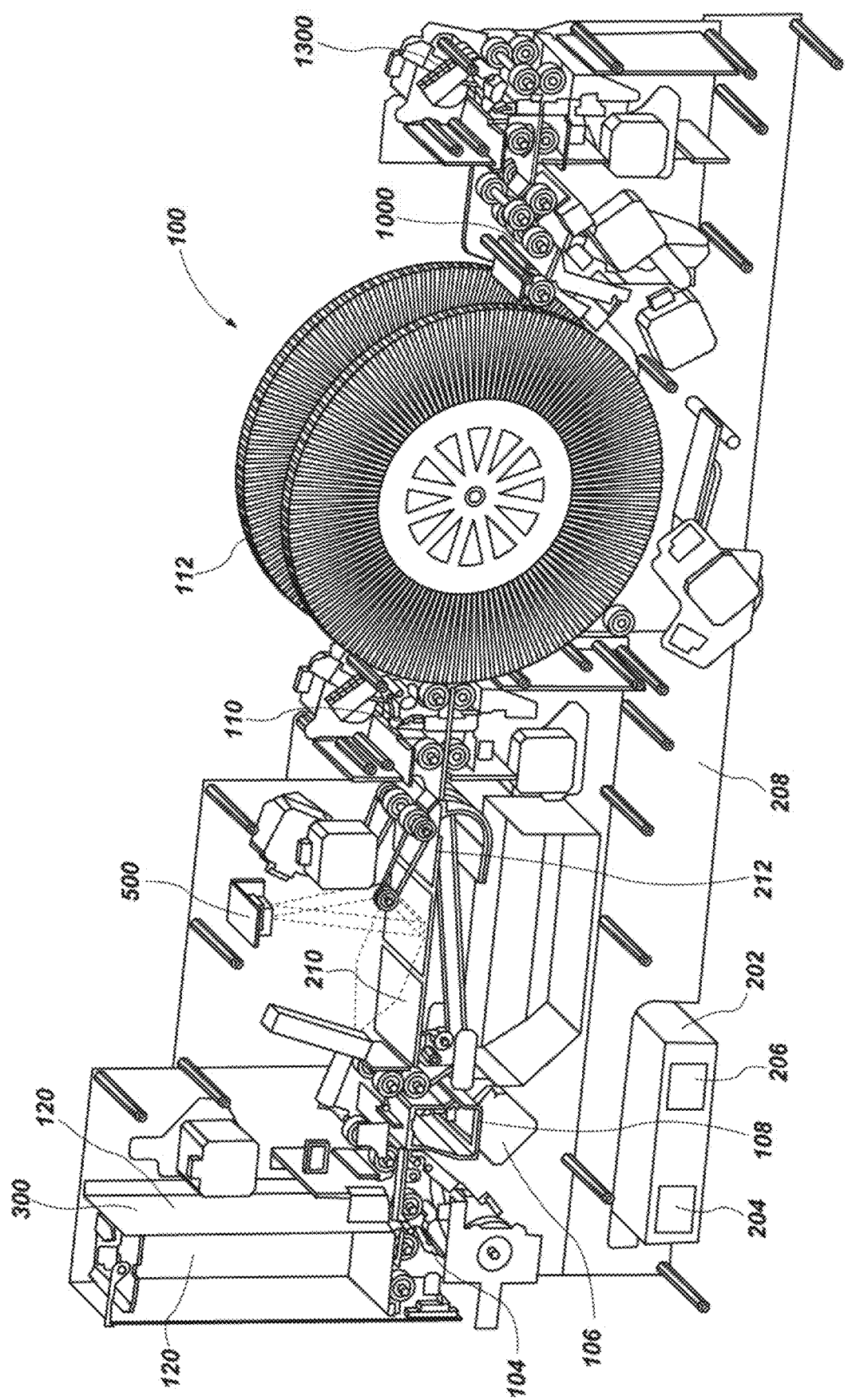
FIG. 2 is a partial cutaway, side perspective view of the card-handling device of FIG. 1.

FIG. 2 is a partial cutaway, side perspective view of the card-handling device 100 of FIG. 1. The sensor 108 of the card identification system 106 may be, for example, laterally interposed (e.g., along a card path) between the input area 102 and the defect detection system 500. As a card 210 is moved laterally from the bottom of the stack of cards 210 within the input area 102, toward the temporary storage 112, and past the card identification system 106, the sensor 108 may detect radiation transmitted (e.g., reflected) from a major surface 212 of the card 210, enabling the sensor 108 to detect variations in that radiation. The information regarding that variation in reflected radiation may be used to identify the rank and suit of the card 210, and associate the card 210 and its position within the card-handling device 100 with its rank and suit.

The defect detection system 500 may be, for example, laterally interposed between the card identification system 106 and the temporary storage 112 in embodiments where the card-handling device 100 includes the card identification system 106. This relative positioning for the card identification system 106 and the defect detection system 500 may enable the card-handling device 100 to associate the approved or defective status of a given card 210 with the identity of that card 210 (e.g., rank and suit for playing cards and identifier for special-purpose cards, such as cut cards, blanks, and bonus cards) and a position of that card 210 within the card-handling device 100.

The diverter 110 may be, for example, laterally interposed between the defect detection system 500 and the temporary storage 112. This relative positioning may ensure that cards 210 identified as defective may be promptly separated from cards 210 that are approved or otherwise not defective, that only those cards 210 confirmed not to be defective are passed on to the temporary storage 112, and that defect detection is associated with the identity of the card 210 (e.g., including rank and suit for playing cards and identifier for special-purpose cards, such as cut cards, blanks, and bonus cards).

The temporary storage 112 may be laterally interposed between the diverter 110 and the output mechanism 1000. For example, cards 210 may be input into the temporary storage 112 on one lateral side and may be output from the temporary storage 112 on another, at least substantially opposite lateral side. In other embodiments, the output mechanism 1000 may simply be circumferentially offset from the diverter 110 around a periphery of the temporary storage 112, such as, for example, being located above or below the temporary storage 112.

A controller 202 may be operatively connected to at least the input mechanism 104, card identification system 106 (in embodiments including the card identification system 106), defect detection system 500, diverter 110, temporary storage 112, and output mechanism 1000. The controller 202 may be configured to receive feedback signals from at least the card identification system 106 and the defect detection system 500 and output control signals to each of the input mechanism 104, card identification system 106, defect detection system 500, diverter 110, temporary storage 112, and output mechanism 1000 at least partially in response to the feedback signals.

The controller 202 may be configured to execute software programs containing computing instructions and may include one or more processors 204 and memory 206 operatively connected to one another. The one or more processors 204 may be configured to execute a wide variety of operating systems and applications including the computing instructions for controlling card-handling devices 100 of the present disclosure. The one or more processors 204 may be configured as, for example, a microprocessor, microcontroller, digital signal processor (DSP), or state machine suitable for carrying out processes disclosed herein. The one or more processors 204 may also be implemented as a combination of computing devices, such as a combination of a DSP and a microprocessor, a plurality of microprocessors, one or more microprocessors in conjunction with a DSP core, or any other such configuration.

The memory 206 may be used to hold computing instructions, data, and other information for performing a wide variety of tasks including controlling card-handling devices 100 in accordance with this disclosure. By way of example, and not limitation, the memory 206 may include Synchronous Random Access Memory (SRAM), Dynamic RAM (DRAM), Read-Only Memory (ROM), Flash memory, and the like. The term "memory," as used herein, shall be interpreted to exclude transitory signals.

In some embodiments, the controller 202 may include or be operatively connected to one or more user input and/or output devices. For example, a display may be operatively connected to the controller 202 (e.g., supported on a shared housing with other components of the card-handling device 100 or separate from the housing and connected via a wired or wireless connection). The display may be configured to display information about the operating condition of the card-handling device 100 as well as real-time information regarding cards 210 processed by the card-handling device 100. The display may include a wide variety of displays such as, for example, light-emitting diode displays, liquid crystal displays, cathode ray tubes, and the like. In addition, the display may be configured with a touch-screen feature for accepting user input. As another example, a printer may be operatively connected to the controller 202 (e.g., via a wired or wireless connection). The printer may be configured to print information about the operating condition of the card-handling device 100 as well as real-time information regarding cards 210 processed by the card-handling device 100 (e.g., information sufficient to verify outcomes from games administered utilizing the card-handling device 100). The user input devices may include, for example, keyboards, push-buttons, switches, mice, joysticks, haptic devices, microphones, speakers, cameras, and touchscreens.

In some embodiments, the controller 202 may include or be operatively connected to one or more communication devices configured for communicating with other devices or communication networks. As nonlimiting examples, the communication device(s) may include elements for communicating on wired and wireless communication media, such as, for example, serial ports, parallel ports, Ethernet connections, universal serial bus (USB) connections, IEEE 1394 ("firewire") connections, THUNDERBOLT™ connections, BLUETOOTH® wireless networks, ZIGBEE® wireless networks, 802.11 type wireless networks, cellular telephone/data networks, and other suitable communication interfaces and protocols.

The controller 202 may be configured in many different ways with different types of interconnecting buses between the various elements. Moreover, the various elements may be subdivided physically, functionally, or a combination thereof. As one nonlimiting example, the memory 206 may be divided into cache memory, graphics memory, and main memory. Each of these memories may communicate directly or indirectly with the one or more processor(s) 204 on separate buses, partially combined buses, or a common bus.

In some embodiments, the card-handling device 100 may be assembled in a modular fashion, with functional subgroupings of certain components supplied in an independent module and connected to a shared frame. For example, the card-handling device 100 may include a base 208 extending from one lateral side of the card-handling device 100 to another, opposite side of the card-handling device 100 at a bottom portion of the card-handling device 100. Each module may be supported on, and affixed to, the base 208. For example, the input area 102, portions of the input mechanism 104, and the card identification system 106 may be provided as a first independent module 300 supported on, and affixed to, the base 208 at a first lateral side thereof. The defect detection system 500 may be provided as a second independent module 400 supported on, and affixed to, the base 208 laterally adjacent to the first independent module 300. The diverter 110 may be provided as a third independent module 800 supported on, and affixed to, the base 208 laterally adjacent to the defect detection system 500. The base 208 may directly support certain components of the card-handling device 100. For example, the temporary storage 112 and the controller 202 may be provided directly on the base 208, such that the base 208 may also be characterized as an independent module. The output mechanism 1000 may be provided as a fourth independent module 1100 supported on, and affixed to, the base 208 laterally adjacent to the temporary storage 112. Additional detail regarding these modules and the components included therewith is provided in connection with FIGS. 3 through 13 below.

Figure 3:
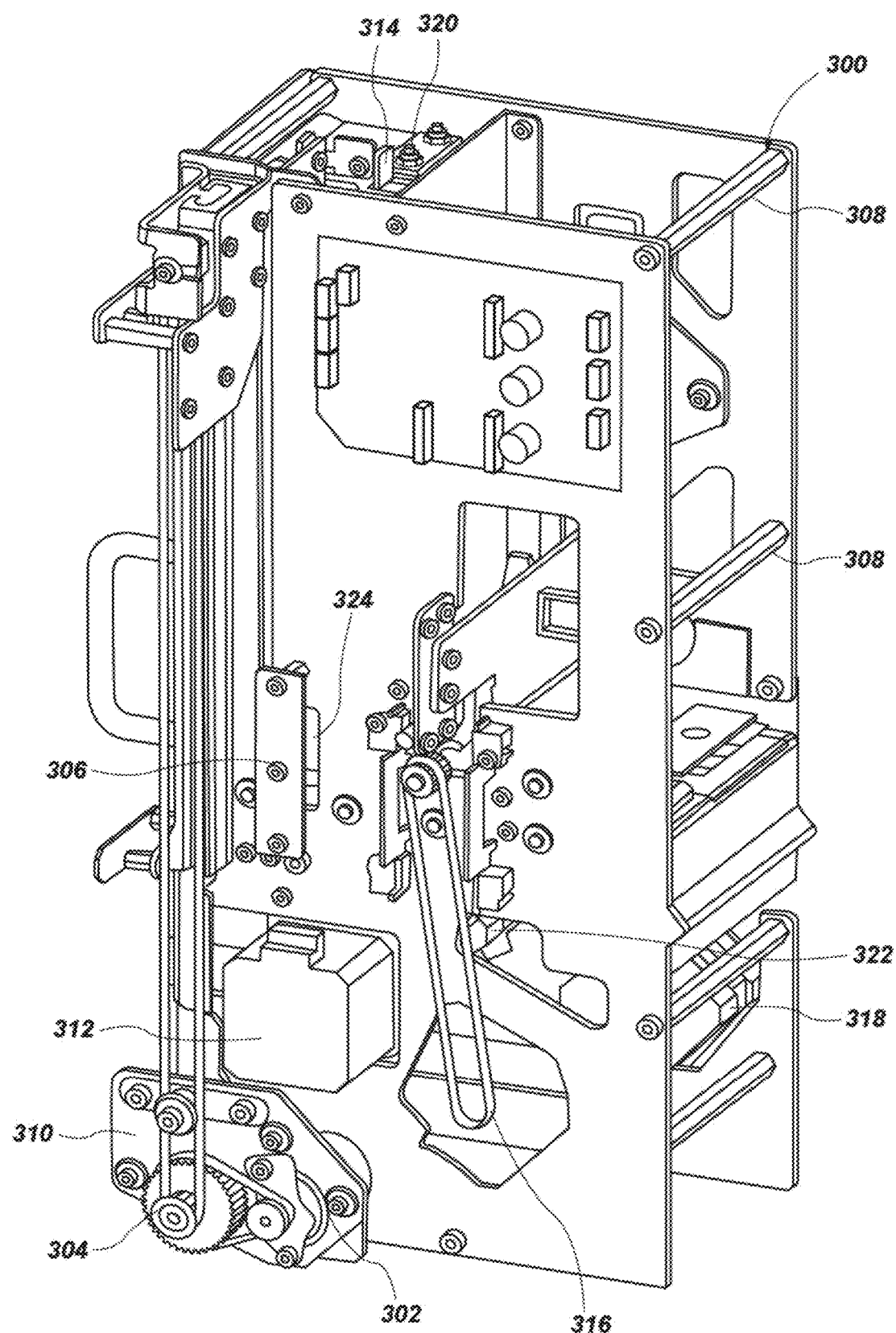
FIG. 3 is a side perspective view of a first independent module of the card-handling device of FIG. 1.
Figure 4:
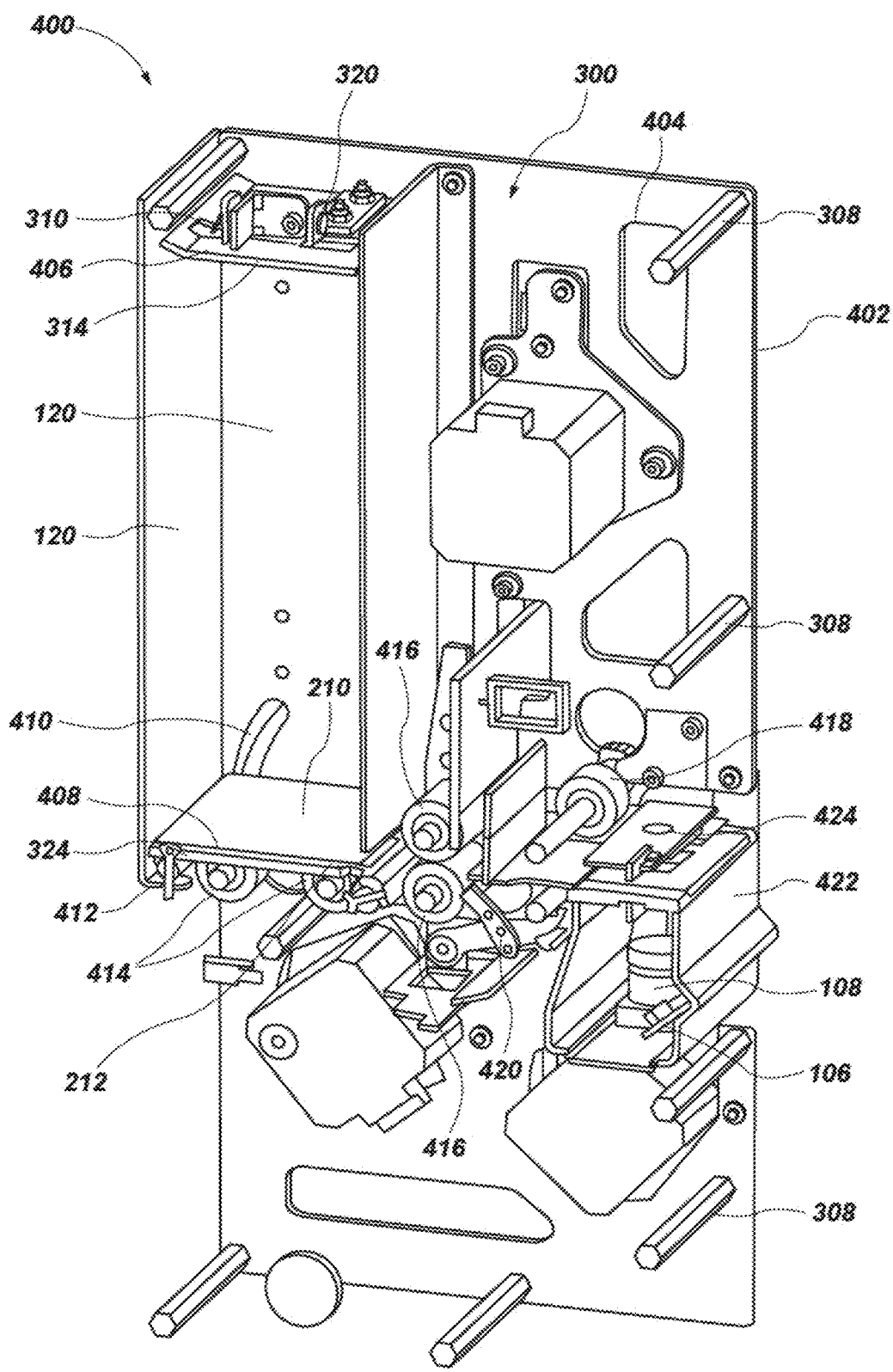
FIG. 4 is a partial cutaway, side perspective view of the first independent module of FIG. 4.

FIG. 3 is a side perspective view of a first independent module 300 of the card-handling device 100 of FIG. 1. FIG. 4 is a partial cutaway, side perspective view of the first independent module 300 of the card-handling device 100 of FIG. 1. With combined reference to FIGS. 3 and 4, the first independent module 300 may include, for example, the input area 102, a portion of the input mechanism 104, and the card identification system 106 supported on, and affixed to, a first frame 402 to form the first independent module 300. The first frame 402 may include, for example, a pair of plates 404 with other components of the first independent module 300 supported generally between the plates 404. Each plate 404 may be affixed to, and positioned a predefined distance from, the other plate 404 by spacers 308 extending laterally between the plates 404. Each plate 404 may include attachment features (e.g., holes, threaded holes, snap receivers) sized, positioned, and configured to enable the operational components and the spacers 308 of the first independent module 300 to be supported by the plates 404 in a selected location and orientation relative to one another. In some embodiments, the plates 404 may include additional holes enabling portions of the operational components not relied on for attachment to a given plate 404 to extend through the hole. Each spacer 308 may include, for example, a post or pillar with snap-in, interference-fit, or threaded connections or a bolt. A minimum spacing between adjacent plates 404 maintained by the spacers 308 may be, for example, about 2.5 inches or more. More specifically, the minimum spacing between adjacent plates 404 may be, for example, between about 2.75 inches and about 6 inches. As a specific, non-limiting example, the minimum spacing between adjacent plates 404 may be between about 3 inches and about 5 inches (e.g., about 4 inches). In FIG. 4, one plate 404 has been removed for convenience in depicting other components of the first independent module 300.

A width and depth of the input area 102, as defined by the sidewalls 120, may be in a rectangular cross-sectional shape sufficiently large to ensure that standard playing cards 210 can be accommodated within the sidewalls 120 of the input area 102. More specifically, the width and depth of the input area 102 may be between about 2.25 inches by about 3.5 inches and about 2.75 inches by about 3.75 inches. As a specific, nonlimiting example, the width and depth of the input area 102 may be between about 2.3 inches by about 3.55 inches and about 2.7 inches by about 3.7 inches (e.g., about 2.65 inches by about 3.65 inches).

In some embodiments, the input area 102 may include a biasing system 310 positioned and configured to urge cards 210 within the input area 102 toward the input mechanism 104. The biasing system 310 may include, for example, a pusher 314 having a major surface 406 sized, oriented, and positioned to contact a corresponding major surface of an uppermost card 210 in a stack of cards 210 within the input area 102. For example, the pusher 314 may be positionable proximate a top of the input area 102 and may be configured to urge cards 210 in the stack downward toward the input mechanism 104. The pusher 314 may include, for example, a weight positioned and configured to urge the pusher 314 toward the input mechanism 104 under the force of gravity or a motor 302 (e.g., a solenoid) and a force transfer mechanism 304 positioned and configured to transfer an output force from the motor 302 to the pusher 314 to urge the pusher 314 toward the input mechanism 104. The force transfer mechanism 304 may include, for example, a series of gears and/or pulleys positioned and configured to transfer the force generated by the motor 302 to raise and lower the pusher 314. The input area 102 may include, for example, a stack height sensor 320 (e.g., an infrared (IR) sensor, an ultrasonic sensor, a laser sensor) positioned and configured to determine a height of the stack of cards 210 within the 102. The stack height sensor 320 and motor 302 may be operatively connected to the controller 202 (see FIG. 2), enabling the controller 202 (see FIG. 2) to receive an indication of whether cards 210 are present in the input area 102 and what height in the input area 102 the stack reaches and to issue control signals to the motor 302 to ensure that the major surface 406 of the pusher 314 contacts the topmost card 210 in the stack and that the pusher 314 exerts at least some force urging the stack toward the input mechanism 104.

In some embodiments, the input area 102 may include a bottom plate 324 positioned at or proximate to the bottom ends of the sidewalls 120. The bottom plate 324 may have a major surface 408 positioned and oriented to contact a lower face on a major surface 212 of a lowermost card 210 in the stack within the input area 102. An angle at which the major surface 408 of the bottom plate 324 is oriented relative to horizontal may be adjustable. For example, the bottom plate 324 may be pivotable about one end (e.g., utilizing a hinge at an end proximate to where cards 210 laterally exit the input area 102), and the other end of the bottom plate 324 may be secured to an actuator 306 through an arcing passageway 410 in the sidewalls 120. A door sensor 412 (e.g., a contact switch) may be positioned and configured to detect when the sidewall 118 operable as a door to the input area 102 is open or closed. The door sensor 412 and the actuator 306 may be operatively connected to the controller 202 (see FIG. 2), enabling the controller 202 (see FIG. 2) to cause the bottom plate 324 to pivot away from horizontal during loading cards 210 into, and unloading cards 210 from, the input area 102 and to cause the bottom plate 324 to return toward (or to) horizontal once the sidewall 118 operating as the door is closed. A maximum angle of the major surface 408 of the bottom plate 324 relative to horizontal may be, for example, about 45° or less. More specifically, the maximum angle of the major surface 408 of the bottom plate 324 relative to horizontal may be, for example, between about 15° and about 40°. As a specific, nonlimiting example, the maximum angle of the major surface 408 of the bottom plate 324 relative to horizontal may be, for example, between about 20 and about 35° (e.g., about 30°).

The input mechanism 104 may include, for example, at least one pick-off roller 414 positioned and configured to move cards 210 from the input area 102 toward the temporary storage 112 (see FIGS. 1, 2). For example, the input mechanism 104 may include two pick-off rollers 414 underlying the input area 102, the pick-off rollers 414 configured to move a bottom-most card 210 in a stack in the input area 102 toward a lateral side of the first independent module 300 opposite the input area 102. More specifically, each pick-off roller 414 may be positioned to contact only the bottom-most card 210 in the stack and to move that card 210, one card 210 at a time, from the stack in the input area 102 toward a laterally adjacent component of the first independent module 300, such as, for example, the card identification system 106 shown in FIG. 4, or a laterally adjacent module. The bottom plate 324 may be laterally smaller than the cards 210, enabling the pick-off rollers 414 to contact the bottom-most card 210 laterally adjacent to the bottom plate 324, or may include holes therethrough, enabling the pick-off rollers 414 to contact the bottom-most card 210 through the bottom plate 324. Each pick-off roller 414 may be driven, or the pick-off rollers 414 as a group may be collectively driven, by an associated motor 312, either directly or via a force transfer mechanism. The motor 312 may be operatively connected to the controller 202, which may issue control signals to the motor 312 to cause the motor 312 to selectively drive the associated pick-off roller 414 in a selected direction or stop driving the associated pick-off roller 414.

The input mechanism 104 may further include, for example, a pair of brake rollers 416 positioned and configured to receive each card 210 from the last pick-off roller 414 and pass each respective card 210 toward the temporary storage 112 (see FIGS. 1, 2). For example, the brake rollers 416 may be located less than a card's 210 minimum length laterally away from the last pick-off roller 414, one of the brake rollers 416 may be located vertically to contact a leading end of a card 210 as the card 210 is advanced by the pick-off rollers 414 and draw the card 210 between the brake rollers 416, and the brake rollers 416 may be vertically spaced from one another by a distance equal to, or less than, an average thickness of the cards 210. More specifically, the brake rollers 416 may be located about 3.25 inches or less laterally away from the last pick-off roller 414, the bottom-most brake roller 416 may be located such that a vertex of the brake roller 416 is between about 0.01 inch and about 0.125 inch vertically higher than the vertex of the immediately adjacent pick-off roller 414, and the brake rollers 416 may be vertically spaced from one another by a distance of between about 0.005 inch and about 0.02 inch. At least one of the brake rollers 416 may be driven by an associated motor 316, either directly or via a force transfer mechanism. The motor 316 may be operatively connected to the controller 202, which may issue control signals to the motor 316 to cause the motor 316 to selectively drive the associated brake roller 416 in a selected direction or stop driving the associated brake roller 416.

The card identification system 106 may be located downstream of the brake rollers 416, and may be configured to receive each card 210 from the brake rollers 416, identify each card 210 received from the brake rollers 416 and pass each card identified by the card identification system 106 on to a next adjacent component or independent module. For example, the card identification system 106 may include another pair of pinch rollers 418 (which may also be characterized as "speed-up" or "transport" rollers) located less than a card's 210 minimum length laterally away from the upstream brake rollers 416 and having a central pinch point generally aligned (e.g., exactly aligned or spaced one card 210 thickness or less from being aligned) with the pinch point of the brake rollers 416 interposed between the card identification system 106 and the input area 102. At least one of the pinch rollers 418 may be driven by an associated motor 318, either directly or via a force transfer mechanism.

The motor 318 may be operatively connected to the controller 202, which may issue control signals to the motor 318 to cause the motor 318 to selectively drive the associated pinch rollers 418 in a selected direction or stop driving the associated pinch rollers 418.

The card identification system 106 may include a sensor 108 laterally adjacent to the pinch rollers 418 and oriented to detect the identity of cards 210 as the cards 210 are moved past the sensor 108 by the pinch rollers 418. The sensor 108 may be configured to detect the identity of the cards 210 by, for example, detecting radiation reflected from the face of the card 210, generating a signal indicative of the detected radiation, and using pattern recognition to associate that signal, locally at the sensor 108 or utilizing the controller 202, with an identity of the card 210. The sensor 108 may include, for example, a camera, a video graphics array camera, an active-pixel sensor, or a complementary metal-oxide-semiconductor sensor. The sensor 108, the controller 202, or both may be trained to correlate a given signal from the sensor 108 with an accurate identification of a card's 210 identity, including rank and suit or identity as a special card (e.g., cut card, blank, bonus card), utilizing a neural network, by converting individual pixels to binary and performing a template match, or otherwise as described in U.S. Pat. No. 7,764,836, issued Jul. 27, 2010, to Downs et al., the disclosure of which is incorporated herein in its entirety by this reference. The sensor 108 may be located within a dedicated housing 422 within the card-handling device 100 (see FIGS. 1, 2), and optionally within the first independent module 300. For example, the housing 422 may be dust-proof, may include an aperture 424 through which the sensor 108 may detect information from the face of the card 210 on one major surface 212 on a bottom side of the card 210, and may be independently removable from the item card-handling device 100 (see FIGS. 1, 2), the first independent module 300, or both for ease of installation, servicing, and replacement.

In some embodiments, the input mechanism 104 may include a pushback bar 420 positioned and configured to selectively urge one or more cards 210 from proximate to the pick-off rollers 414 back into the input area 102. For example, the pushback bar 420 may be laterally interposed between the final pick-off roller 414 and the brake rollers 416. The pushback bar 420 may include, for example, an arm selectively movable from outside a path traveled by cards 210 from the input area 102 toward the card identification system 106, leaving the path unobstructed by the pushback bar 420, into the path and toward the input area 102. The pushback bar 420 may be actuated by a motor 322, either directly or via a force transfer mechanism. The motor 322 may be operatively connected to the controller 202, which may issue control signals to the motor 322 to cause the motor 322 to selectively drive the associated pushback bar 420 or stop driving the associated pushback bar 420. More specifically, the motor 322 may cause the pushback bar 420 to repeatedly enter the path moving in a direction toward the input area 102, push any card 210 within the path over the lateral distance covered by the pushback bar 420 completely back into the input area 102, and exit the path to return to its original position in a reciprocating fashion. The controller 202 may be configured to activate the pushback bar 420 when a jam in the input mechanism 104 has been detected, such as, for example, when a time between activating the pick-off roller 414 and receiving a signal from the card identification system 106 exceeds a predefined limit or when a time between receiving one signal from the card identification system 106 and receiving a subsequent signal from the card identification system 106 exceeds a predefined limit. The predefined limit for activating the pushback bar 420 may be, for example, about 5 seconds or less (e.g., about 2 seconds, about 1 second).

Figure 5:
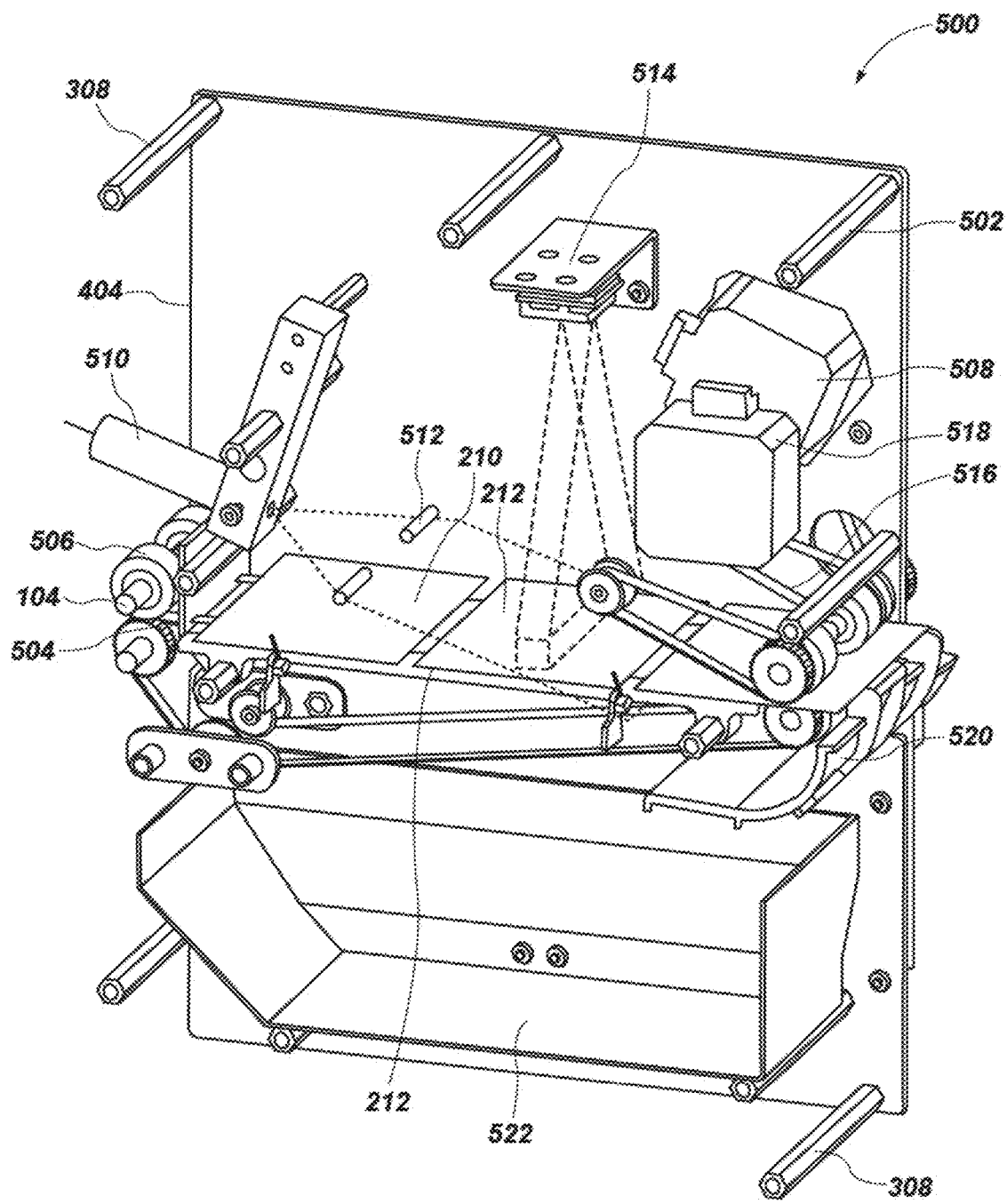
FIG. 5 is a partial cutaway, side perspective view of a defect detection system of the card-handling device of FIG. 1.

FIG. 5 is a partial cutaway, side perspective view of the defect detection system 500 of the card-handling device 100 of FIG. 1. The defect detection system 500 may be the second independent module, and may be positioned along a card path through the device 100 (e.g., laterally adjacent to) the first independent module 300 of FIGS. 3 and 4. As with the first independent module 300, the defect detection system 500 may include a second frame 502 having a pair of plates 404 separated by, and secured to one another, by spacers 308. The plates 404 may include attachment features (e.g., holes, threaded holes, snap receivers) sized, positioned, and configured to enable the operational components and the spacers 308 of the defect detection system 500 to be supported by the plates 404 in a selected location and orientation relative to one another. In some embodiments, the plates 404 may include additional holes enabling portions of the operational components not relied on for attachment to a given plate 404 to extend through the hole. As with FIG. 4, one plate 404 in FIG. 5 has been removed for convenience in depicting other components of the defect detection system 500.

The defect detection system 500 may include, for example, additional portions of the input mechanism 104, such as a belt transport 504 and a pinch roller 506 positioned and configured to receive each card 210 from the pinch rollers 418 (see FIG. 4) of the card identification system 106 (see FIG. 4) and pass each respective card 210 toward the temporary storage 112 (see FIGS. 1, 2). For example, the belt transport 504 and pinch roller 506 may be located less than a card's minimum length laterally away from the pinch rollers 418 (see FIG. 4), may have a central pinch point generally aligned (e.g., exactly aligned or spaced one card 210 thickness or less from being aligned) with the pinch point of the pinch rollers 418, and may be vertically spaced from one another by a distance equal to, or less than, an average thickness of the cards 210. At least the belt transport 504, and optionally the pinch roller 506, may be driven by an associated motor 508, either directly or via a force transfer mechanism. The motor 508 may be operatively connected to the controller 202, which may issue control signals to the motor 508 to cause the motor 508 to selectively drive the associated belt transport 504 and/or pinch roller 506 in a selected direction or stop driving the associated belt transport 504 and/or pinch roller 506. The belt transport 504 may extend laterally along at least substantially an entire lateral extent of the defect detection system 500 and, once a card 210 has laterally passed the pinch roller 506, a major surface 212 on an underside of each card 210 may rest on the belt transport 504 and a major surface 212 on a top side of each card 210 may be free from contact with any other device or structure. As a result, each card 210 may at least temporarily take on its natural shape during transport on the belt transport 504, including exhibiting any bends, folds, creases, kinks, frays, and/or tears in the card 210. An unimpeded view of the major surface 212 of each card 210 from a top side of the card 210 may be granted while the card 210 is supported on the belt transport 504.

The defect detection system 500 may include an emitter 510 positioned and configured to emit radiation toward a card 210 as the card 210 is transferred by the belt transport 504 of the input mechanism 104. For example, the emitter 510 may be located proximate to the pinch roller 506 above the belt transport 504, may be supported on the second frame 502, and may be oriented to direct a beam, line, or point of radiated energy toward an upward-facing major surface 212 of each card in a predefined location along the belt transport 504. More specifically, the emitter 510 may be oriented to direct a line of infrared radiation across an entire width of the upward-facing major surface 212 of each card at approximately a midpoint of the belt transport 504, the infrared radiation being emitted at an oblique angle relative to the belt transport 504 and to horizontal. As a specific, nonlimiting example, the emitter 510 may be positioned and oriented to direct an infrared laser line across an entire width of a card's 210 back major surface 212, and repeated analysis of the reflected radiation as the card 210 is moved lengthwise by the belt transport 504 may enable the defect detection system 500 to capture information at least substantially representative of the shape of the entire back major surface 212 of the card 210. The emitter 510 may include, for example, a laser. More specifically, the emitter 510 may include, for example, a line laser. As a specific, nonlimiting example, the emitter 510 may include an infrared line laser having a power rating of about 100 W or less.

In some embodiments, the defect detection system 500 may include one or more radiation blockers 512 interposed between the emitter 510 and the card 210 on the upper surface of the belt transport 504. Each radiation blocker 512 may be positioned and may be of a material configured to at least substantially block or otherwise absorb a portion of the radiation emitted by the emitter 510. Radiation blockers 512 may assist in focusing radiation from the emitter 510, ensuring that less radiation is leaked around the interior of the defect detection system 500, reducing the likelihood that leaked radiation may affect defect detection, increasing the comparative intensity of radiation reflected off the major surface 212 of each card 210, and improving the accuracy with which defects in each card 210 may be detected.

The defect detection system 500 may include a detector 514 positioned and configured to detect radiation emitted by the emitter 510 and reflected from the upward-facing major surface 212 of a card 210 as the card 210 is transferred by the belt transport 504 of the input mechanism 104. For example, the detector 514 may be located laterally downstream from the pinch roller 506 above the belt transport 504, may be supported on the second frame 502, and may be oriented to detect the beam, line, or point of radiated energy reflected from the upward-facing major surface 212 of each card in a predefined location along the belt transport 504. More specifically, the detector 514 may be positioned and oriented to detect a line of infrared radiation across an entire width of the upward-facing major surface 212 of each card at approximately a midpoint of the belt transport 504. While FIG. 5 illustrates the emitter 510 and detector 514 on one side of the cards 210, in additional embodiments, other configurations may be utilized (e.g., thru transmission).

The detector 514 may be configured to receive the type of radiation transmitted (e.g., reflected, refracted) from the emitter 510. For example, the detector 514 may include a camera. More specifically, the detector 514 may include, for example, a video graphics array camera or a super video graphics array camera. The detector 514, the controller 202, or both may be trained to correlate a given signal from the detector 514 with an identification of the degree to which the major surface 212 of a card's 210 has deviated from a horizontal plane. For example, the detector 514, the controller 202, or both may be cooperatively programmed to employ pattern recognition to identify variations in the distance between the illuminated line of radiation from the emitter 510 on the major surface 212 of the card 210 and the detector 514 both along the line across the width of the card 210 and along the length of the card 210 as the card 210 is moved by the belt transport 504. More specifically, the detector 514, the controller 202, or both may be cooperatively programmed to acquire at least one image of the card 210 while illuminated by the emitter 510, extract a region of the image(s) where the radiation is most intense, analyze a region of the reflected radiation of highest intensity across the width of the card 210 to determine the distance from the major surface 212 to the detector 514 along the region of reflected radiation, perform a median filter to reduce noise, and repeat this process along the length of the card 210. The detector 514, the controller 202, or both cooperatively may thus be able to determine whether a card 210 has been bent, folded, creased, kinked, frayed, or marked beyond an acceptable tolerance or whether the card 210 has been torn or ripped.

The input mechanism 104 may include a pinch belt transport 516 located downstream of the detector 514 and configured to pinch each card 210 previously free to exhibit any deformations from flat closer to being flat. For example, the belt transport 504 and pinch belt transport 516 may be located more than a card's minimum length laterally away from the immediately preceding pinch roller 506, may have a central pinch point generally aligned (e.g., exactly aligned or spaced one card 210 thickness or less from being aligned) with the pinch point of the belt transport 504 and pinch roller 506, and may be vertically spaced from one another by a decreasing distance from a maximum greater than or equal to half of a length of a card 210 to a minimum equal to, or less than, an average thickness of the cards 210. A lateral distance over which the distance between the pinch belt transport 516 and the belt transport 504 may decrease due to angling of a bottom surface of the pinch belt transport 516 relative to the belt transport 504 may be, for example, about equal to a length of a card 210 or less. The pinch belt transport 516 may be driven by an associated motor 518, either directly or via a force transfer mechanism. The motor 518 may be operatively connected to the controller 202, which may issue control signals to the motor 518 to cause the motor 518 to selectively drive the associated pinch belt transport 516 in a selected direction or stop driving the associated pinch belt transport 516.

In some embodiments, at least a portion of a diverter 110 may be included in the defect detection system 500. For example, the diverter 110 may include a deflector 520 positioned and configured to remove at least certain defective cards 210 from further traveling along the input mechanism 104 and redirect the defective cards 210 toward a compartment 522 positioned, sized, shaped, and otherwise configured to temporarily store cards 210 having the certain defect. More specifically, the deflector 520 may be positioned and configured to divert each card 210 detected to be torn by the defect detection system 500 downward from proximate to the belt transport 504 to a compartment 522 configured as a basin underlying the belt transport 504 and sized to hold bulk quantities of torn cards 210 in the compartment 522 for subsequent removal, inspection, recycling, repurposing, or any combination of these. As a specific, nonlimiting example, the deflector 520 may be positioned and configured to divert torn cards 210 from laterally adjacent to the belt transport 504 downward to a compartment 522 sized to hold at least 52 (e.g., up to 450) torn cards 210 and accessible by pulling the compartment 522 out like a drawer.

The deflector 520 may include, for example, a ramp, scoop, or otherwise curved or sloped member selectively movable into the card path, causing advancing cards 210 to contact the deflector 520 and be diverted from the card path downward to the compartment 522. More specifically, the deflector 520 may pivot from below a pinch point of the pinch belt transport 516, to above the pinch point of the pinch belt transport 516, to present a curved surface that a respective card 210 may contact, causing the card 210 to be redirected as the card 210 is advanced against the curved surface of the deflector 520 and fall into the compartment 522. As a specific, nonlimiting example, the deflector 520 may include a scoop configured to pivot about a roller at a forward, lower-most end of the pinch belt transport 516 from a first location below the pinch point of the pinch belt transport 516 to a second location above the pinch point, and an advancing card 210 may impact a concave surface of the deflector 520, be redirected downward as the card is advanced against the deflector 520, and fall into the compartment 522 with any other loose cards 210 therein. The deflector 520 may be selectively moved from the first location to the second location under control of the controller 202 at least when the controller 202 receives from identification system 106, the detector 514, or both an indication that a card 210 approaching the deflector 520 is unidentifiable, torn, incomplete, upside-down, or otherwise unreadable by the identification system 106.

Figure 6:
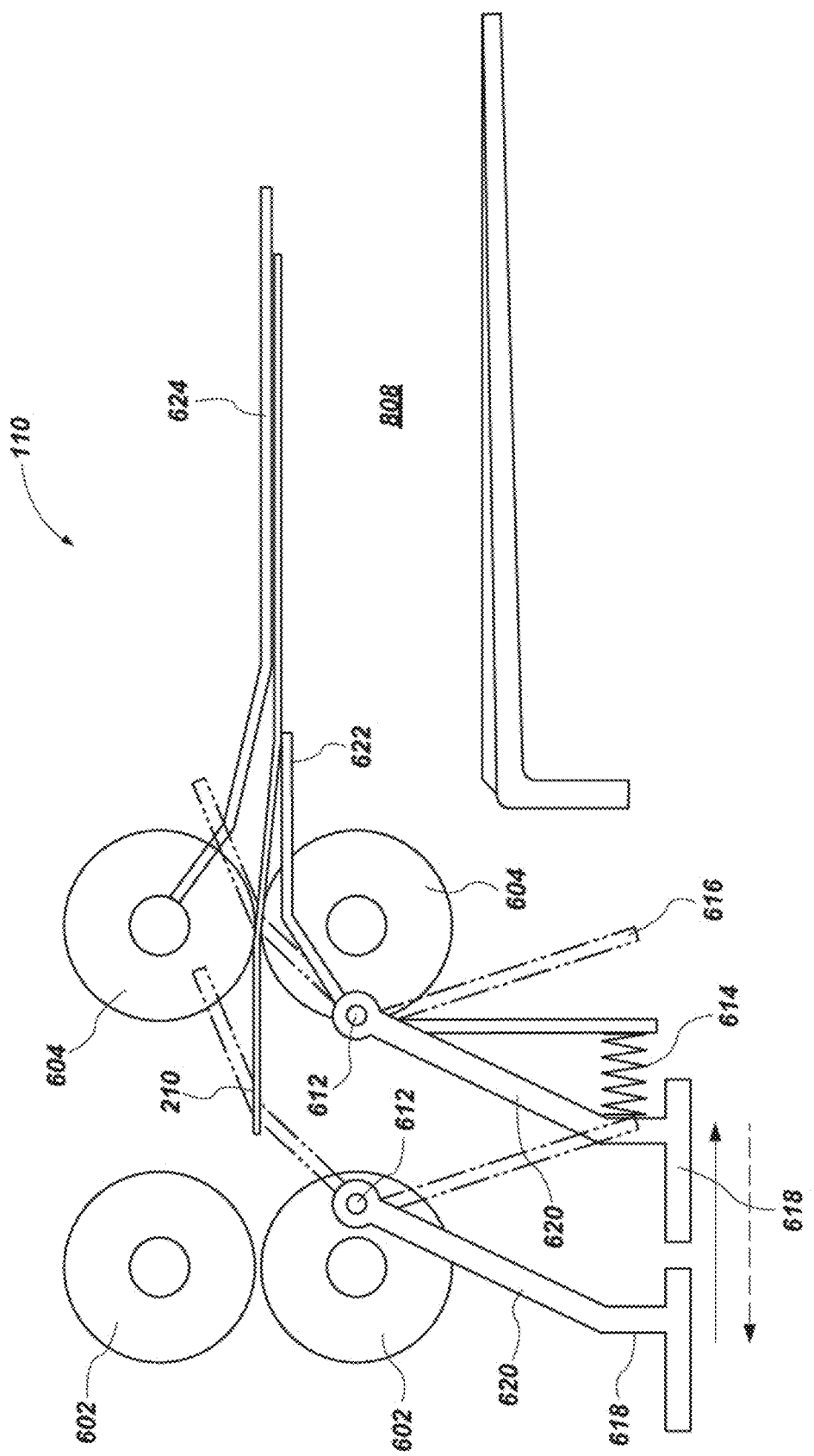
FIG. 6 is an enlarged, schematic side view of one implementation of a portion of a diverter of the card-handling device of FIG. 1.

FIG. 6 is a schematic side view of a portion of the diverter 110 interposed between the input mechanism 104 and the temporary storage 112 of FIG. 1. This specifically depicted portion of the diverter 110 may be at a terminus of the diverter 110, where cards 210 are introduced into another compartment 808, which may also be characterized as a "vault." This portion of the diverter 110 may include, for example, a pair of pinch rollers 602 positioned and configured to receive each card 210 from an upstream portion of the diverter 110, as described in greater detail in connection with FIGS. 7 and 8, and pass each respective card 210 toward the other compartment 808. For example, one of the pinch rollers 602 may be located vertically to contact a leading end of a card 210 as the card 210 is advanced through the diverter 110 and draw the card 210 between the pinch rollers 602, and the pinch rollers 602 may be vertically spaced from one another by a distance equal to, or less than, an average thickness of the cards 210. At least one of the pinch rollers 602 may be driven by an associated motor, either directly or via a force transfer mechanism. The motor may be operatively connected to the controller 202, which may issue control signals to the motor to cause the motor to selectively drive the associated pinch roller 602 in a selected direction or stop driving the associated pinch roller 602.

The diverter 110 may include yet another pair of pinch rollers 604 positioned and configured to receive each card 210 from the adjacent pinch rollers 602 and selectively pass each respective card 210 toward the other compartment 808. For example, the pinch rollers 604 may be located less than a card's 210 minimum length laterally away from the upstream pinch rollers 602, one of the pinch rollers 604 may be located vertically to contact a leading end of a card 210 as the card 210 is advanced by the pinch rollers 602 and draw the card 210 between the pinch rollers 604, and the pinch rollers 604 may be vertically spaced from one another by a distance equal to, or less than, an average thickness of the cards 210. At least one of the pinch rollers 604 may be driven by an associated motor, either directly or via a force transfer mechanism. The motor may be operatively connected to the controller 202, which may issue control signals to the motor to cause the motor to selectively drive the associated pinch roller 604 in a selected direction or stop driving the associated pinch roller 604.

The diverter 110 may include, for example, a swing arm 618 positioned, shaped, and configured to permit each card 210 to pass from the first pair of pinch rollers 602 to the second pair of pinch rollers 602 when traveling along the card path (e.g., laterally) from proximate to the defect detection system 500 (see FIG. 5) toward the other compartment 808 and to ensure each card 210 is stacked on previously inserted cards in the other compartment 808. The swing arm 618 may be configured to move in a reciprocating fashion in directions parallel to the movement of cards 210 between the rollers 602 and 604, as shown by the arrows underlying the swing arm 618. For the sake of clarity, the swing arm 618 is shown at both lateral extents of its reciprocating movement, though only one swing arm 618 may typically be provided in the diverter 110. The swing arm 618 may include, for example, a deflecting portion 622 shaped to permit a card 210 to pass in a predetermined direction along the card path (e.g., from the first pair of pinch rollers 602 to the second pair of pinch rollers 604 and beyond) when the swing arm 618 is in a first, downstream position as shown on the right-hand side of FIG. 6. The deflecting portion 622 of the swing arm 618 may also be configured to ensure that each newly inserted card 210 is fully inserted into the other compartment 808, is positioned on top of the stack within the other compartment 808, and is capable of receiving the next inserted card 210 above the last inserted card 210. The swing arm 618 may also include, for example, a swinging portion 620 connected to the deflecting portion 622, the swinging portion 620 configured, under the force of gravity, to urge the swing arm 618 to adopt an orientation enabling the foregoing functionality.

Finally, the swing arm 618 may include a pivot 612 interposed between the deflecting portion 622 and the swinging portion 620, the pivot 612 supported by a frame 802 of an associated module 800 (see FIG. 8) and configured to enable the swing arm 618 to rotate about the pivot 612, at least over a certain range of motion. More specifically, the deflecting portion 622 of the swing arm 618 may extend from below the pinch point of the second pair of pinch rollers 604 upward to above the pinch point of the second pair of pinch rollers 604, and laterally from proximate to the second pair of pinch rollers 604 beyond a farthest lateral extent of the second pair of pinch rollers 604 when the swing arm 618 is in a first, rightmost position, as shown in FIG. 6. The deflecting portion 622 of the swing arm 618 may extend from below the pinch point of the first pair of pinch rollers 602 upward to above the pinch point of the first pair of pinch rollers 602, and laterally from proximate to the first pair of pinch rollers 602 at least to a closest lateral extent of the second pair of pinch rollers 604 when the swing arm 618 is in a second, leftmost position, as also shown in FIG. 6. In some embodiments, the swing arm 618 may include a biasing element 614 (e.g., a spring) positioned and configured to bias the respective swing arm 618 toward a rotational position where the deflecting portion 622 is located in a predetermined orientation. In some embodiments, the swing arm 618 may include a backstop 616 positioned and configured to inhibit (e.g., prevent) rotation of an associated swing arm 618 beyond a point where the deflecting portion 622 would be oriented away from the other compartment 808.

In operation, a card 210 driven by the first pair of pinch rollers 602 may contact the deflecting portion 622 of the swing arm 618 in the first position, rotating the swing arm 618 clockwise (when viewed in the orientation shown in FIG. 6) to a point where the deflecting portion 622 is located below the pinch points of the first pair of pinch rollers 602 and the second pair of pinch rollers 604 (i.e., from the orientation for deflecting portion 622 shown in dashed lines to the orientation shown in solid lines), and permitting the card 210 to move laterally past the swing arm 618 to the second pair of pinch rollers 604. Clockwise movement of the deflecting portion 622, in the orientation shown in FIG. 6, may also cause the deflecting portion 622 to contact a stack of cards already in the compartment 522 (see FIG. 5), making space for an incoming card 210 to be positioned on top of the stack. Once a trailing end of the card 210 has passed the first pair of pinch rollers 602, the swing arm 618 may be moved laterally from proximate the other chamber 808 toward the first pair of pinch rollers 602 at least to a point where the deflecting portion 622 clears the trailing end of the card 210. The swing arm 618 may then rotate counter-clockwise to a point where the deflecting portion 622 is again located above the pinch point of at least the second pair of pinch rollers 604. The swing arm 618 may then be moved laterally back toward the other chamber 808 in a reciprocating motion, causing the deflecting portion 622 to contact the trailing end of the card 210, urge the card 210 into the other chamber 808, and ensure that the card 210 remains below the pinch point of the second pair of rollers 604 in the event that another card 210 is placed on top of the stack in the other chamber 808.

The controller 202 may issue control signals to one or more upstream components relative to the diverter 110 to pause advancement of upstream cards 210 at least until the given card 210 has been displaced from further advancement toward the temporary storage 112 (see FIGS. 1, 2) and toward the other compartment 808. The biasing element 614, backstop 616, or gravity may provide the necessary force to resist continued rotation of the swing arm 606 or 618. The deflecting portion 622 and a guide 624 overlying the deflecting portion 622 downstream of the second pair of pinch rollers 604 may also present guiding surfaces to direct cards 210 passing through the second pair of pinch rollers 604 toward the other compartment 808 and on top of any other cards 210 already located therein. The controller 202 may be capable of tracking the location of each card 210 within the card-handling device 100 in view of its control over the input mechanism 104 and receipt of signals from the card identification system 106 and/or defect detection system 500. When a card having a specific identity (e.g., rank and suit) has been identified as having the defect (e.g., being torn, ripped, or unreadable by the card identification system 106) associated with the other compartment 808, the controller 202 may update a database of which cards have that specific defect with the number of total cards having the defect and the identity of the specific card (or lack thereof) newly added to the list.

Figure 7:
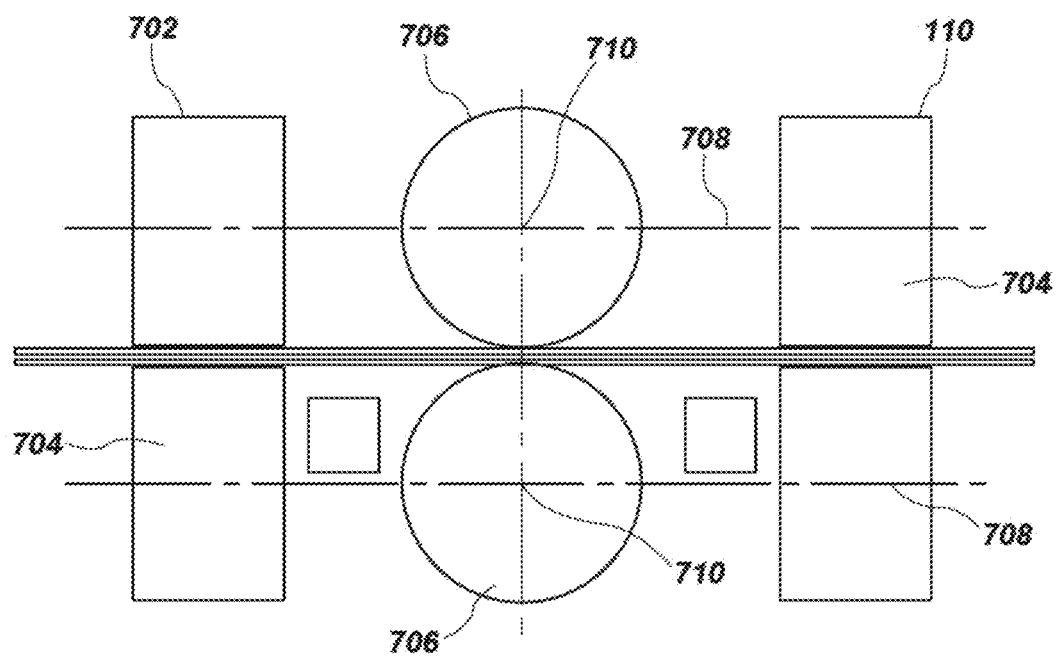
FIG. 7 is a schematic side view of an implementation of another portion of a diverter of the card-handling device of FIG. 1.

FIG. 7 is a schematic side view of a portion of the diverter 100 of FIG. 1 upstream of the portion depicted in FIG. 6. Downstream of the defect detection system 500 (see FIG. 5) and downstream of the deflector 520 (see FIG. 5), the diverter 110 may include a set of rollers 702 positioned and configured to transfer cards 210 laterally away from the temporary storage 112 and toward the other compartment 808 (see FIG. 6). More specifically, the set of rollers 702 may include, for example, a first pair of pinch rollers 704 positioned and oriented to receive cards 210 from the adjacent pinch belt transport 516 (see FIG. 5) and to continue moving the cards from the defect detection system 500 toward the temporary storage 112 (see FIGS. 1, 2) and a second pair of pinch rollers 706 positioned laterally between the first pair of pinch rollers 704 and oriented to laterally displace cards 210 from between the first pair of pinch rollers 704 away from the temporary storage 112 (see FIGS. 1, 2). As a specific, nonlimiting example, the set of rollers 702 may include a first pair of pinch rollers 704 having first axes of rotation 708 oriented perpendicular to a direction of movement of each card 210 from the immediately adjacent, upstream pinch belt transport 516 (see FIG. 5) toward the temporary storage 112 (see FIGS. 1, 2) and a second pair of pinch rollers 706 having second axes of rotation 710 oriented parallel to the direction of movement of each card 210 from the immediately adjacent, upstream pinch belt transport 516 (see FIG. 5) toward the temporary storage 112 (see FIGS. 1, 2). In some embodiments, the first pair of pinch rollers 704 may be consolidated with, and replaced by, the upstream pinch belt transport 516 (see FIG. 5), with the second pair of pinch rollers 706 located horizontally between the upstream pinch belt transport 516 (see FIG. 5).

Figure 8:
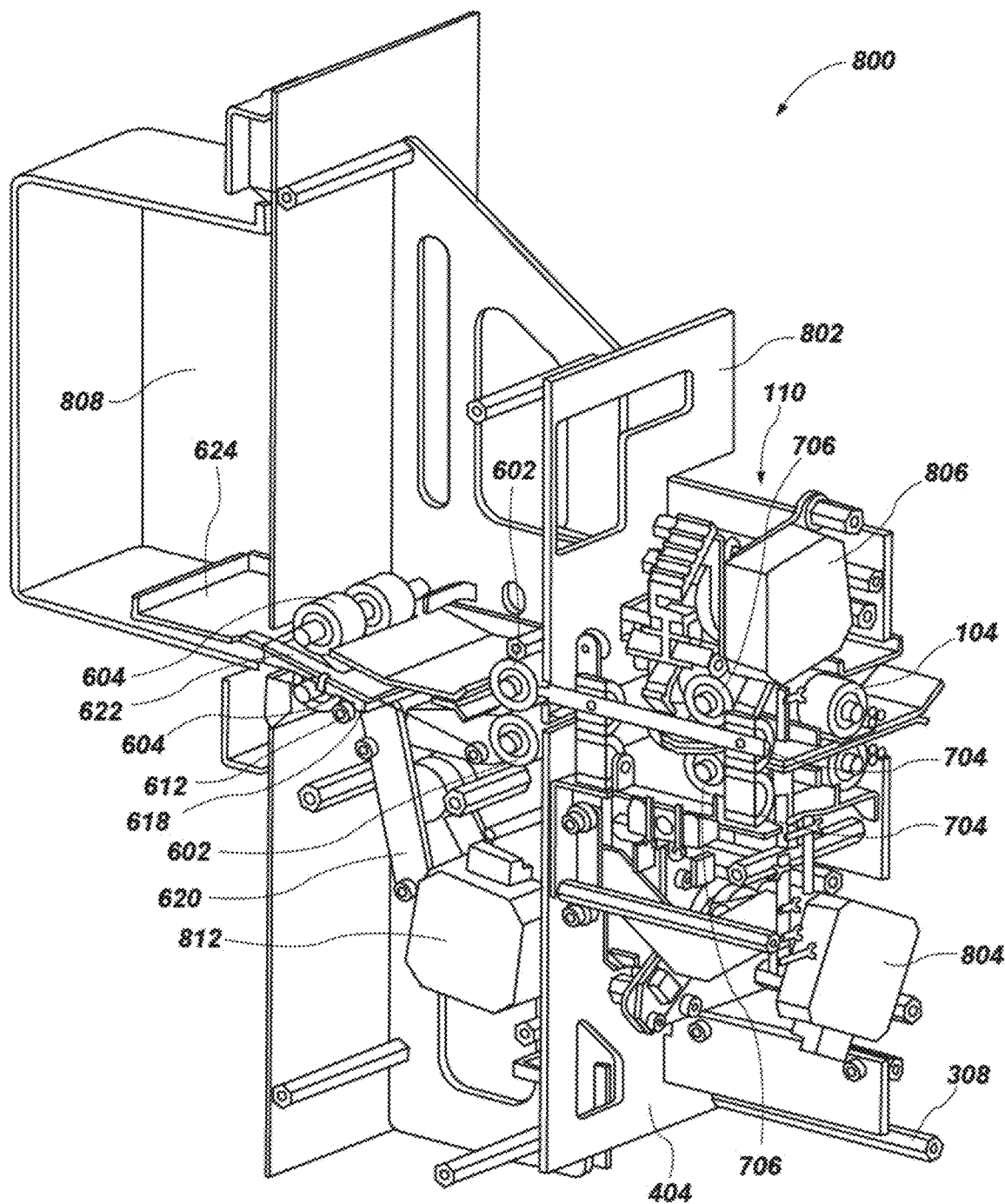
FIG. 8 is a partial cutaway, side perspective view of the diverter of FIG. 1, FIG. 6, and FIG. 7.

FIG. 8 is a partial cutaway, side perspective view of the diverter 110 of a portion of the card-handling device FIG. 1, depicting components as described above with respect to FIG. 6 and FIG. 7. These portions of the diverter 110 may be provided as a third independent module 800. The third independent module 800 may include a third frame 802 having a pair of plates 404 separated by, and secured to one another, by spacers 308. The plates 404 may include attachment features (e.g., holes, threaded holes, snap receivers) sized, positioned, and configured to enable the operational components and the spacers 308 of the third independent module 800 to be supported by the plates 404 in a selected location and orientation relative to one another. In some embodiments, the plates 404 may include additional holes enabling portions of the operational components not relied on for attachment to a given plate 404 to extend through the hole. As with FIG. 4, one plate 404 in FIG. 8 has been removed for convenience in depicting other components of the third independent module 800.

The first pair of pinch rollers 704 may be located less than a card's 210 minimum length laterally away from the immediately adjacent, upstream pinch belt transport 516 (see FIG. 5), one of the pinch rollers 704 may be located vertically to contact a leading end of a card 210 as the card 210 is advanced by the upstream pinch belt transport 516 (see FIG. 5) and draw the card 210 between the pinch rollers 704, and the pinch rollers 704 may be vertically spaced from one another by a distance equal to, or less than, an average thickness of the cards 210. In some embodiments, the vertical distance between the pinch rollers 704 may be variable, and the pinch rollers 704 may be urged toward one another by a biasing element (e.g., a spring or solenoid or linear actuator under control of the controller 202), which urging may optionally be under the selective control of the controller 202. At least one of the pinch rollers 704 may be driven by an associated motor 804, either directly or via a force transfer mechanism. The motor 804 may be operatively connected to the controller 202, which may issue control signals to the motor 804 to cause the motor 804 to selectively drive the associated pinch roller 704 in a selected direction or stop driving the associated pinch roller 704.

The second pair of pinch rollers 706 may be located more than a card's 210 minimum length laterally away from the upstream pinch belt transport 516 (see FIG. 5) and less than a card's 210 minimum length laterally away from the first pair of pinch rollers 704. A pinch point of the pinch rollers 706 may be located vertically to enable a card 210 to enter between the second pair of pinch rollers 706 as the card 210 is advanced by the first pair of pinch rollers 704. The pinch rollers 704 may be vertically spaced from one another by a distance equal to, or less than, an average thickness of the cards 210. In some embodiments, the vertical distance between the pinch rollers 706 may be variable, and the pinch rollers 706 may be urged toward one another by a biasing element (e.g., a spring or solenoid or linear actuator under control of the controller 202), which urging may optionally be under the selective control of the controller 202. At least one of the pinch rollers 706 may be driven by an associated motor 806, either directly or via a force transfer mechanism. The motor 806 may be operatively connected to the controller 202, which may issue control signals to the motor 806 to cause the motor 806 to selectively drive the associated pinch roller 706 in a selected direction or stop driving the associated pinch roller 706.

When the defect detection system 500 indicates that a given card 210 does not exhibit any of the defects detectable utilizing the defect detection system 500 (e.g., or if the defects are within an acceptable tolerance or threshold), and the card identification system 106 detects the identity of the given card 210, the controller 202 may issue control signals to the motor 804 driving the first pair of pinch rollers 704 to continue driving that card 210 toward the temporary storage 112 (see FIGS. 1, 2) (e.g., the card 210 may continue in substantially the same direction and/or plane along the card path). When the defect detection system 500 indicates that a given card 210 exhibits at least one defect, the card identification system 106 is unable to detect the identity of the card 210, or both, and the card 210 has not already been redirected to the compartment 522 (see FIG. 5) utilizing the deflector 520 (see FIG. 5), the controller 202 may issue control signals to the motor 804 driving the first pair of pinch rollers 704 to stop driving that card 210 toward the temporary storage 112 (see FIGS. 1, 2). The controller 202 may also issue control signals to one or more upstream components of the input mechanism 104 and/or the diverter 110 to pause advancement of upstream cards 210 at least until the given card 210 has been displaced from further advancement toward the temporary storage 112 (see FIGS. 1, 2). The controller 202 may then issue control signals to the motor 806 to begin driving the second, transverse (e.g., perpendicular) pair of pinch rollers 706, causing the pinch rollers 706 to drive the given card 210 laterally out of the path from the defect detection system 500, through the third independent module 800, toward the other compartment 808 (e.g., the card 210 may be direction in a direction transverse, and in substantially the same plane as, the original card path).

In some embodiments, the deflector 520 (see FIG. 5) may be employed only for cards 210 having certain categories of defects and the diverter 110 may be employed only for cards 210 having other categories of defects. For example, the deflector 520 (see FIG. 5) may be used to direct cards 210 that are torn into the compartment 522, and the diverter 110 may be used to direct cards 210 that are bent, folded, creased, kinked, or frayed beyond a predefined limit into the other compartment 808. For example, the controller 202 may cause the set of rollers 702 to redirect a card 210 laterally away from the temporary storage 112 (see FIGS. 1, 2) when a maximum deviation of the major surface 212 of the card 210 from a horizontal plane is about 0.3 mm or more. More specifically, the controller 202 may cause the set of rollers 702 to redirect a card 210 laterally away from the temporary storage 112 (see FIGS. 1, 2) when the maximum deviation of the major surface 212 of the card 210 from the horizontal plane is between about 0.3 mm and about 40 mm. As a specific, nonlimiting example, the controller 202 may cause the set of rollers 702 to redirect a card 210 laterally away from the temporary storage 112 (see FIGS. 1, 2) when the maximum deviation of the major surface 212 of the card 210 from the horizontal plane is about 0.4 mm, about 0.5 mm or more, or about 0.6 mm or more.

The third independent module 800 may include the other compartment 808 positioned, sized, shaped, and otherwise configured to temporarily store cards 210 having the certain categories of defects in a position laterally offset from the temporary storage 112 (see FIGS. 1, 2). For example, the set of rollers 702 may include those previously describe pairs of pinch rollers 602 and 604 providing a continuous path from the pinch rollers 706 that initially divert the card to the other compartment 808 configured as a removable rectangular prism and sized to hold bulk quantities of bent, folded, creased, kinked, and/or frayed cards 210 in the other compartment 808 for subsequent removal, inspection, recycling, repurposing, or any combination of these. As a specific, nonlimiting example, the pinch rollers 706 and pinch rollers 602 and 604 may be positioned and configured to cooperatively divert and transfer bent, folded, creased, kinked, or frayed cards 210 from a pathway extending from the defect detection system 500 (see FIG. 5) to the temporary storage 112 (see FIGS. 1, 2) laterally outward to a laterally adjacent other compartment 808 sized to hold at least 52 (e.g., up to 450) bent, folded, creased, kinked, or frayed cards 210 in an orderly stack and accessible by detaching a snap-in connection of the other compartment 808 and completely removing, emptying, and re-attaching the other compartment 808 or replacing with a similarly configured and empty other compartment 808.

In some embodiments, the other compartment 808 may be capable of vertically displacing as cards 210 are introduced into a stack at the bottom of the other compartment 808. For example, as a card 210 is urged by the deflecting portion 622 of the swing arm 618 into the other compartment 808, and on top of any other cards already stacked within the other compartment 808, the other compartment 808 may displace at least substantially vertically downward by at least substantially the same distance as the card's thickness to accommodate the card 210 within the other compartment 808. Once the other compartment 808 has reached the vertical bottom of its travel, the other compartment 808 may be full of cards 210, and may be removed. The other compartment 808 may be biased vertically upward (e.g., utilizing a spring).

Figure 9:
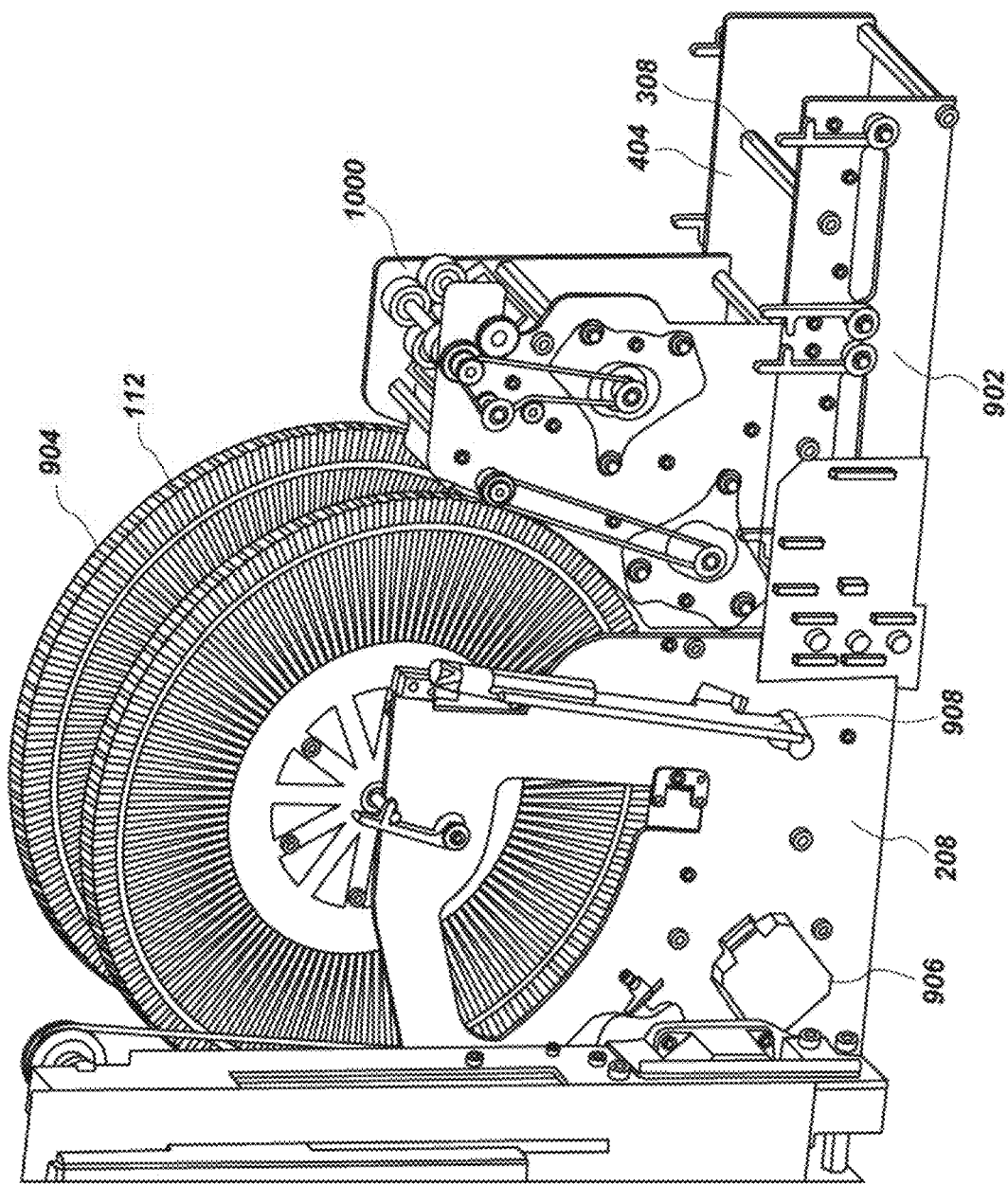
FIG. 9 is a partial cutaway, side perspective view of a temporary storage and an output mechanism of the card-handling device of FIG. 1.

FIG. 9 is a partial cutaway, side perspective view of a temporary storage 112 and an output mechanism 1000 of the card-handling device 100 of FIG. 1. Each of the temporary storage 112 and the output mechanism 1000 may be configured as an independent module, and each independent module, including the temporary storage 112 and the output mechanism 1000 may be supported on, and affixed to, a shared base 208. The base 208 may include a fourth frame 902 having a pair of plates 404 separated by, and secured to one another, by spacers 308. The plates 404 may include attachment features (e.g., holes, threaded holes, snap receivers) sized, positioned, and configured to enable the operational components and the spacers 308 of the base 208 to be supported by the plates 404 in a selected location and orientation relative to one another. In some embodiments, the plates 404 may include additional holes enabling portions of the operational components not relied on for attachment to a given plate 404 to extend through the hole.

The temporary storage 112 may be supported on the base 208 and may include compartments 904 sized, shaped, and configured to temporarily store cards 210 from the third independent module 800 (see FIG. 8) that have passed inspection by the defect detection system 500 and optionally the card identification system 106. For example, each compartment 904 may be sized and shaped to temporarily store multiple cards 210 in a subgrouping of at least two cards 210, and may be configured to inhibit (e.g., prevent) the cards 210 from prematurely exiting the compartment 904. More specifically, each compartment 904 may be sized and shaped to temporarily store between one and ten cards 210 in a subgrouping, and may include at least one clamp positioned to apply force to a major surface 212 of a card 210 in the subgrouping and maintain the subgrouping in the compartment 904 utilizing frictional force. As a specific, nonlimiting example, each compartment 904 may be sized and shaped to temporarily store up to five cards 210 in a subgrouping, and may include at least one leaf spring positioned to apply force to a major surface 212 of a card 210 in the subgrouping and maintain the subgrouping in the compartment 904 utilizing frictional force.

The compartments 904 may be arranged, for example, in a vertical stack or in a circumferential sequence. The temporary storage 112, or at least the compartments 904 thereof, may be movable to selectively align a given compartment 904 with the output of the third independent module 800 to receive a card 210 or with the output mechanism 1000 to output a card 210 thereto. For example, in embodiments where the compartments 904 are arranged in a circumferential sequence around a hub, the temporary storage 112 may be rotatable utilizing a motor 906, either directly or utilizing a force transfer mechanism, a configuration typically referred to in the art as a "carousel." In embodiments where the compartments 904 are arranged in a vertical stack, the temporary storage 112 may be raised and lowered utilizing the motor 906, either directly or utilizing a force transfer mechanism, a configuration typically referred to in the art as an "elevator." The position of the temporary storage 112 and the compartments 904 thereof, as well as the operation of the motor 906, may be tracked and controlled utilizing the controller 202.

The temporary storage 112 may have a sufficient number of compartments 904, and sufficient capacity in each compartment 904, to temporarily store at least one deck of at least 52 standard playing cards 210. For example, the temporary storage 112 may include at least 53 compartments 904, and each compartment may be sized and configured to temporarily store at least two cards 210. More specifically, the temporary storage 112 may include, for example, between about 106 and about 150 compartments 904, and each compartment 904 may be sized and configured to temporarily store up to ten cards. As a specific, nonlimiting example, the temporary storage 112 may include, for example, 130 compartments 904, and each compartment 904 may be sized and configured to temporarily store up to five cards. In some embodiments, the temporary storage 112 may be capable of temporarily storing, for example, up to 12 decks of 53 playing cards 210 (52 standard cards and one joker) with room for excess or duplicate cards in additional compartments 904. More specifically, the temporary storage 112 may be capable of temporarily storing, for example, up to 10 decks of 53 playing cards 210 (52 standard cards and one joker) with room for excess or duplicate cards in between about 10 and about 30 (e.g., about 25) additional compartments 904.

In some embodiments, the controller 202 may be configured to utilize the stored identity of a card 210 from the card identification system 106 (see FIG. 3), the tracked position of the card 210 along the input mechanism 104 (see FIGS.

1-8), and the tracked position and controlled movement of the temporary storage 112 to insert a card 210 having a specified identity into a designated compartment 904 for cards having that identity. For example, the controller 202 may associate each compartment 904 with a card identity, and cause only cards 210 having that identity to be received into the respective compartment 904 assigned to that identity. More specifically, the controller 202 may associate designated subgroupings of the compartments 904 with a unique card identity for each subgrouping, and cause only cards 210 having that identity to be inserted into the compartments 904 of the designated subgrouping assigned to that identity. As a specific, nonlimiting example, the controller 202 may predesignate two adjacent compartments 904 to a respective rank and suit for cards corresponding to a 52-card deck of standard playing cards, enabling a temporary storage 112 having 104 compartments 904 to temporarily store up to ten 52-card decks of standard playing cards 210, and may predesignate any additional compartments 904 to receive cards in excess of the ten-card limit for a given rank or suit (while tracking what identity of card 210 is placed in a respective additional compartment 904) or special cards, in the event that more than ten of a card 210 having a given identity are received into the card-handling device 100.

The output mechanism 1000 may be located adjacent to the temporary storage 112 on a lateral side of the temporary storage 112 opposite the defect detection system 500, and may cause one or more cards 210 to be ejected from the temporary storage 112 for output from the card-handling device 100. The output mechanism 1000 may include a first push bar 908 located on a same lateral side of a given compartment 904 as the defect detection system 500 (see FIGS. 1, 5) when the compartment 904 is positioned for unloading by the output mechanism 1000. The first push bar 908 may be movable toward an opposite lateral side of the given compartment 904, a portion of the first push bar 908 making contact with the cards 210 within the compartment 904 and urging them away from the defect detection system 500 (see FIGS. 1, 5) and partially out of the compartment 904. Trailing ends of the cards 210 in the compartment 904 may remain in the compartment 904, and the first push bar 908 may be returned to its original position proximate to the defect detection system 500 (see FIGS. 1, 5). The first push bar 908 may be actuatable utilizing a motor, either directly or via a force transfer mechanism, under control of the controller 202. Additional detail regarding the output mechanism 1000 is provided in connection with FIGS. 10 through 12 below.

Figure 10:
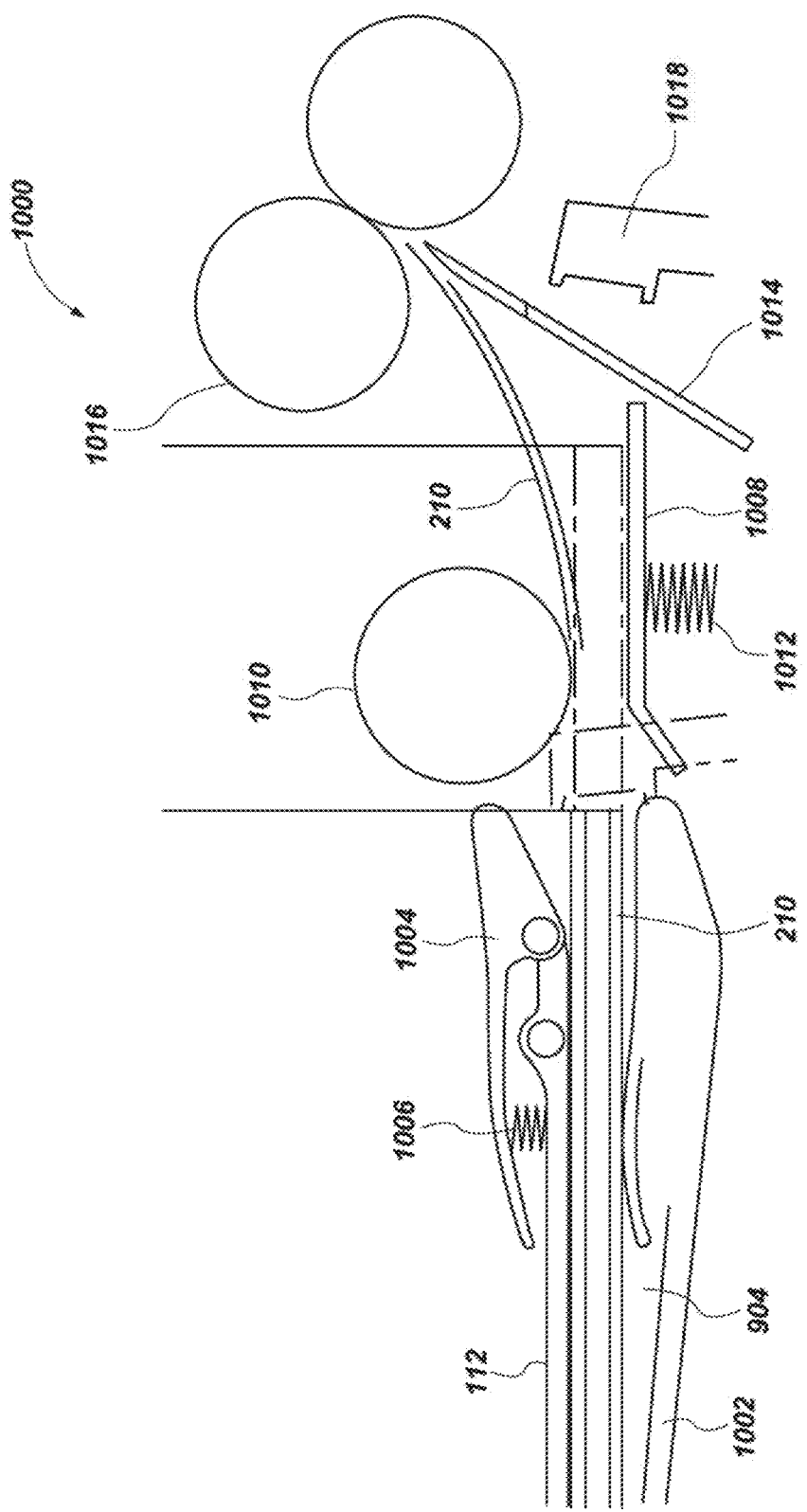
FIG. 10 is a schematic side view of selected portions of the output mechanism of FIG. 9.

FIG. 10 is a schematic side view of selected portions of the output mechanism 1000 of FIG. 9. FIG. 10 also depicts an illustrative configuration for the compartments 904 of the temporary storage 112. Each compartment 904 may include a cantilevered arm 1002 extending radially outward from a hub, and a retainer 1004 at a distal end of the arm 1002. Rotationally adjacent arms 1002 may define the circumferential walls of the compartment 904, and the retainer 1004 may extend circumferentially from one arm 1002 toward a rotationally adjacent arm 1002. The retainer 1004 may be movable relative to the rotationally adjacent arm 1002 to adjust the circumferential space in the compartment 904 for accommodating the cards 210, and may be biased toward the rotationally adjacent arm 1002 (e.g., using a spring 1006) to apply pressure against the cards 210 in the compartment 904 to assist in retaining the cards 210 therein.

The output mechanism 1000 may include, for example, a platform 1008 located laterally adjacent to the temporary storage 112 on a side of the temporary storage 112 opposite the defect detection system 500 (see FIGS. 1, 5). A bottom portion of a compartment 904 from which a card 210 is to be withdrawn as defined by the retainer 1004 may be brought into general alignment with the platform 1008 under control of the controller 202. As the stack of cards 210 in the compartment 904 is urged partially out from the compartment 904, the stack and particularly a bottom-most card 210 in the stack may contact the platform 1008. When the stack of cards 210 in the compartment 904 is pushed to the maximum partial removal enabled by the first push bar 908 (see FIG. 9), a top-most card 210 in the stack may contact a pick-off roller 1010 overlying the platform 1008. The platform 1008 may be located an average thickness of a card 210 or less away from the pick-off roller 1010 when no cards 210 are in contact with the platform 1008. The platform 1008 may be movable, enabling the space between the platform 1008 and the pick-off roller 1010 to adjust to the height of the stack of cards 210. The platform 1008 may also be biased toward the pick-off roller 1010 (e.g., by a spring 1012 underlying the platform 1008), increasing the likelihood (e.g., ensuring) that there will be sufficient contact friction between the pick-off roller 1010 and the top-most card 210 for rotation of the pick-off roller 1010 to move the top-most card 210.

The pick-off roller 1010 may rotate and drive, for example, only the top-most card 210 in the stack out of the compartment 904 and laterally away from the temporary storage 112 for output. For example, the top-most card 210 may make contact with a deflector 1014 positioned and oriented to cause the card 210 to deform elastically and present its leading end to another pair of pinch rollers 1016, which may contact the card 210, draw the card 210 between the pinch rollers 1016, and drive the card 210 laterally farther away from the compartment 904 from which it has been withdrawn. Thus, when unloading of a specified type has been requested, the desired cards 210 may be unloaded from the temporary storage 112 one card 210 at a time. In other embodiments, more than one card 210 may be removed from a compartment 904 at a time.

In embodiments where the compartments 904 are unloaded one card 210 at a time, the remainder of the stack of cards 210 following removal of the one card 210 may be reinserted back into the compartment 904. For example, the output mechanism 1000 may include a second push bar 1018 positioned, oriented, and configured to reinsert the remaining cards 210 into the temporary storage 112 for continued temporary storage awaiting subsequent output. The second push bar 1018 located on a lateral side of the platform 1008 opposite the compartment 904 into which cards 210 are to be reinserted as the top-most card 210 is removed from the stack. The second push bar 1018 may be movable toward an opposite lateral side of the platform 1008 and toward the compartment 904, a portion of the second push bar 1018 making contact with the cards 210 remaining partially within the compartment 904 and urging them back toward a center of the temporary storage 112 and more completely into the compartment 904. The second push bar 1018 may then be returned to its original position hidden behind the platform 1008.

Figure 11:
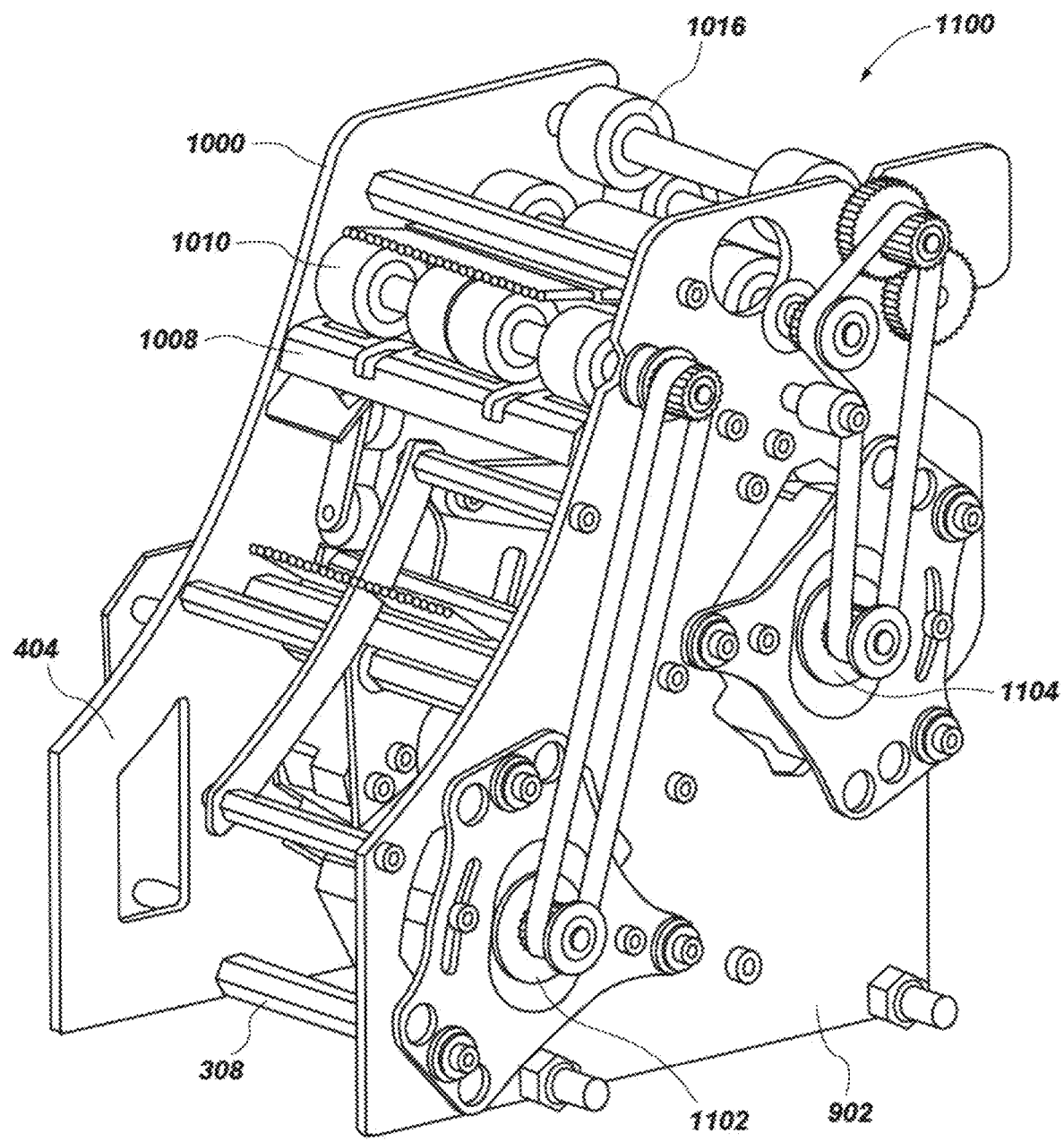
FIG. 11 is a perspective view of other selected portions of the output mechanism of FIG. 9.
Figure 12:
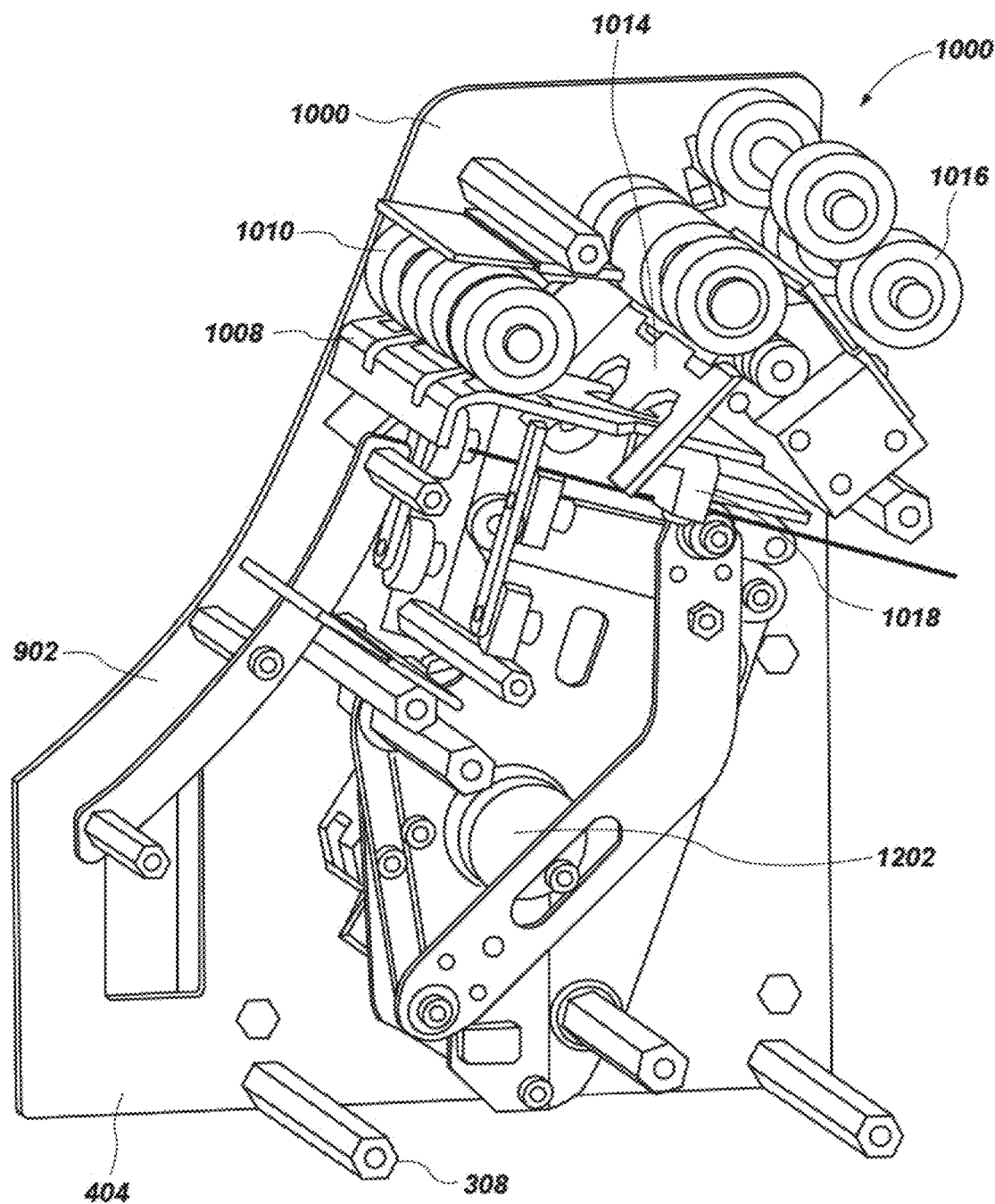
FIG. 12 is a partial cutaway, side perspective view of the other selected portions of the output mechanism of FIG. 11.

FIG. 11 is a perspective view of other selected portions of the output mechanism 1000 of FIG. 2. FIG. 12 is a partial cutaway, side perspective view of the other selected portions of the output mechanism 1000 of FIG. 11. With combined reference to FIGS. 11 and 12, the output mechanism 1000 may be configured as a fourth independent module 1100 to be supported on, and affixed to, the base 208 (see FIGS. 2, 9). The fourth independent module 1100 may include a fourth frame 902 having a pair of plates 404 separated by, and secured to one another, by spacers 308. The plates 404 may include attachment features (e.g., holes, threaded holes, snap receivers) sized, positioned, and configured to enable the operational components and the spacers 308 of the third independent module 800 to be supported by the plates 404 in a selected location and orientation relative to one another. In some embodiments, the plates 404 may include additional holes enabling portions of the operational components not relied on for attachment to a given plate 404 to extend through the hole. As with FIG. 4, one plate 404 in FIG. 12 has been removed for convenience in depicting other components of the fourth independent module 1100.

Each of the pick-off roller 1010, pinch rollers 1016, and second push bar 1018 by a respective one of the associated motor 1102, motor 1104, or motor 1202, either directly or via a force transfer mechanism. Each of the motor 1102, motor 1104, and motor 1202 may be operatively connected to the controller 202, which may issue control signals to the motor 1102, motor 1104, and/or motor 1202 to cause the motor 1102, motor 1104, and motor 1202 to cooperatively and selectively unload a card at a time from a given compartment 904 and reinsert any remaining cards back into the compartment 904.

Figure 13:
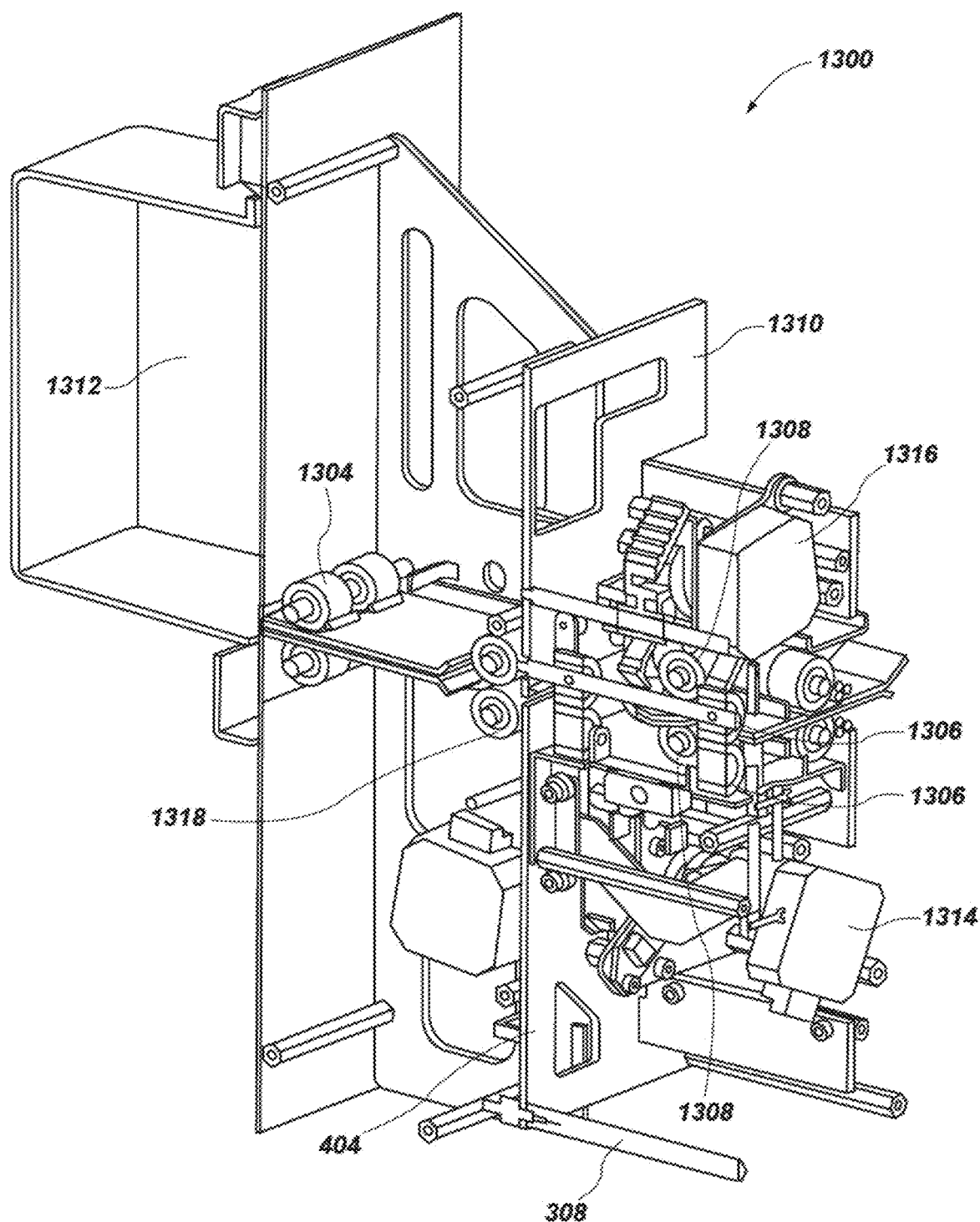
FIG. 13 is a partial cutaway, perspective view of still other selected portions of the output mechanism of FIG. 2.

FIG. 13 is a partial cutaway, perspective view of another independent module 1300 located downstream of the output mechanism 1000 of FIG. 9. Downstream of the fourth independent module 1100 (see FIG. 11), the fifth independent module 1300 may include a set of rollers 1304 positioned and configured to transfer cards 210 laterally away from the temporary storage 112. More specifically, the set of rollers 1304 may include, for example, a first pair of pinch rollers 1306 positioned and oriented to receive cards 210 from the adjacent pinch rollers 1016 (see FIGS. 10-12) and to continue moving the cards from the fourth independent module 1100 away from the temporary storage 112 (see FIGS. 1, 2) and a second pair of pinch rollers 1308 positioned laterally between the first pair of pinch rollers 1306 and oriented to laterally displace cards 210 from between the first pair of pinch rollers 1306 away from the temporary storage 112 (see FIGS. 1, 2). As a specific, nonlimiting example, the set of rollers 1304 may include a first pair of pinch rollers 1306 having axes of rotation oriented transverse (e.g., perpendicular) to a direction of movement of each card 210 from the immediately adjacent, upstream pinch rollers 1016 (see FIG. 10) away from the temporary storage 112 (see FIGS. 1, 2) and a second pair of pinch rollers 1308 having axes of rotation oriented parallel to the direction of movement of each card 210 from the immediately adjacent, upstream pinch rollers 1016 (see FIG. 10) away from the temporary storage 112 (see FIGS. 1, 2). In some embodiments, the first pair of pinch rollers 1306 may be consolidated with, and replaced by, the upstream pinch rollers 1016 (see FIG. 10), with the second pair of pinch rollers 706 located laterally between the upstream pinch rollers 1016 (see FIG. 10).

The fifth independent module 1300 may include a fifth frame 1310 having at least a pair of plates 404 separated by, and secured to one another, by spacers 308. The plates 404 may include attachment features (e.g., holes, threaded holes, snap receivers) sized, positioned, and configured to enable the operational components and the spacers 308 of the fifth independent module 1300 to be supported by the plates 404 in a selected location and orientation relative to one another. In some embodiments, the plates 404 may include additional holes enabling portions of the operational components not relied on for attachment to a given plate 404 to extend through the hole. As with FIG. 4, one plate 404 in FIG. 13 has been removed for convenience in depicting other components of the fifth independent module 1300.

The first pair of pinch rollers 1306 may be located less than a card's 210 minimum length laterally away from the immediately adjacent, upstream pinch rollers 1016 (see FIG. 10), one of the pinch rollers 1306 may be located vertically to contact a leading end of a card 210 as the card 210 is advanced by the upstream pinch rollers 1016 (see FIG. 10) and draw the card 210 between the pinch rollers 1306, and the pinch rollers 1306 may be vertically spaced from one another by a distance equal to, or less than, an average thickness of the cards 210. In some embodiments, the vertical distance between the pinch rollers 1306 may be variable, and the pinch rollers 1306 may be urged toward one another by a biasing element (e.g., a spring or solenoid or linear actuator under control of the controller 202), which urging may optionally be under the selective control of the controller 202. At least one of the pinch rollers 1306 may be driven by an associated motor 1314, either directly or via a force transfer mechanism. The motor 1314 may be operatively connected to the controller 202, which may issue control signals to the motor 1314 to cause the motor 1314 to selectively drive the associated pinch roller 1306 in a selected direction or stop driving the associated pinch roller 1306.

The second pair of pinch rollers 1308 may be located more than a card's 210 minimum length laterally away from the adjacent, upstream pinch rollers 1016 (see FIG. 10) and less than a card's 210 minimum length laterally away from the first pair of pinch rollers 1306, a pinch point of the pinch rollers 1308 may be located vertically to enable a card 210 to enter between the second pair of pinch rollers 1308 as the card 210 is advanced by the first pair of pinch rollers 1306, and the pinch rollers 1308 may be vertically spaced from one another by a distance equal to, or less than, an average thickness of the cards 210. In some embodiments, the vertical distance between the pinch rollers 1308 may be variable, and the pinch rollers 1308 may be urged toward one another by a biasing element (e.g., a spring or solenoid or linear actuator under control of the controller 202), which urging may optionally be under the selective control of the controller 202. At least one of the pinch rollers 1308 may be driven by an associated motor 1316, either directly or via a force transfer mechanism. The motor 1316 may be operatively connected to the controller 202, which may issue control signals to the motor 1316 to cause the motor 1316 to selectively drive the associated pinch roller 1308 in a selected direction or stop driving the associated pinch roller 1308.

When the controller 202 indicates that a given card 210 is to be output from the temporary storage 112, the controller 202 may issue control signals to the motor 1314 driving the first pair of pinch rollers 1306 to continue driving that card 210 away from the temporary storage 112 (see FIGS. 1, 2). The controller 202 may then issue control signals to the motor 1314 driving the first pair of pinch rollers 1306 to stop driving that card 210 away from the temporary storage 112 (see FIGS. 1, 2). The controller 202 may also issue control signals to one or more upstream components of the input mechanism 104 to pause advancement of upstream cards 210 at least until the given card 210 has been displaced from further advancement. The controller 202 may then issue control signals to the motor 1316 to begin driving the second, perpendicular pair of pinch rollers 1308, causing the pinch rollers 1308 to drive the given card 210 laterally out of the path from the temporary storage 112, through the fifth independent module 1300, toward an output compartment 1312.

The output compartment 1312 may be positioned, sized, shaped, and otherwise configured to temporarily store cards 210 for output in a position laterally offset from the temporary storage 112 (see FIGS. 1, 2). For example, the set of rollers 1304 may include additional pairs of pinch rollers 1318 providing a continuous path from the pinch rollers 1308 that initially divert the card to the output compartment 1312 configured as a removable rectangular prism and sized to hold bulk quantities of approved cards 210 in the output compartment 1312 for subsequent removal, inspection, and/or reuse. As a specific, nonlimiting example, the pinch rollers 1306 and pinch rollers 1308 may be positioned and configured to cooperatively divert and transfer approved cards 210 from a pathway extending from the temporary storage 112 (see FIGS. 1, 2) laterally outward to a laterally adjacent output compartment 1312 sized to hold at least 52 (e.g., up to 450) cards 210 approved for commercial reuse in an orderly stack and accessible by detaching a snap-in connection of the output compartment 1312 and completely removing, emptying, and re-attaching the output compartment 1312 or replacing with a similarly configured and empty output compartment 1312. Such a configuration may enable the collection of certain subgroupings of cards 210 previously located within the temporary storage 112, optionally in a desired known or random ordering, for output within the output compartment 1312. For example, the output compartment 1312 may receive, temporarily store, and present an orderly collection of cards 210 (e.g., in a stack) corresponding to one or more 52- or 53-card decks of standard playing cards for withdrawal at a time.

In some embodiments, the output compartment 1312 may be capable of vertically displacing as cards 210 are introduced into a stack at the bottom of the output compartment 1312. For example, as a card 210 is urged by the set of rollers 1304 into the output compartment 1312, and on top of any other cards already stacked within the output compartment 1312, the output compartment 1312 may displace at least substantially vertically downward by at least substantially the same distance as the card's thickness to accommodate the card 210 within the output compartment 1312. Once the output compartment 1312 has reached the vertical bottom of its travel, the output compartment 1312 may be full of cards 210, and may be removed. The output compartment 1312 may be biased vertically upward (e.g., utilizing a spring).

In some embodiments, the third independent module 800 (see FIG. 8) and the fifth independent module 1300 may be similar or substantially identical, reducing the number of unique modules for connection to the base 208 (see FIG. 2) and enabling interchangeability for ease of maintenance and repair.

In some embodiments, the card-handling device 100 may be operable in distinct modes. For example, the controller 202 may cause the components of the card-handling device 100 to cooperatively operate to output a set of cards 210 in a predefined order when operating in a sorting mode or to output a set of randomly ordered cards 210 of a predefined composition when operating in a shuffling mode. More specifically, the controller 202 may cause the components of the card-handling device 100 to cooperatively operate to output, for example, a set of cards 210 corresponding to at least one 52- or 53-card deck of standard playing cards, with each deck arranged in order by rank, suit, or both, when operating in a sorting mode or to output a set of randomly ordered cards 210 corresponding to at least one 52- or 53-card deck of standard playing cards, with all decks in randomized order and intermixed with one another, when operating in a shuffling mode. As a specific, nonlimiting example, the controller 202 may cause the components of the card-handling device 100 to cooperatively operate to output, for example, a set of cards 210 corresponding to between 6 and 12 (e.g., 8, 10) 52- or 53-card deck of standard playing cards, with each deck arranged in order by rank, suit, or both, when operating in a sorting mode or to output a set of randomly ordered cards 210 corresponding to between 6 and 12 (e.g., 8, 10) 52- or 53-card deck of standard playing cards, with all decks in randomized order and intermixed with one another, when operating in a shuffling mode. In other embodiments, the card-handling device 100 may have a single operational mode, and may either sort or randomize cards for output.

Figure 14:
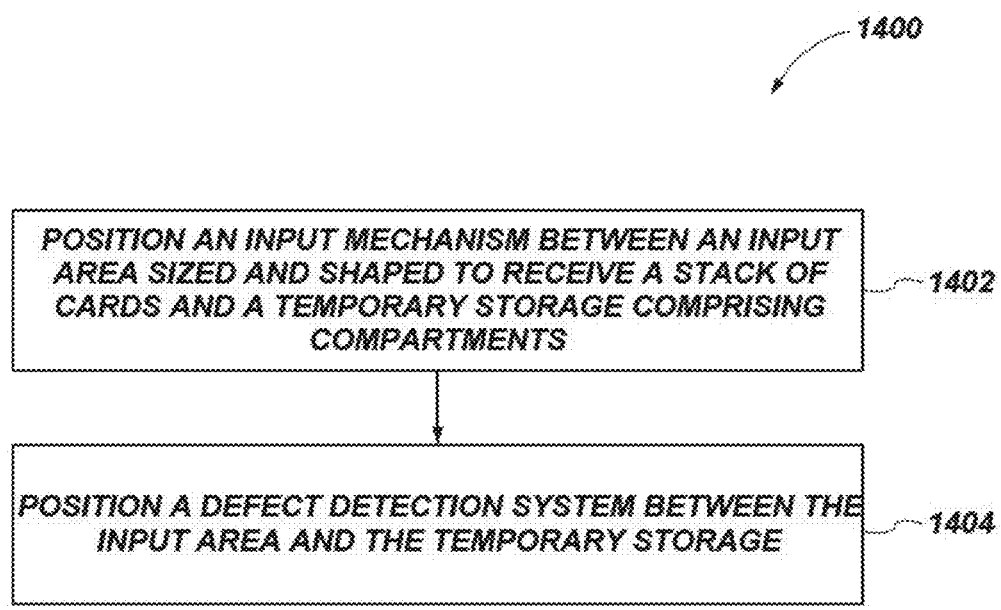
FIG. 14 is a flowchart illustrating a method of assembling a card-handling device in accordance with this disclosure.

FIG. 14 is a flowchart illustrating a method 1400 of assembling a card-handling device 100 in accordance with this disclosure. The method 1400 may involve, for example, positioning an input mechanism 104 between an input area 102 sized and shaped to receive a stack of cards 210 and a temporary storage 112 including compartments 904 for temporarily storing the cards 210 (see FIGS. 1, 2, 9), as indicated at act 1402. A defect detection system 500 may then be positioned between the input area 102 and the temporary storage 112 (see FIGS. 1, 2, 5), as indicated at act 1404. More specifically, assembling a card-handling device 100 may involve supporting and affixing a first independent module 300 (see FIG. 3) including the input area 102, the input mechanism 104, and optionally a card identification system 106 on a base 208 (see FIG. 2). A defect detection system 500 (see FIG. 5) may be supported and affixed on the base 208 (see FIG. 2) laterally adjacent to the first independent module 300 (see FIG. 2). A diverter 110 (see FIGS. 2, 6-8) may be supported and affixed on the base 208 (see FIG. 2) laterally adjacent to the defect detection system 500 (see FIG. 5). A temporary storage 112 (see FIG. 2) may be supported and affixed on the base 208 (see FIG. 2) laterally adjacent to the diverter 110. Finally, an output mechanism 1000 may be supported and affixed on the base 208 (see FIG. 2) laterally adjacent to the temporary storage 112.

In other embodiments, one or more additional modules may be supported on and affixed to the base 208, and/or one or more of the previously described modules may be omitted, which may augment or otherwise alter the functionality of the card-handling device 100. For example, modules capable of performing other card verification, quality checks, and, optionally, randomization may be added. As another example, a module capable of directly outputting one card at a time (e.g., like a shoe) or subgroupings of cards at a time (e.g., like hands to be dealt) may be supported on and affixed to the base 208, rather than the output mechanism 1000 shown and described in connection with FIGS. 10 through 12.

Figure 15:
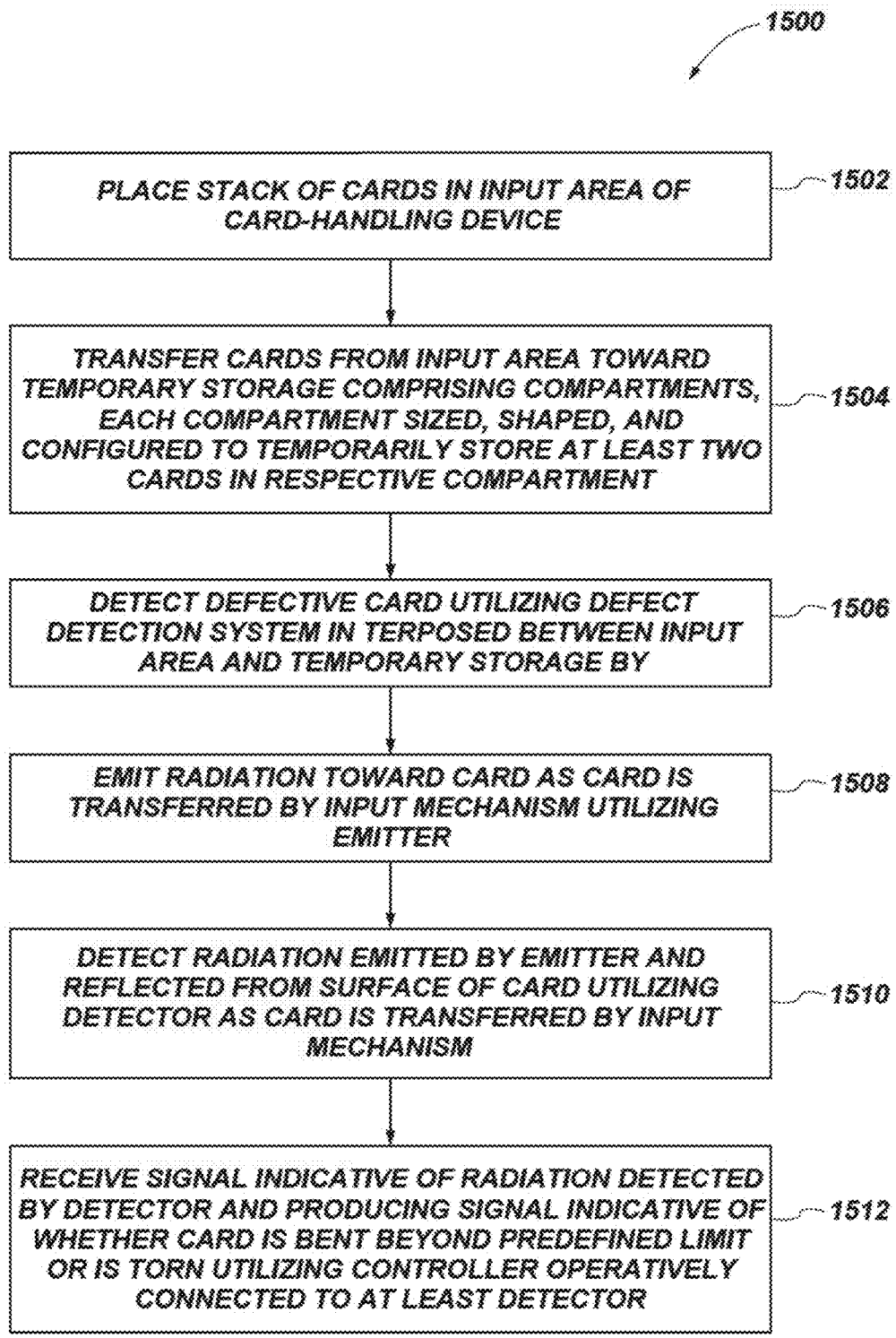
FIG. 15 is a flowchart illustrating a method of using a card-handling device in accordance with this disclosure.

FIG. 15 is a flowchart illustrating a method 1500 of using a card-handling device 100 in accordance with this disclosure. The method 1500 may involve placing a stack of cards 210 in an input area 102 of the card-handling device 100 (see FIG. 2), as indicated at act 1502. Cards 210 may be transferred from the input area 102 toward a temporary storage 112 comprising compartments 904, each compartment 904 sized, shaped, and configured to temporarily store at least two cards in the respective compartment, as indicated at act 1504. A defective card 210 may be detected utilizing a defect detection system 500 interposed between the input area 102 and the temporary storage 112, as indicated at act 1506. Radiation may be emitted toward a card 210 as the card 210 is transferred by the input mechanism 104 utilizing an emitter 510 (see FIGS. 2, 5), as indicated at act 1508. Radiation emitted by the emitter 510 and reflected from a major surface 212 of the card 210 may be detected utilizing a detector 514 as the card 210 is transferred by the input mechanism 104 (see FIGS. 2, 5), as indicated at act 1510. A signal indicative of radiation detected by the detector 514 may be received at a controller 202 and the controller 202 may produce a signal indicative of whether the card 210 is bent beyond a predefined limit or is torn, as indicated at act 1512.

Card-handling devices in accordance with this disclosure may automatically screen cards for certain defects, separate defective cards from approved cards, collect approved cards for future use, and be capable of performing such screening efficiently in bulk. Unique techniques and hardware employed by card-handling devices in accordance with this disclosure may reduce waste by identifying cards that may be suitable for continued use, rather than rejecting an entire deck when any one card in the deck has been determined to be defective. Card-handling devices in accordance with this disclosure may also move quickly, with preliminary results from prototype devices capable of verifying seven complete sets of between 6 and 12 52- or 53-card decks of standard playing cards per hour and forming two complete sets of between 6 and 12 52- or 53-card decks of standard playing cards per hour utilizing one card-handling device. On average, about 60% of cards representative of a normal use cycle for playing cards were discarded as defective, meaning that 40% of card that would normally be rejected as waste were reusable. The card-handling devices in accordance with this disclosure may also assist in identifying and reducing the effectiveness of certain techniques for cheating, such as, for example, marking certain cards by bending, folding, creasing, kinking, fraying, and/or tearing the cards.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure, as contemplated by the inventor.

What is claimed is:

1. A card-handling device, comprising:
   an input area sized and shaped to receive cards;
   an output area for outputting at least some of the cards;
   a defect detection system located along a card path downstream from the input area and upstream from the output area, the defect detection system comprising:
      an emitter positioned and oriented to direct radiation toward a major surface of a card as the card moves along the card path;
      a detector positioned and configured to detect the radiation emitted by the emitter and reflected from the major surface of the card as the card moves along the card path; and
      a controller operatively connected to the detector and configured to correlate a signal from the detector with an identification of a degree to which the major surface of the card has deviated from a reference plane.

2. The card-handling device of claim 1, further comprising a diverter comprising:
   a first pair of pinch rollers having first axes of rotation oriented perpendicular to a direction of movement of an incoming card toward a temporary storage; and
   a second pair of pinch rollers having second axes of rotation oriented parallel to the direction of movement of the incoming card.

3. The card-handling device of claim 2, wherein the second pair of pinch rollers is located less than a minimum length of a card away, and downstream, from the first pair of pinch rollers.

4. The card-handling device of claim 2, wherein the controller is configured to issue a control signal to a motor positioned to drive the first pair of pinch rollers to stop driving the first pair of pinch rollers responsive to the controller receiving a signal from the defect detection system that the degree to which the major surface of the card has deviated from a reference plane exceeds a threshold.

5. The card-handling device of claim 4, wherein the controller is configured to issue a control signal to one or more upstream components of the card-handling device to pause advancement of upstream cards at least until the card has been displaced from further advancement by the diverter responsive to the controller receiving the signal from the defect detection system that the degree to which the major surface of the card has deviated from a reference plane exceeds a threshold.

6. The card-handling device of claim 4, wherein the controller is configured to issue a control signal to a motor to begin driving the second pair of pinch rollers to cause the second pair of pinch rollers to drive the card laterally out of the card path responsive to the controller receiving the signal from the defect detection system that the degree to which the major surface of the card has deviated from a reference plane exceeds a threshold.

7. The card-handling device of claim 4, wherein the controller is configured to issue the control signal responsive to the controller receiving from the defect detection system a signal that the card is bent, folded, creased, kinked, or frayed beyond a predefined limit.

8. The card-handling device of claim 2, further comprising a removable compartment positioned to receive cards from the diverter.

9. The card-handling device of claim 8, wherein the removable compartment is configured to be displaced in a direction perpendicular to a direction in which cards are introduced into the removable compartment by at least substantially a same distance as a thickness of a card responsive to introduction of cards into a stack within the removable compartment.

10. The card-handling device of claim 1, wherein the defect detection system comprises a belt transport positioned and configured to move cards through the defect detection system and past the emitter and the detector.

11. The card-handling device of claim 1, wherein the emitter is positioned and oriented to direct a beam, line, or point of radiation toward the major surface of the card as the card moves along the card path.

12. The card-handling device of claim 11, wherein the emitter is a line laser positioned and oriented to direct a line of radiation across a width of the major surface of the card as the card moves along the card path.

13. The card-handling device of claim 1, wherein the emitter is positioned and oriented to direct the radiation at an oblique angle relative to the reference plane as the card moves along the card path.

14. The card-handling device of claim 1, further comprising a radiation blocker interposed between the emitter and the card, the radiation blocker positioned to block or absorb a portion of radiation emitted by the emitter.

15. The card-handling device of claim 1, wherein the detector comprises a camera.

16. The card-handling device of claim 1, further comprising a sensor operatively connected to the controller and positioned and configured to identify at least a rank and suit of each card received into the card path.

17. A method of assembling a card-handling device, the method comprising:
   positioning a defect detection system downstream from an input area and upstream from an output area, the input area sized and shaped to receive cards, the output area for outputting at least some of the cards;
   wherein positioning the defect detection system comprises:
      positioning and orienting an emitter to direct radiation toward a major surface of a card as the card moves along a card path between the input area and the output area;
      positioning a detector to detect the radiation emitted by the emitter and reflected from the major surface of the card as the card moves along the card path; and
      positioning a controller operatively connected to the detector and configured to correlate a signal from the detector with an identification of a degree to which the major surface of the card has deviated from a reference plane.

18. The method of claim 17, further comprising positioning a diverter between the defect detection system and the output area, wherein positioning the diverter comprises:
   positioning a first pair of pinch rollers having first axes of rotation such that the first axes of rotation are oriented perpendicular to a direction of movement of an incoming card toward a temporary storage; and
   positioning a second pair of pinch rollers having second axes of rotation such that the second axes of rotation are oriented parallel to the direction of movement of the incoming card.

19. A method of using a card-handling device, the method comprising:
   placing cards in an input area of the card-handling device;
   moving cards from the input area along a card path toward an output area; and
   detecting a defective card utilizing a defect detection system interposed between the input area and the output area by:
      directing radiation toward a major surface of a card utilizing an emitter as the card moves along the card path;
      detecting the radiation emitted by the emitter and reflected from the major surface of the card as the card moves along the card path utilizing a detector; and
      correlating a signal from the detector with an identification of a degree to which the major surface of the card has deviated from a reference plane utilizing a controller operatively connected to the detector.

20. The method of claim 19, further comprising diverting the card from the card path utilizing a second pair of pinch rollers having second axes of rotation oriented parallel to the direction of movement of the incoming card, the diverter further comprising a first pair of pinch rollers having first axes of rotation oriented perpendicular to a direction of movement of the card.

* * * * *